US011055295B1

(12) United States Patent
Osofsky et al.

(10) Patent No.: US 11,055,295 B1
(45) **Date of Patent: *Jul. 6, 2021**

(54) METHOD AND APPARATUS FOR DETERMINING SEARCH RESULT DEMOGRAPHICS

(71) Applicant: NetBase Solutions, Inc., Santa Clara, CA (US)

(72) Inventors: Michael Jacob Osofsky, Palo Alto, CA (US); Jens Erik Tellefsen, Los Altos, CA (US); Wei Li, Cupertino, CA (US); Ranjeet Singh Bhatia, Sunnyvale, CA (US)

(73) Assignee: NetBase Solutions, Inc., Santa Clara, CA (US)

( * ) Notice: Subject to any disclaimer, the term of this patent is extended or adjusted under 35 U.S.C. 154(b) by 656 days.

This patent is subject to a terminal disclaimer.

(21) Appl. No.: 14/704,919

(22) Filed: May 5, 2015

Related U.S. Application Data

(63) Continuation of application No. 12/765,848, filed on Apr. 22, 2010, now Pat. No. 9,026,529.

(51) Int. Cl.
*G06F 16/00* (2019.01)
*G06F 16/2457* (2019.01)
*G06F 16/248* (2019.01)

(52) U.S. Cl.
CPC ...... *G06F 16/24578* (2019.01); *G06F 16/248* (2019.01)

(58) Field of Classification Search
CPC .. G06F 17/271; G06F 17/2705; G06F 17/278; G06F 17/2785; G06F 17/277;
(Continued)

(56) References Cited

U.S. PATENT DOCUMENTS 5,694,523 A 12/1997 Wical
5,940,821 A 8/1999 Wical
(Continued)

OTHER PUBLICATIONS

Gautam et al., published Feb. 17, 2008 (y/m/d), pgs. 2040-2042. “Document Retrieval Based on Key Information of Sentence,” IEEE ICACT.

(Continued)

*Primary Examiner* — Yicun Wu
(74) *Attorney, Agent, or Firm* — Kaplan IP Law, PLLC; Jonathan T. Kaplan

(57) ABSTRACT

Techniques are presented for producing demographics, in an automated fashion, from a search result of computer-accessible content. While the demographics can be determined for a research product that has been produced by any technique, they are particularly useful when applied to an automated frame-based search approach. Frame-based search engines are presented for technology profiling, healthcare-related search and brand research. Determination of a demographic proceeds at two levels: member and population. At the member level, a demographic characteristic can be determined applicable with either total or partial certainty. Each value assigned by a demographic, to a population member, has a confidence level associated with it and the assignments can be represented by a Confidence Distribution. Summarization of a demographic, at the population level, depends upon whether the certainty assignments, at the member level, are total or partial. Declarant Demographics are presented. Approaches, to determining Declarant Demographics, are presented.

10 Claims, 41 Drawing Sheets

(58) Field of Classification Search

CPC ............... G06F 17/28; G06F 17/30684; G06F 17/2715; G06F 17/274; G06F 17/30672; G06F 17/21; G06F 17/3043; G06F 17/3053; G06F 17/30867; G06F 17/2247; G06F 17/2775; G06F 17/279; G06F 17/30528; G06F 17/30598; G06F 19/322; G06F 3/016; G06F 3/04842; G06F 3/0488; G06F 3/04883; G06F 17/2725; G06F 17/2735; G06F 17/2765; G06F 17/2827; G06F 17/30011; G06F 17/30389; G06F 17/30554; G06F 17/30604; G06F 17/30; G06F 17/00

See application file for complete search history.

(56) References Cited

U.S. PATENT DOCUMENTS

| | | | | |
|---|---|---|---|---|
| 5,963,940 | A | 10/1999 | Liddy et al. | |
| 5,995,922 | A | 11/1999 | Penteroudakis et al. | |
| 6,202,064 | B1 | 3/2001 | Julliard | |
| 6,269,356 | B1 | 7/2001 | Hatton | |
| 6,278,967 | B1 | 8/2001 | Akers et al. | |
| 6,453,312 | B1 | 9/2002 | Goiffon et al. | |
| 6,560,590 | B1 | 5/2003 | Shwe | |
| 6,571,240 | B1 | 5/2003 | Ho | |
| 6,578,022 | B1 | 6/2003 | Foulger et al. | |
| 6,584,464 | B1 | 6/2003 | Warthen | |
| 6,671,723 | B2 | 12/2003 | Nguyen | |
| 6,675,159 | B1 | 1/2004 | Lin et al. | |
| 6,738,765 | B1 | 5/2004 | Wakefield et al. | |
| 6,965,857 | B1 | 11/2005 | Decary | |
| 7,072,888 | B1 | 7/2006 | Perkins | |
| 7,305,336 | B2 * | 12/2007 | Polanyi ................. | G06F 17/279 704/1 |
| 7,356,540 | B2 | 4/2008 | Smith et al. | |
| 7,389,201 | B2 | 6/2008 | Chickering et al. | |
| 7,496,593 | B2 | 2/2009 | Gardner et al. | |
| 7,779,007 | B2 | 8/2010 | West et al. | |
| 7,805,302 | B2 | 9/2010 | Chelba et al. | |
| 7,822,597 | B2 * | 10/2010 | Brun ..................... | G06F 17/271 704/1 |
| 7,849,030 | B2 | 12/2010 | Ellingsworth | |
| 7,890,514 | B1 | 2/2011 | Mohan et al. | |
| 8,046,348 | B1 | 10/2011 | Rehling et al. | |
| 8,055,608 | B1 | 11/2011 | Rehling et al. | |
| 8,131,540 | B2 | 3/2012 | Marchisio et al. | |
| 8,935,152 | B1 | 1/2015 | Li et al. | |
| 9,047,285 | B1 | 6/2015 | Li et al. | |
| 2002/0091671 | A1 | 7/2002 | Prokoph | |
| 2003/0093421 | A1 | 5/2003 | Kimbrough et al. | |
| 2003/0172061 | A1 | 9/2003 | Krupin et al. | |
| 2003/0216905 | A1 | 11/2003 | Chelba et al. | |
| 2004/0044952 | A1 | 3/2004 | Jiang et al. | |
| 2004/0078190 | A1 | 4/2004 | Fass et al. | |
| 2004/0150644 | A1 | 8/2004 | Kincaid et al. | |
| 2005/0149494 | A1 | 7/2005 | Lindh et al. | |
| 2005/0165600 | A1 | 7/2005 | Kasravi et al. | |
| 2006/0009966 | A1 * | 1/2006 | Johnson .............. | G06F 17/2705 704/10 |
| 2007/0156677 | A1 | 7/2007 | Szabo | |
| 2009/0112892 | A1 | 4/2009 | Cardie | |
| 2009/0306967 | A1 | 12/2009 | Nicolov et al. | |
| 2009/0327854 | A1 | 12/2009 | Chhajer et al. | |
| 2010/0318348 | A1 | 12/2010 | Chelba et al. | |
| 2011/0145217 | A1 * | 6/2011 | Maunder ........... | G06F 17/30106 707/709 |

OTHER PUBLICATIONS

Ku et al., published Mar. 27, 2006 (y-m-d), 8 pgs. "Opinion Extraction, Summarization and Tracking in News and Blog Corpora," AAAI Spring Symposium Series 2006.

Ruppenhofer et al., published Aug. 25, 2006 (y/m/d), 166 pages. "FrameNet II: Extended Theory and Practice," International Computer Science Institute, University of California at Berkeley, USA.

Wu, Tianhaow et al., published May 3, 2003 (y/m/d), 12 pgs. "A Supervised Learning Algorithm for Information Extraction From Textual Data," Proceedings of the Workshop on Text Mining, Third SIAM International Conference on Data Mining.

Zadrozny, Slawomir et al., published 2003, 5 pgs. "Linguistically quantified thresholding strategies for text categorization," Systems Research Institute, Polish Academy of Sciences, Warszawa, Poland.

Zhang et al., published Jun. 22, 2010 (y/m/d), 10 pgs. "Voice of the Customers: Mining Online Customer Reviews for Product Feature-based Ranking," Proceedings of the 3rd Wonference on Online social networks (WOSN '10). USENIX Association, Berkeley, CA, USA.

Lucene Support Page 2454, with comments dated May 10, 2010-Jul. 16, 2010; https://issues.apache.org/jiralbrowse/LUCENE-2454; retrieved Jul. 24, 2019 (y/m/d); 9 pages.

Lucene Slide Share Presentation, dated May 7, 2010; https://www.slideshare.net/MarkHarwood/proposal-for-nested-document-support-in-lucene; retrieved Jul. 24, 2019 (y/m/d); 15 pages.

readme.txt in LuceneNestedDocumentSupport.zip, creation date May 10, 2010; retrieved Jul. 25, 2019 (y/m/d); 2 pages.

NestedDocumentQuery.java in LuceneNestedDocumentSupport.zip, creation date Aug. 25, 2010; retrieved Jul. 25, 2019 (y/m/d); 8 pages.

PerParentLimitedQuery.java in LuceneNestedDocumentSupport.zip, creation date Sep. 8, 2010; retrieved Jul. 25, 2019 (y/m/d); 10 pages.

* cited by examiner

Generic Output Screen: Record View Selected

Record View Selected and Result-Value Expanded

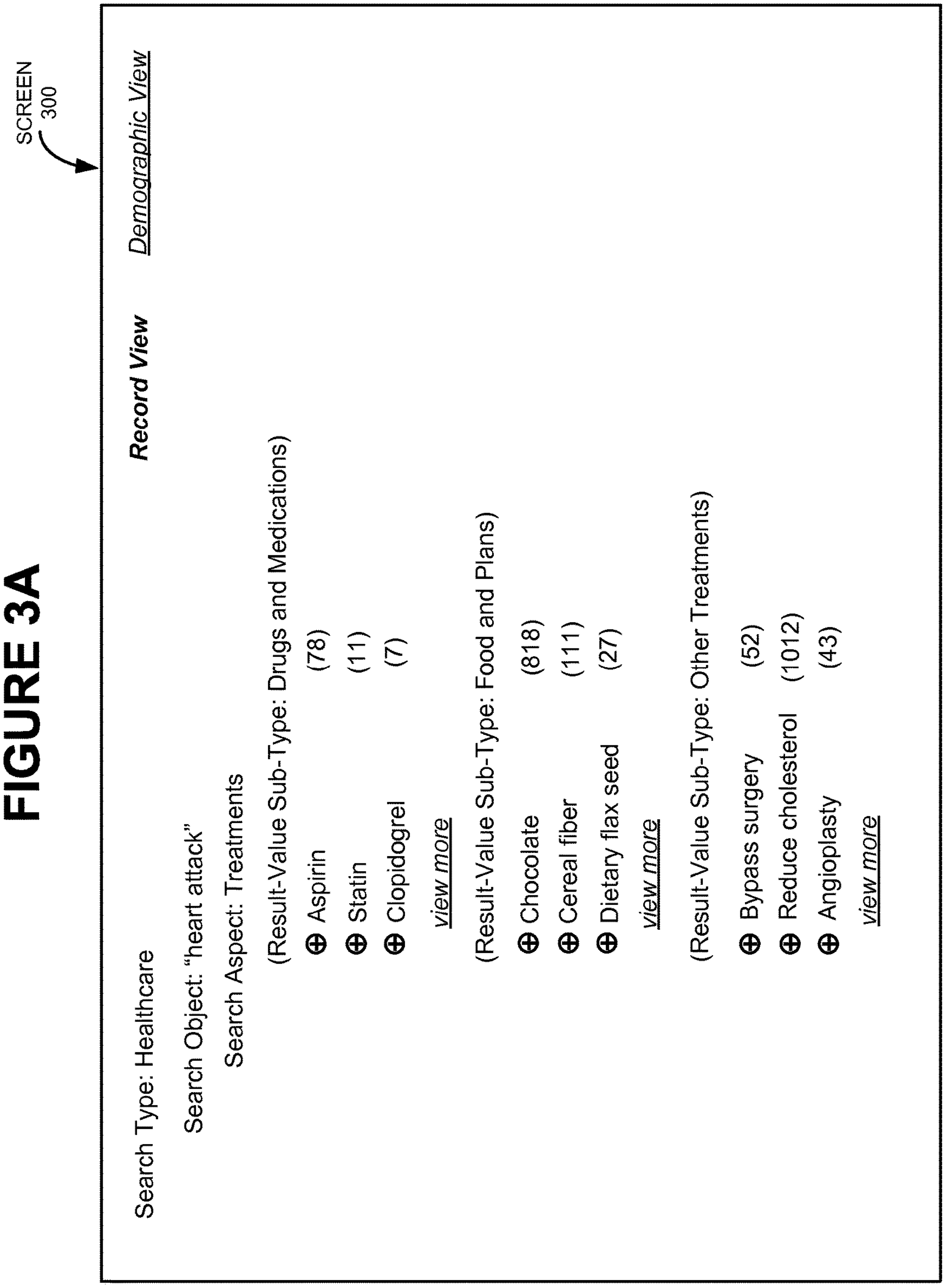

FIGURE 3A

*Record View*   *Demographic View*

Search Type: Healthcare

Search Object: "heart attack"

Search Aspect: Treatments (Result-Value Sub-Type: Drugs and Medications)
- ⊕ Aspirin     (78)
- ⊕ Statin     (11)
- ⊕ Clopidogrel     (7)

*view more*

(Result-Value Sub-Type: Food and Plans)
- ⊕ Chocolate     (818)
- ⊕ Cereal fiber     (111)
- ⊕ Dietary flax seed     (27)

*view more*

(Result-Value Sub-Type: Other Treatments)
- ⊕ Bypass surgery     (52)
- ⊕ Reduce cholesterol     (1012)
- ⊕ Angioplasty     (43)

*view more*

SCREEN 300

Confidence Distributions: Combining

Figure 6B

```
For each current_rp of current_search_aspect {

        For each current_record of current_rp.result_base {
                CD_A1 = For a demographic “D1,” apply its first Approach, D1_A1, to current_record;
                CD_A2 = For a demographic “D1,” apply its second Approach, D1_A2, to current_record;
                current_record.D1_CD = combine_CD (CD_A1, CD_A2);
                current_rp.D1_CD = combine_CD (current_rp.D1_CD, current_record.D1_CD);
        }  /* end, for each record */

        For each current_record of current_rp.result_base {
                CD_A1 = For a demographic “D2,” apply its first Approach, D2_A1, to current_record;
                CD_A2 = For a demographic “D2,” apply its second Approach, D2_A2, to current_record;
                current_record.D2_CD = combine_CD (CD_A1, CD_A2);
                current_rp.D2_CD = combine_CD (current_rp.D2_CD, current_record.D2_CD);
        }  /* end, for each record */

        Display current_rp.D1 _CD;
        Display current_rp.D2 _CD;

}  /* end, for each current_rp */
```

Figure 6C

```
For each current_rp of current_search_aspect {

        For each current_snippet of current_rp.result_base {
                CD_A1 = For a demographic "D1," apply its first Approach, D1_A1, to current_snippet;
                CD_A2 = For a demographic "D1," apply its second Approach, D1_A2, to current_snippet;
                current_snippet.D1_CD = combine_CD (CD_A1, CD_A2);
                current_rp.D1_CD = combine_CD (current_rp.D1_CD, current_snippet.D1_CD);
        }  /* end, for each record */

        For each current_snippet of current_rp.result_base {
                CD_A1 = For a demographic "D2," apply its first Approach, D2_A1, to current_snippet;
                CD_A2 = For a demographic "D2," apply its second Approach, D2_A2, to current_snippet;
                current_snippet.D2_CD = combine_CD (CD_A1, CD_A2);
                current_rp.D2_CD = combine_CD (current_rp.D2_CD, current_snippet.D2_CD);
        }  /* end, for each record */

        Display current_rp.D1 _CD;
        Display current_rp.D2 _CD;

}  /* end, for each current_rp */
```

Example: Instances Before Merging

Example: Instances After Merging

Example: Instances After Selection

Example: Instances After Grouping

FIGURE 8A

Query Selective Corpus: Example Fragment

SNIPPET 801:

First, it proposes that everyone take aspirin. This is not surprising. We know that aspirin can prevent a second heart attack if you've already had your first. However, the literature strongly supports taking aspirin before your first heart attack, so you never have a heart attack at all. The second part of the program recommends that everyone in this country and everyone, for that matter, in the world, consider taking a statin drug.

Source: MedicineNet, December 2009
www.medicinenet.com

SNIPPET 802:

This drug is usually prescribed after non-drug treatment options have not been fully successful at lowering cholesterol (e.g., diet change, increase in exercise, weight loss if overweight). This drug is thought to work by decreasing the amount of fat produced by the liver. Reducing cholesterol and triglycerides lowers the risk of heart disease and helps prevent strokes and heart attacks. This drug also helps to prevent pancreas disease ( pancreatitis ) in patients with very high blood levels of triglycerides. HOW TO USE: Take this medication by mouth usually twice a day, 30 minutes before your morning and evening meals, or as directed by your doctor.

Source: MedicineNet, December 2009
www.medicinenet.com

SNIPPET 803:

Omaha, Neb. Silver nanoparticles show "immense potential" in prevention of blood clots. Scientists are reporting discovery of a potential new alternative to aspirin, ReoPro, and other anti-platelet agents used widely to prevent blood clots in coronary artery disease, heart attack and stroke. Their study, scheduled for the June 23 issue of ACS Nano, a monthly journal, involves particles of silver - 1/50,000th the diameter of a human hair - that are injected into the bloodstream. Debabrata Dash and colleagues point out that patients urgently need new anti-thrombotic agents because traditionally prescribed medications too-often cause dangerous bleeding.

Source: Medical News Today, December 2009
www.medicalnewstoday.com

SNIPPET 804:

Atorvastatin is used in adults and children (10 years of age and older). Before starting this combination product, girls must have had their first menstrual period. Reducing high blood pressure, cholesterol and triglycerides help prevent strokes and heart attacks. Reducing high blood pressure also helps prevent kidney problems. HOW TO USE: Take this medication by mouth usually once daily with or without food, or as directed by your doctor.

Source: MedicineNet, December 2009
www.medicinenet.com

FIGURE 8B

Producing Instances Related to Heart Attack

SNIPPET 801:

First, it proposes that everyone take aspirin. This is not surprising. We know that aspirin can prevent a second heart attack if you've already had your first. However, the literature strongly supports taking aspirin before your first heart attack, so you never have a heart attack at all. The second part of the program recommends that everyone in this country and everyone, for that matter, in the world, consider taking a statin drug.

Source: MedicineNet, December 2009
www.medicinenet.com

SNIPPET 802:

This drug is usually prescribed after non-drug treatment options have not been fully successful at lowering cholesterol (e.g., diet change, increase in exercise, weight loss if overweight). This drug is thought to work by decreasing the amount of fat produced by the liver. Reducing cholesterol and triglycerides lowers the risk of heart disease and helps prevent strokes and heart attacks. This drug also helps to prevent pancreas disease ( pancreatitis ) in patients with very high blood levels of triglycerides. HOW TO USE: Take this medication by mouth usually twice a day, 30 minutes before your morning and evening meals, or as directed by your doctor.

Source: MedicineNet, December 2009
www.medicinenet.com

SNIPPET 803:

Omaha, Neb. Silver nanoparticles show "immense potential" in prevention of blood clots. Scientists are reporting discovery of a potential new alternative to aspirin, ReoPro, and other anti-platelet agents used widely to prevent blood clots in coronary artery disease, heart attack and stroke. Their study, scheduled for the June 23 issue of ACS Nano, a monthly journal, involves particles of silver - 1/50,000th the diameter of a human hair - that are injected into the bloodstream. Debabrata Dash and colleagues point out that patients urgently need new anti-thrombotic agents because traditionally prescribed medications too-often cause dangerous bleeding.

Source: Medical News Today, December 2009
www.medicalnewstoday.com

SNIPPET 804:

Atorvastatin is used in adults and children (10 years of age and older). Before starting this combination product, girls must have had their first menstrual period. Reducing high blood pressure, cholesterol and triglycerides help prevent strokes and heart attacks. Reducing high blood pressure also helps prevent kidney problems. HOW TO USE: Take this medication by mouth usually once daily with or without food, or as directed by your doctor.

Source: MedicineNet, December 2009
www.medicinenet.com

FIGURE 8C

Producing Instances Related to Stroke

SNIPPET 801:

First, it proposes that everyone take aspirin. This is not surprising. We know that aspirin can prevent a second heart attack if you've already had your first. However, the literature strongly supports taking aspirin before your first heart attack, so you never have a heart attack at all. The second part of the program recommends that everyone in this country and everyone, for that matter, in the world, consider taking a statin drug.

Source: MedicineNet, December 2009
www.medicinenet.com

SNIPPET 802:

This drug is usually prescribed after non-drug treatment options have not been fully successful at lowering cholesterol (e.g., diet change, increase in exercise, weight loss if overweight). This drug is thought to work by decreasing the amount of fat produced by the liver. Reducing cholesterol and triglycerides lowers the risk of heart disease and helps prevent strokes and heart attacks. This drug also helps to prevent pancreas disease ( pancreatitis ) in patients with very high blood levels of triglycerides. HOW TO USE: Take this medication by mouth usually twice a day, 30 minutes before your morning and evening meals, or as directed by your doctor.

Source: MedicineNet, December 2009
www.medicinenet.com

SNIPPET 803:

Omaha, Neb. Silver nanoparticles show "immense potential" in prevention of blood clots. Scientists are reporting discovery of a potential new alternative to aspirin, ReoPro, and other anti-platelet agents used widely to prevent blood clots in coronary artery disease, heart attack and stroke. Their study, scheduled for the June 23 issue of ACS Nano, a monthly journal, involves particles of silver - 1/50,000th the diameter of a human hair - that are injected into the bloodstream. Debabrata Dash and colleagues point out that patients urgently need new anti-thrombotic agents because traditionally prescribed medications too-often cause dangerous bleeding.

Source: Medical News Today, December 2009
www.medicalnewstoday.com

SNIPPET 804:

Atorvastatin is used in adults and children (10 years of age and older). Before starting this combination product, girls must have had their first menstrual period. Reducing high blood pressure, cholesterol and triglycerides help prevent strokes and heart attacks. Reducing high blood pressure also helps prevent kidney problems. HOW TO USE: Take this medication by mouth usually once daily with or without food, or as directed by your doctor.

Source: MedicineNet, December 2009
www.medicinenet.com

FIGURE 8D

Instance Superset: Example Fragment

810

| | |
|---|---|
| TREATMENT | aspirin |
| CONDITION | heart attack |

811

| | |
|---|---|
| TREATMENT | reducing cholesterol |
| CONDITION | heart attacks |

812

| | |
|---|---|
| TREATMENT | reducing cholesterol |
| CONDITION | strokes |

813

| | |
|---|---|
| TREATMENT | aspirin |
| CONDITION | heart attack |

814

| | |
|---|---|
| TREATMENT | aspirin |
| CONDITION | stroke |

815

| | |
|---|---|
| TREATMENT | reducing high blood pressure, cholesterol |
| CONDITION | heart attacks |

Merged Instance Set: Example Fragment

Reduced Instance Set: Example Fragment

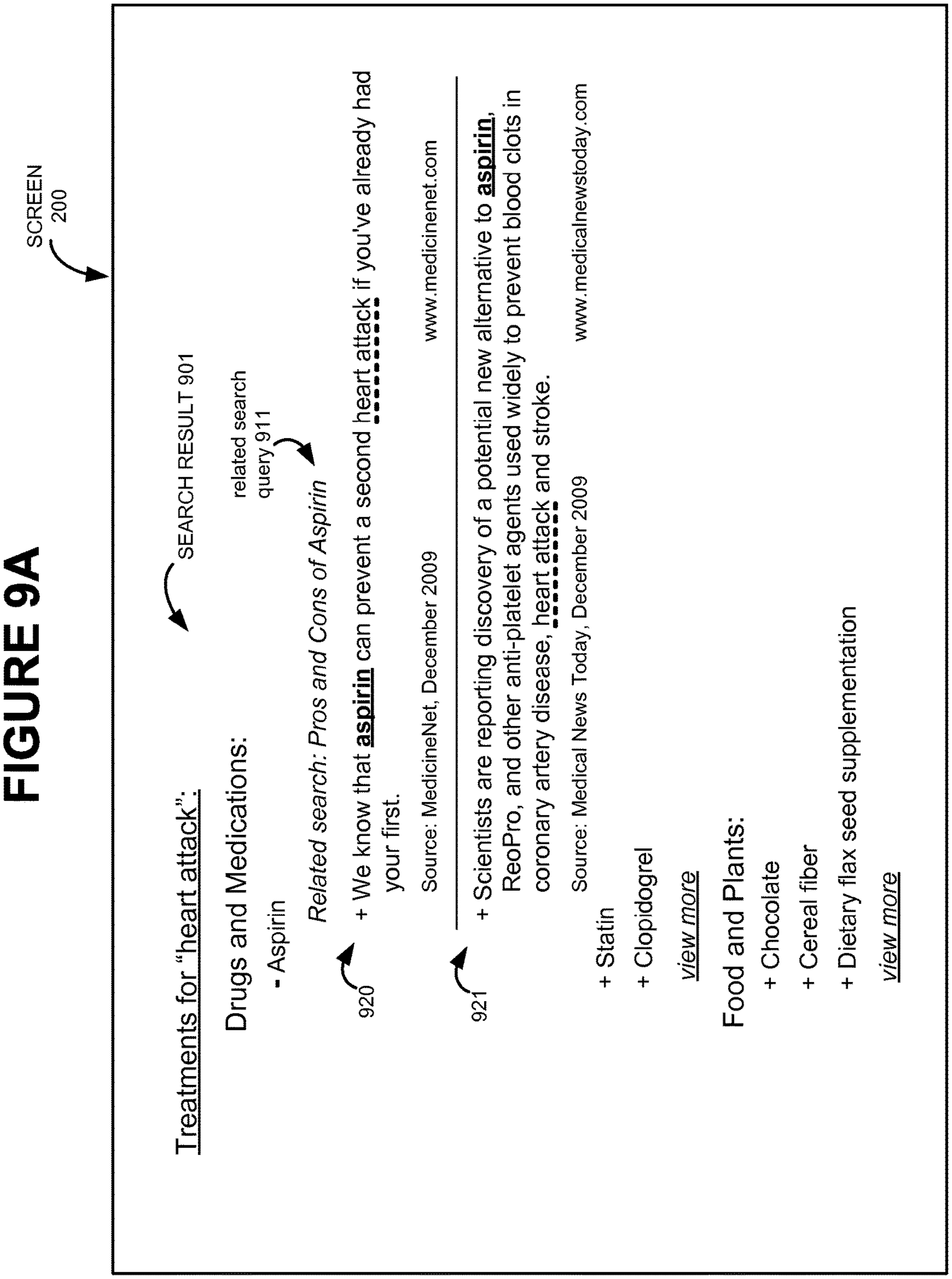

FIGURE 9A

SEARCH RESULT 901

Treatments for "heart attack":

Drugs and Medications:
- Aspirin

*Related search: Pros and Cons of Aspirin* ← related search query 911

920 → + We know that aspirin can prevent a second heart attack if you've already had your first.

Source: MedicineNet, December 2009      www.medicinenet.com

921 → + Scientists are reporting discovery of a potential new alternative to aspirin, ReoPro, and other anti-platelet agents used widely to prevent blood clots in coronary artery disease, heart attack and stroke.

Source: Medical News Today, December 2009      www.medicalnewstoday.com

+ Statin
  + Clopidogrel
  *view more*

Food and Plants:
  + Chocolate
  + Cereal fiber
  + Dietary flax seed supplementation
  *view more*

SCREEN 200

FIGURE 11A

BENEFIT FRAME TP: EXAMPLE RULE

1. IMPROVE_Rule_TP
2. Root_node: IMPROVE --> [Benefit_Role]
3. Actor: TECHNOLOGY --> Technology_Role
4. Undergoer:BADTHING --> Problem_Role
5. Undergoer:NON-BADTHING --> Gain_Role
6. (Modifier: Prep(for|in)...HUMAN-->Beneficiary_Role)

FIGURE 11B

EXAMPLE SENTENCE FOR CONVERSION TO LOGICAL FORM

1. "Weight loss usually improves sleep apnea in
2. women."

FIGURE 11C

LOGICAL FORM FROM SEMANTIC PARSER

1. "improves"
2. Actor: weight loss
3. Undergoer: sleep apnea
4. Modifier: in women

FIGURE 11D

BENEFIT FRAME TP INSTANCE

1. Technology_Role: weight loss
2. Benefit_Role: improves sleep apnea in women

FIGURE 12A

TREATMENT FRAME: EXAMPLE RULE

1. DECREASE_POSSIBILITY_OF_PROBLEM_Rule

2. Root_node: DECREASE --> no_role
3. Actor: ANY_LEX_UNIT --> TREATMENT_ROLE

4. Undergoer: CHANCE --> no_role
5. Modifier: Prep(of) … DISEASE --> CONDITION_ROLE 6. (Cause: Prep(by) … VING --> TREATMENT_ROLE)

FIGURE 12B

EXAMPLE SENTENCE FOR CONVERSION TO LOGICAL FORM

1. “Statins reduce the likelihood of heart attack by
2. lowering blood cholesterol.”

FIGURE 12C

LOGICAL FORM FROM SEMANTIC PARSER

1. “reduce”
2. Actor: statins

3. Undergoer: the likelihood
4. Modifier: of heart attack

5. Cause: by lowering blood cholesterol

FIGURE 12D

TREATMENT FRAME INSTANCE

1. CONDITION_ROLE: heart attack
2. TREATMENT_ROLE: statins
3. TREATMENT_ROLE: lowering blood cholesterol

FRAME-BASED SEARCH: OVERVIEW

FRAME-BASED SEARCH: INSTANCE GENERATION

EXAMPLE PRODUCTION ENVIRONMENT

Figure 16

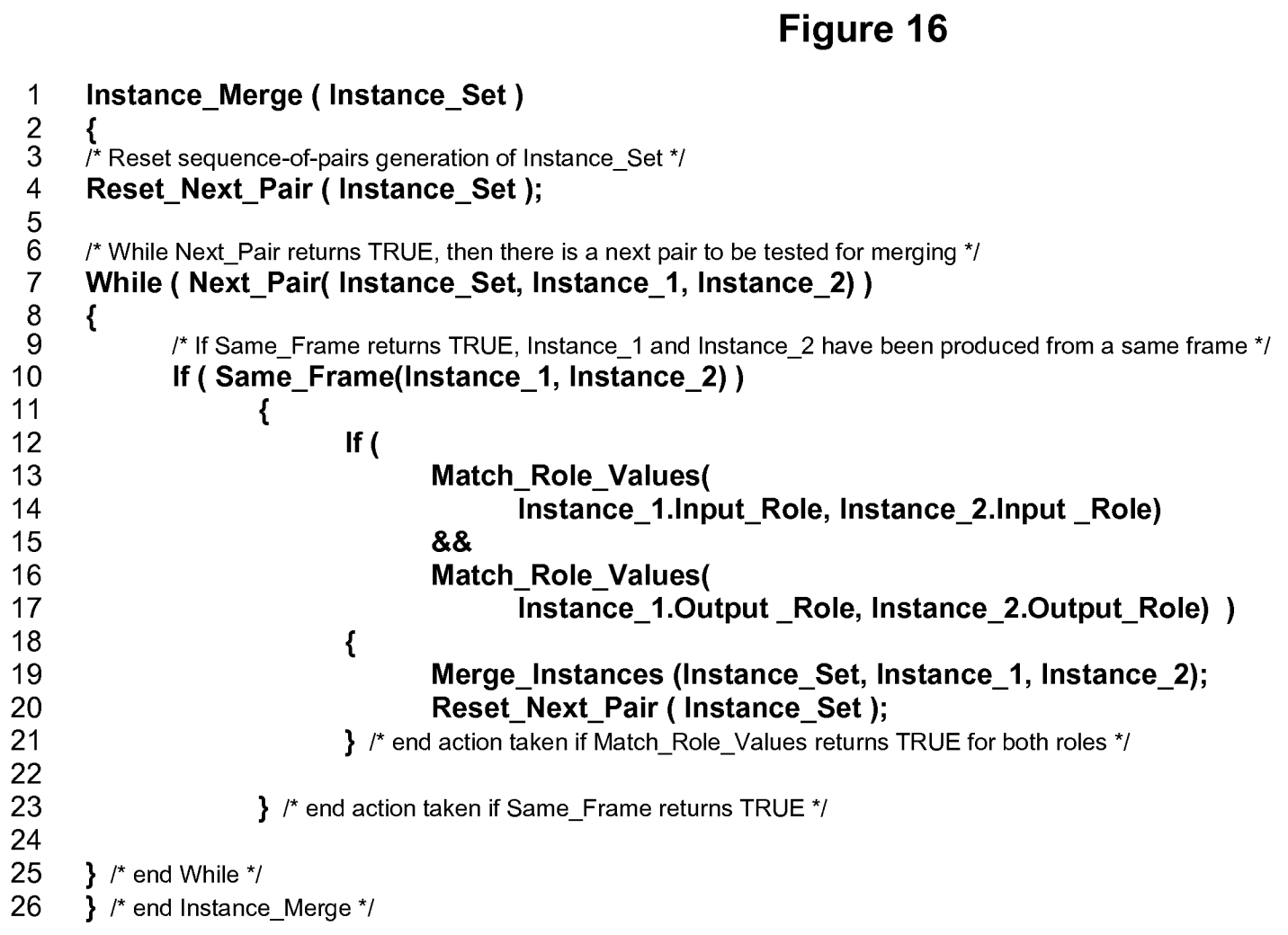

```
Instance_Merge ( Instance_Set )
{
/* Reset sequence-of-pairs generation of Instance_Set */
Reset_Next_Pair ( Instance_Set );

/* While Next_Pair returns TRUE, then there is a next pair to be tested for merging */
While ( Next_Pair( Instance_Set, Instance_1, Instance_2) )
{
        /* If Same_Frame returns TRUE, Instance_1 and Instance_2 have been produced from a same frame */
        If ( Same_Frame(Instance_1, Instance_2) )
                {
                        If (
                                Match_Role_Values(
                                        Instance_1.Input_Role, Instance_2.Input _Role)
                                &&
                                Match_Role_Values(
                                        Instance_1.Output _Role, Instance_2.Output_Role)  )
                        {
                                Merge_Instances (Instance_Set, Instance_1, Instance_2);
                                Reset_Next_Pair ( Instance_Set );
                        } /* end action taken if Match_Role_Values returns TRUE for both roles */

                } /* end action taken if Same_Frame returns TRUE */

} /* end While */
} /* end Instance_Merge */
```

Figure 17

```
Instance_Select ( Input_Instance_Set, Output_Instance_Set, Input_Rep, Output_Rep_Set )
{
/* create initial set of representations for identifying the Query */
Add_to_Set(Input_Rep, Output_Rep_Set);

/* While Next_Instance returns TRUE, then there is a next instance that may be selected for Output_Instance_Set */
While ( Next_Instance( Input_Instance_Set, Instance_Current) )
{
        For each Current_Rep of Output_Rep_Set {
                If (Match_Role_Values(Instance_Current.Input_Role, Current_Rep) ) {
                        Move_to_Set(Instance_Current, Input_Instance_Set, Output_Instance_Set);
                        If ( Not( Match_Exactly(Instance_Current.Input_Role, Current_Rep)) ) {
                                Add_to_Set(Instance_Current.Input_Role, Output_Rep_Set);
                                Reset_Next_Instance ( Input_Instance_Set )
                        } /* end if */
                        break;
                } /* end if */
        } /* end For-loop */

} /* end While-loop */
} /* end Instance_Select */
```

METHOD AND APPARATUS FOR DETERMINING SEARCH RESULT DEMOGRAPHICS

As provided for under 35 U.S.C. § 120, this patent claims benefit of the filing date of the following U.S. patent application, herein incorporated by reference in its entirety: "Method and Apparatus For Determining Search Result Demographics," filed 2010 Apr. 22 (y/m/d), having inventors Michael Jacob Osofsky, Jens Erik Tellefsen, Wei Li, and Ranjeet Singh Bhatia and application Ser. No. 12/765,848.

As provided for under 35 U.S.C., § 119(e) and/or § 120, this patent claims benefit of the filing date for the following U.S. patent application(s), which are herein incorporated by reference in their entirety:

"Method and Apparatus For Frame-Based Search," filed 2008 Jul. 21 (y/m/d), having inventors Wei Li, Michael Jacob Osofsky and Lokesh Pooranmal Bajaj and application Ser. No. 12/177,122 ("the '122 Application");

"Method and Apparatus For Frame-Based Analysis of Search Results," filed 2008 Jul. 21 (y/m/d), having inventors Wei Li, Michael Jacob Osofsky and Lokesh Pooranmal Bajaj and application Ser. No. 12/177,127 ("the '127 Application"); and "Method and Apparatus For Automated Generation of Entity Profiles Using Frames," filed 2009 Jul. 20 (y/m/d), having inventors Wei Li, Michael Jacob Osofsky and Lokesh Pooranmal Bajaj and App. No. 61/227,068 ("the '068 Application").

CROSS REFERENCE TO RELATED APPLICATIONS

This application is related to the following U.S. patent application(s), which are herein incorporated by reference in their entirety:

the '122 Application;
the '127 Application; and
the '068 Application.

FIELD OF THE INVENTION

The present invention relates to automated analysis, of computer-accessible content, to produce demographic data regarding such content. More particularly, the present invention relates to the production of demographic data from the information upon which a search result is based.

BACKGROUND OF THE INVENTION

The product of a research project, whether performed by manual and/or automated means, can often be expressed as a "result" (or results), where each such result is supported by items drawn from the various content-sources searched. Herein, each result can be referred to as a "result-value" and the items supporting such result-value can be referred to as its "result-base." The pair, of a result-value and its result-base, can be referred to as a "result-pair."

Having obtained a result-value, there are many situations in which it is useful to know various demographics about its result-base. An example situation, where such demographics are often useful, is where the research product is a profile. If a collection of sought-for values (i.e., a collection of result-values) has been identified, where each relates back to a common entity (as used herein, an "entity" can refer to virtually anything, regardless of whether the item referred-to is completely abstract or more concrete), the collection can be referred-to as a "profile."

The utility of a "profile," for describing entities of various types, is well known: if there is a need to quickly obtain an understanding of a particular entity, the review of profile, if available, can be an extremely effective tool for doing so.

Some example profiles are as follows:

1. If the entity sought to be understood is a particular person, a "resume" is a well-known form of profile by which such understanding (at least for certain purposes, such as suitability for an employment position) can be obtained.
2. If the entity sought to be understood is a particular country or nation-state, an encyclopedia entry is a well-known form of profile for accomplishing this.

In general, the faster demographic data can be made available, regarding the result-bases forming the basis of a research project's product, the faster a productive use, of such research product, can be accomplished. Since automated (or largely automated) processes are, in general, faster than those that are manual (or largely manual), there is a need for tools that can automatically generate demographic data regarding such result-bases.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIG. 3A shows an example search result, for treatments to the condition "heart attack."

FIGS. 6A-C depict techniques for combining Confidence Distributions.

FIGS. 8A-C depict processing stages, at the snippet level, for the determination of an example healthcare-related search.

FIGS. 8D-F depict processing stages, at the instance level, for the determination of an example healthcare-related search.

FIG. 9A shows an example that permits one to see some of the snippets forming the basis of a role-value-oriented search result.

FIGS. 11A-D depict an example frame extraction rule for the Benefit Frame.

FIGS. 12A-D depict an example frame extraction rule for the Treatment Frame.

FIG. 16 presents an example pseudo-coded for performing Instance Merging.

FIG. 17 depicts an example pseudo-coded procedure for accomplishing Instance Selection.

DETAILED DESCRIPTION OF PREFERRED EMBODIMENTS

Figure 1A:
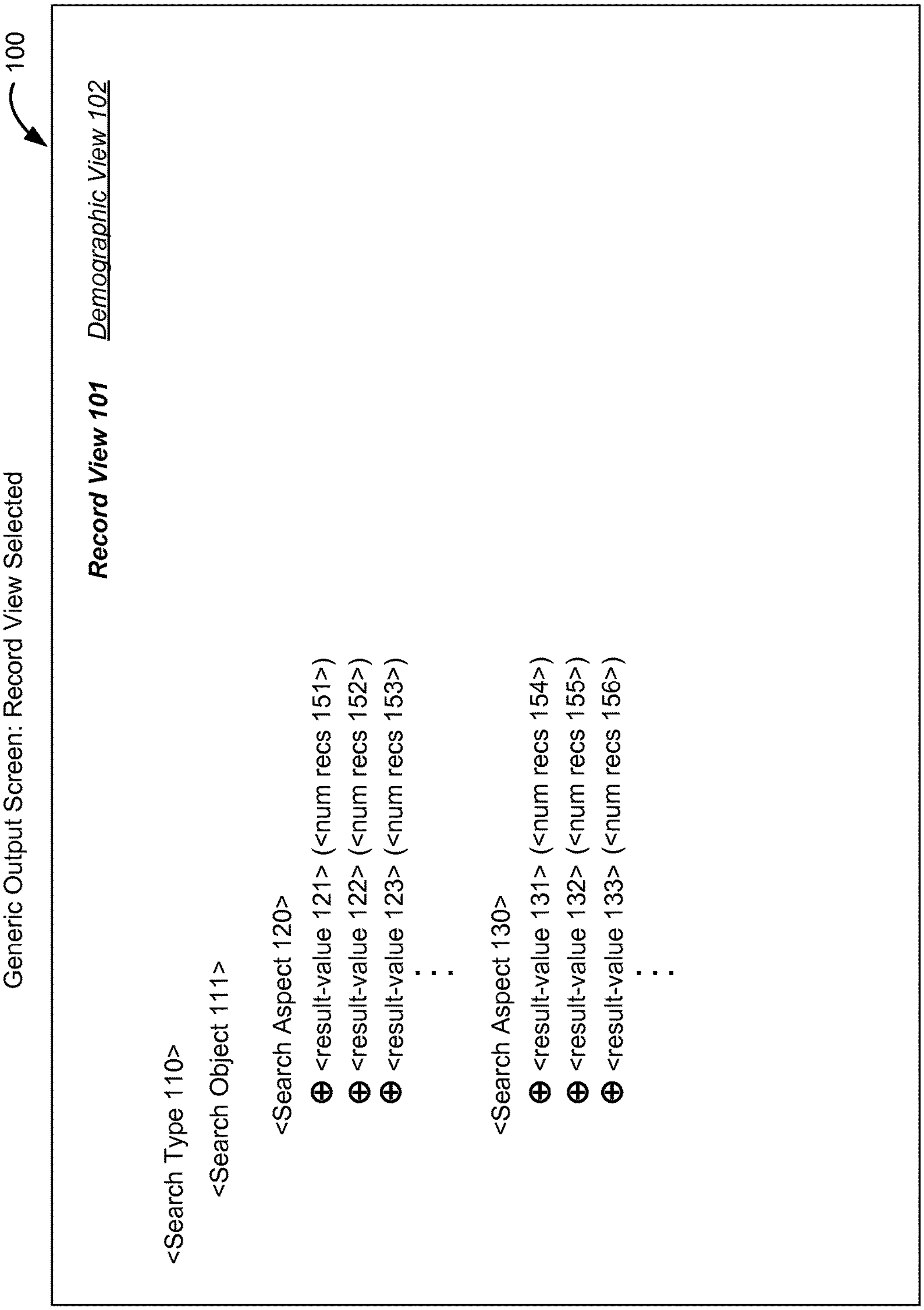
FIG. 1A presents an example computer screen on which is shown a generic search result.

Reference will now be made in detail to various embodiments of the invention, examples of which are illustrated in the accompanying drawings. Wherever possible, the same reference numbers will be used throughout the drawings to refer to the same or like parts.

Please refer to the Glossary of Selected Terms, included at the end of the Detailed Description, for the definition of selected terms used below.

TABLE OF CONTENTS TO DETAILED DESCRIPTION

1 Overview
2 Example Search Results
  2.1 Generic Search
  2.2 Technology Profiling
  2.3 Healthcare-related
  2.4 Brand Research
3 Determining Demographics
  3.1 Overview
  3.2 Confidence Distributions
  3.3 Combining Confidence Distributions
  3.4 Declarant Demographics
  3.4.1 Linguistic Clue
  3.4.2 Content Source Demographics
  3.4.3 Explicit Declarant Information
  3.4.4 Machine Learning
4 Frame-Based Demographics
  4.1 Technology Profiling
  4.1.1 Instance Generation and Merging
  4.1.2 Instance Selection
  4.2 Healthcare-related
  4.2.1 Overview
  4.2.2 Healthcare Frame Set
  4.2.3 Frame-based HRSE
  4.2.4 Example Instance Generation
  4.2.5 Example Instance Merging
  4.2.6 Example Instance Selection
  4.2.7 Example Result Presentation
  4.3 Brand Research
5 Frame-Based Search
  5.1 Overview
  5.1.1 Frames
  5.1.2 Frame Extraction Rules
  5.1.3 Frame-Based Search Engine
  5.2 Instance Generation
  5.2.1 Overview
  5.2.2 Pre-Query Processing
  5.2.3 Post-Query Processing
  5.3 Instance Merging
  5.3.1 General Description
  5.3.2 Pseudo-Code
  5.3.3 Matching Role Values
  5.4 Instance Selection
  5.5 Result Presentation
  5.5.1 Overview
  5.5.2 Role-Value Oriented Presentation
  5.5.3 Grouping by Role Value Type
  5.5.4 Grouping by Frame Type
6 Example Frame Sets
  6.1 Technology Profiling
  6.1.1 Overview
  6.1.2 Action-centric Type
  6.1.3 Relational Type
  6.1.4 Categorical Type
  6.2 Healthcare-related
  6.2.1 Overview
  6.2.2 Treatment Frame
  6.2.3 Cause Frame
  6.2.4 Effect Frame
  6.2.5 Pro Frame
  6.2.6 Con Frame
  6.3 Brand Research
7 Further Information
  7.1 Logical Form
  7.2 Frame Extraction Rules
  7.2.1 Overview
  7.2.2 Pseudo-Coded
  7.3 Features
  7.4 Snippet Formation
  7.5 Computing Environment
8 Glossary of Selected Terms
9 Summary

1 OVERVIEW

Section 2 presents some example products, of research projects, for which demographic data can be useful. In Section 3, several techniques for producing demographics, in an automated fashion, are presented. The techniques of Section 3 can be applied to a research product that has been produced by any technique, so long as the product satisfies the following two conditions:

1. It has been embodied as computer-accessible content, suitable for automated data processing.
2. It is organized in the form of result-pairs.

However, the techniques of Section 3 are particularly useful when applied to an automated frame-based approach and this type of approach is presented in Section 4.

2 EXAMPLE SEARCH RESULTS

This section presents the following four types of example search results for which demographic determination can be suitable:

1. generic search (introduces a format by which the other example search results can described);
2. Technology Profile;
3. Healthcare-related; and
4. Brand Research.

2.1 Generic Search

FIG. 1A presents an example computer screen 100, on which is shown a generic search result. The search result of screen 100 is hierarchically organized, where the highest level, called Search Type 110, indicates the basic type of search that has been performed. For each of Sections 2.2 to 2.4 below, one of each of the following example basic search types is discussed:

Technology Profile;
Healthcare-related; and
Brand Research.

Within a search type, Search Object 111 represents the particular query for which the search is performed. For each of Sections 2.2 to 2.4 below, its Search Object is, respectively:

"rechargeable cell" (i.e., the technology of the "rechargeable cell" is profiled);
"heart attack" (i.e., treatments are sought for the condition of "heart attack"); and
"Mouthwash XYZ" (i.e., a mouthwash brand, called "Mouthwash XYZ," is profiled).

A "Search Aspect" provides a category, under which a collection of result-values can be organized. FIG. 1A shows two example Search Aspects: 120 and 130. For each of Search Aspects 120 and 130, several result-values are shown (i.e., result-values 121-123 are shown under 120 and 131-133 are shown under 130). For each of Sections 2.2 to 2.4 below, some Search Aspects are, respectively:

"Sellers" and "Innovators" (i.e., with respect to "rechargeable cell" technology, specific sellers of it are organized under "Sellers" and specific innovators of the technology are organized under "Innovators");
"Treatments" (i.e., specific potential treatments, when one has the condition of "heart attack," are organized under "Treatments"); and
"Pros" and "Cons" (i.e., for the Mouthwash XYZ brand, with regard to users of the product, what they see as specific pros are organized under "Pros" and what they see as specific cons are organized under "Cons").

Screen 100 shows that there are two basic "modes" by which a search result can be displayed:

Record View 101; and
Demographic View 102.

Figure 1B:
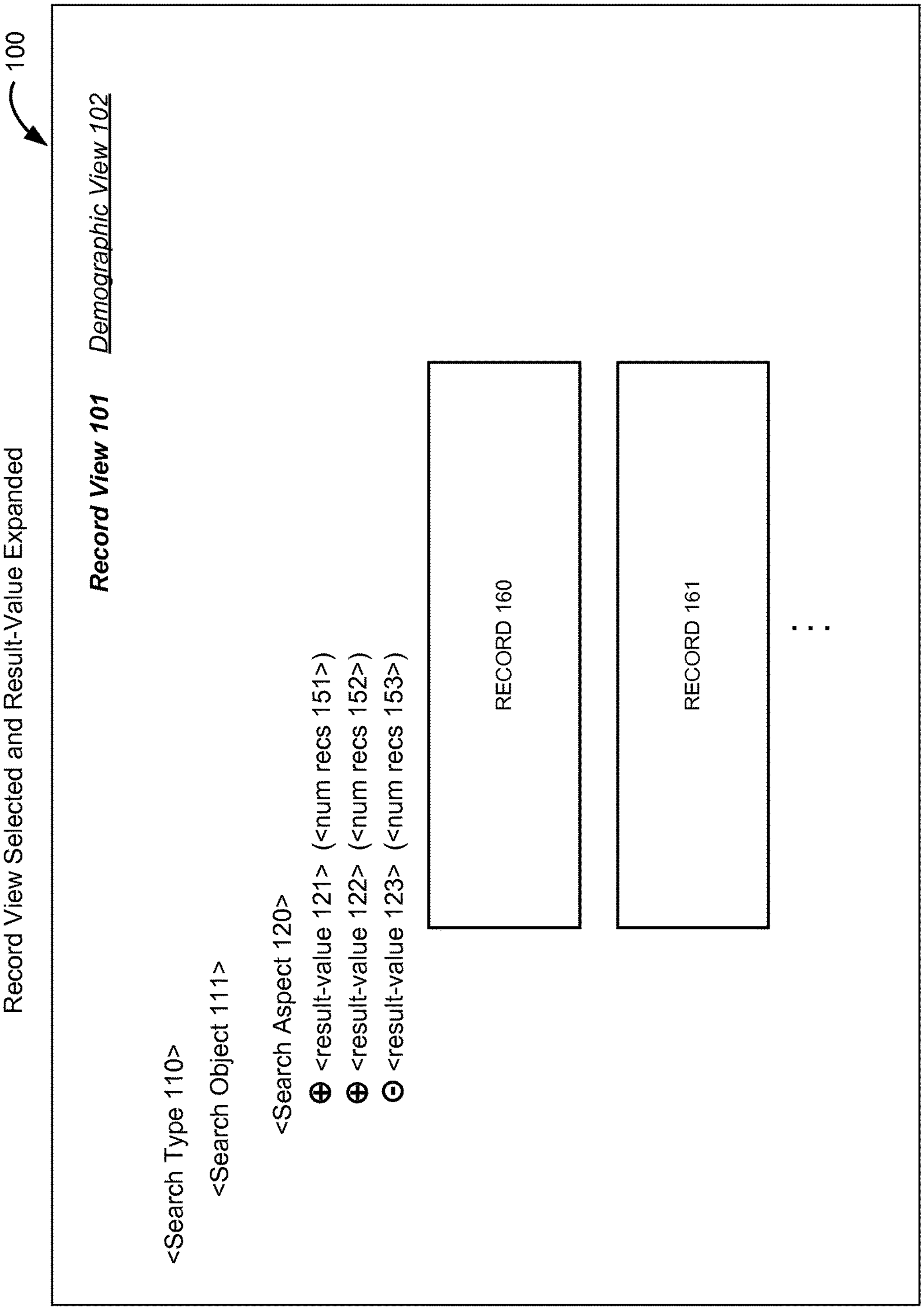
FIG. 1B shows an example expansion of a result-value of FIG. 1A.

In screen 100, Record View 101 has been selected. For each result-value shown, a number of records, of its corresponding result-base, can also be displayed. In FIG. 1A, for example, consider the display of result-value 121. To the right of it is shown, in parenthesis, the number of records in the result-base of result-value 121. This number of records is indicated, in FIG. 1A, as "num recs 151." For each result-value shown, a user-interface can also be provided by which the records, of a result-value's result-base, can be displayed. Continuing with example result-value 121, consider the "+" (plus) sign displayed to the left of 121. The plus sign indicates that the display of the result-value can be expanded, such that the records of its result-base are shown. FIG. 1B, in fact, shows an example expansion of result-value 123. Of the records in the result-base for result-value 123, FIG. 1B shows two of them: record 160 and record 161. To the left of result-value 123 is shown a "–" (minus) sign, indicating that the display of records can be hidden from view (or "contracted").

Figure 1C:
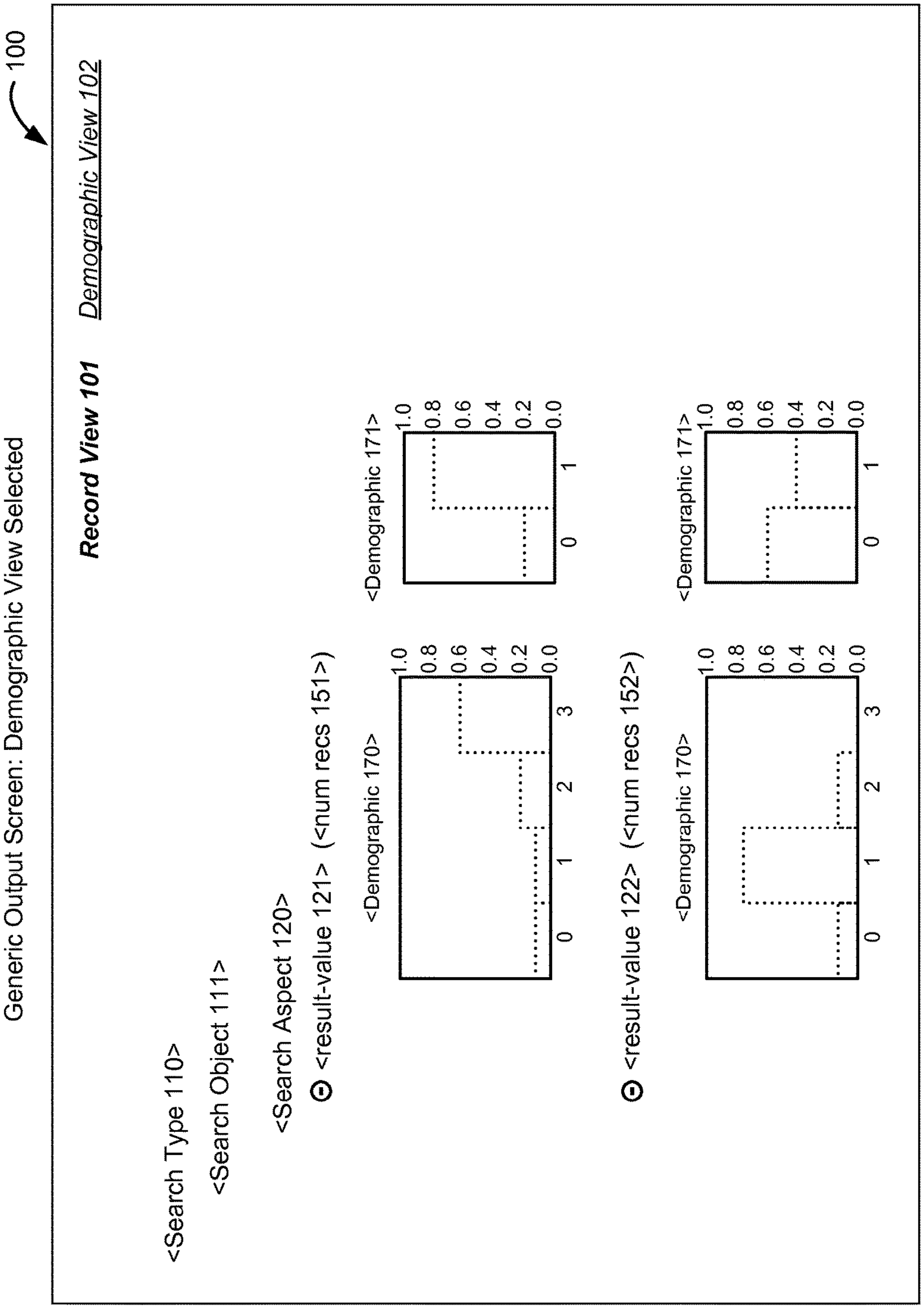
FIG. 1C is intended to show the same search results of FIG. 1A, except that a Demographic View is selected.

FIG. 1C is intended to show the same search results of FIG. 1A, except that Demographic View 102 has been selected. Further, result-values 121 and 122, of FIG. 1C, have already been selected for expansion so that the demographic data of each can be seen. For each of result-values 121 and 122, the following two demographic characteristics are shown:

Demographic 170 and
Demographic 171.

A definition, of a demographic, is given below in the Glossary of Selected Terms. The particular form of data display, used for the demographics of FIG. 1C, are only for purposes of example. Any suitable technique, from the art of data display and/or data visualization, can be used to present the demographics. The type of demographic data display used in FIG. 1C is presented in more detail in Section 5.1 below ("Applicability Distributions") as well as in Section 3 ("Determining Demographics").

Figure 1D:
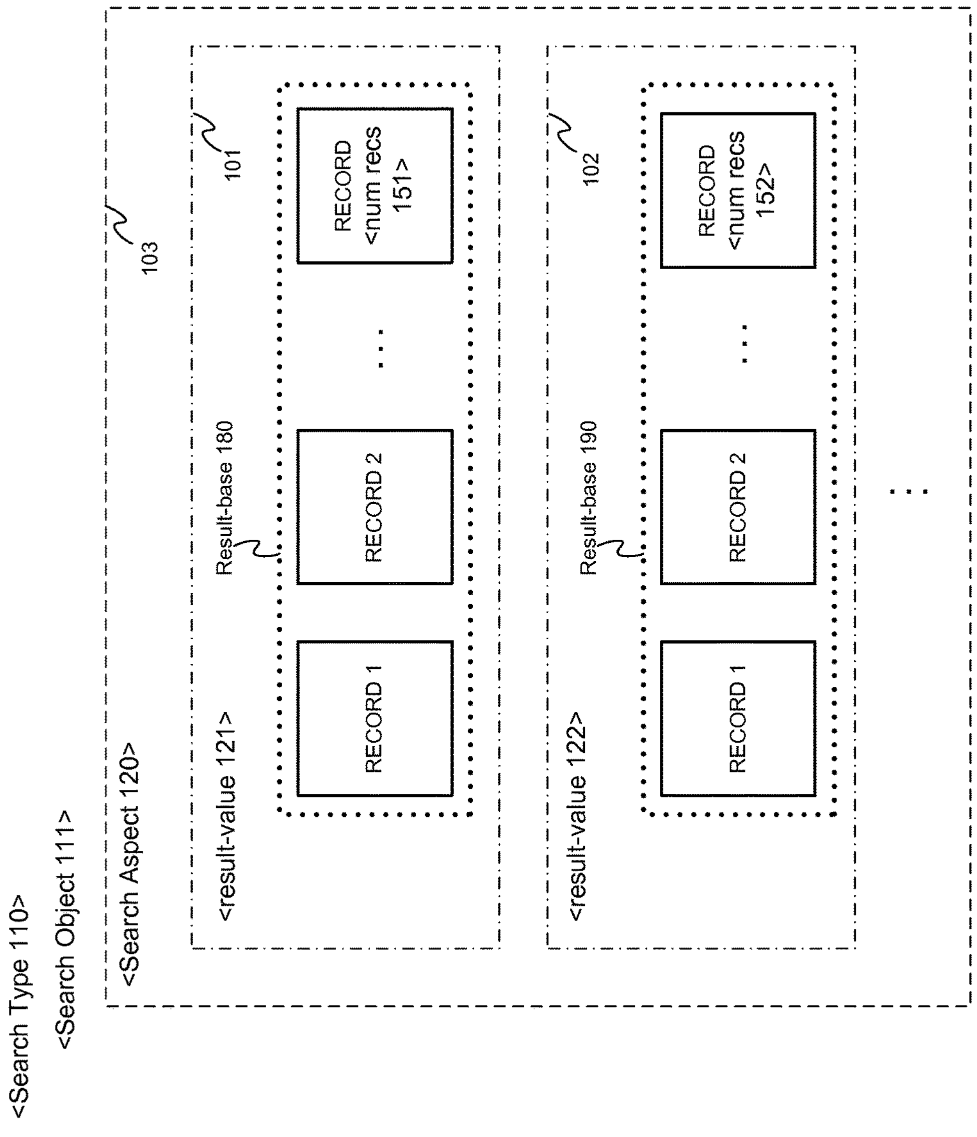
FIG. 1D shows an example data organization, upon which the results of FIGS. 1A-1C can be based.

FIG. 1D shows an example data organization, upon which the results of FIGS. 1A-1C can be based. FIG. 1D is intended to most directly support FIG. 1C. As can be seen, Search Aspect 120 of FIG. 1C corresponds to data grouping 103 (see dashed outline 103) in FIG. 1D. In addition to containing Search Aspect 120 itself, data grouping 103 is depicted as containing data groupings 101 and 102 (see dashed outlines 101 and 102). Data groupings 101 and 102 each represents a result-pair, since each contains a result-value and its result-base.

Specifically, data grouping 101 contains result-value 121 and result-base 180. Result-value 121, in FIG. 1C, is depicted as being based upon the following number of records: <num recs 151>. As can be seen, the records of result-base 180 are enumerated by starting at 1 (for the leftmost record) and continuing up to <num recs 151>.

Data grouping 102 contains result-value 122 and result-base 190. Result-value 122, in FIG. 1C, is depicted as being based upon the following number of records: <num recs 152>. As can be seen, the records of result-base 190 are enumerated by starting at 1 (for the leftmost record) and continuing up to <num recs 152>.

2.2 Technology Profiling

The production of a profile, regarding a technology, can be useful as part of a technology scouting project. In technology scouting, a technology searcher begins with a problem (call it, in general, "P_1") and looks for an existing technology (call it, in general, an "ET_1") to solve or otherwise address P_1. If a technology search process (such as the search techniques discussed in the '122 and '127 Applications) has identified a candidate ET_1, a further evaluation, of the suitability of applying ET_1 to P_1, can be aided by having a profile of ET_1 (where the profile can be produced with the techniques of the '068 Application). If the technology searcher knows the demographics, of each result-base of the profile, the profile can be more useful to the evaluation of ET_1.

Figure 2A:
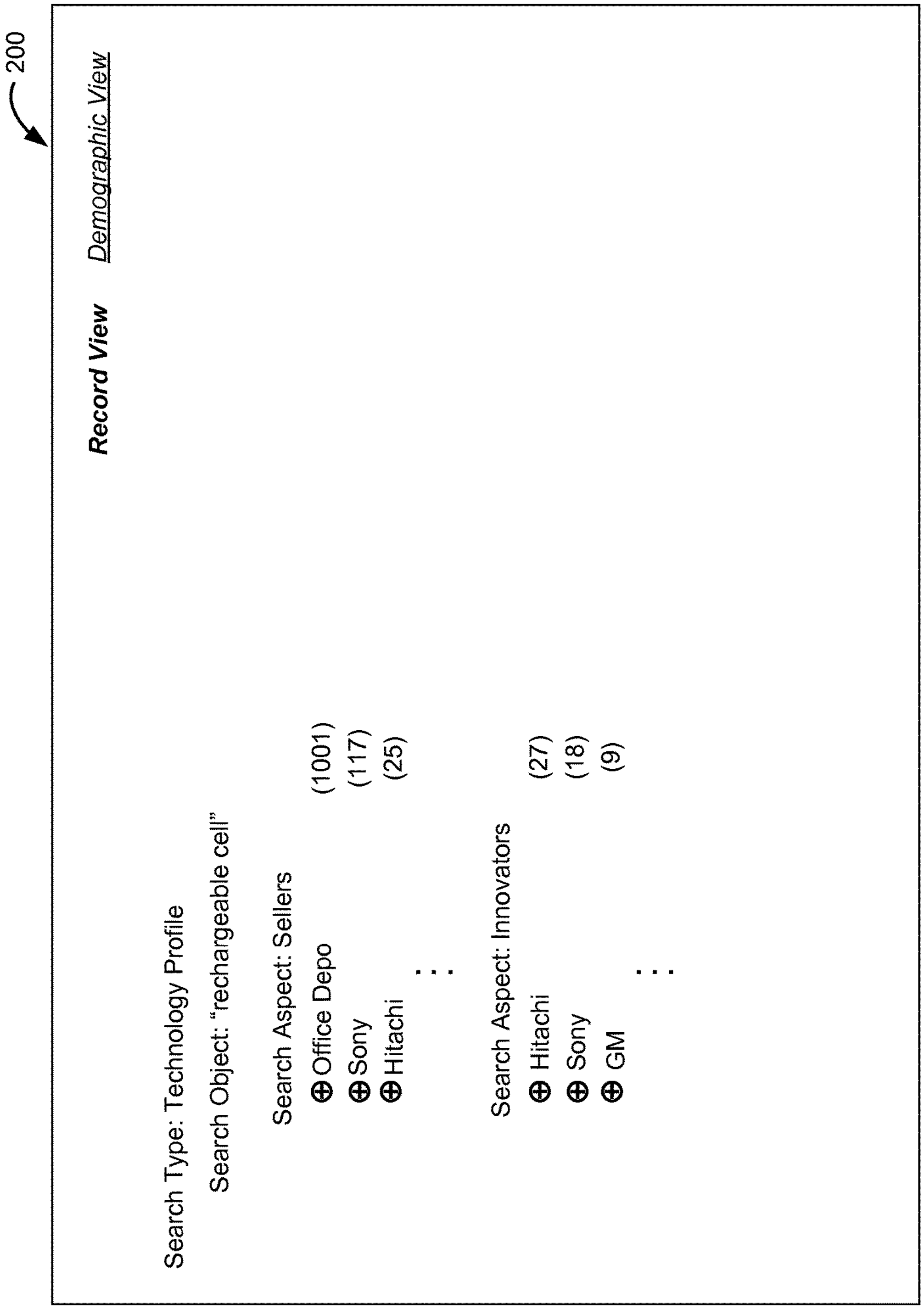
FIG. 2A shows a screen where part of a profile, for the technology "rechargeable cell," is shown.

FIGS. 2A-2D present an example technology profile that is similar to those discussed in the '068 Application, but is supplemented with demographic information. Each of FIGS. 2A-2D corresponds to FIGS. 1A-1D. FIG. 2A shows a screen 200 where part of a profile, for the technology "rechargeable cell," is shown. In particular, two aspects of rechargeable cells are shown:

- entities that have been identified as "sellers" of the technology (i.e., Office Depo, Sony and Hitachi) and
- entities that have been identified as "innovating" the technology (i.e., Hitachi, Sony and GM).

Figure 2B:
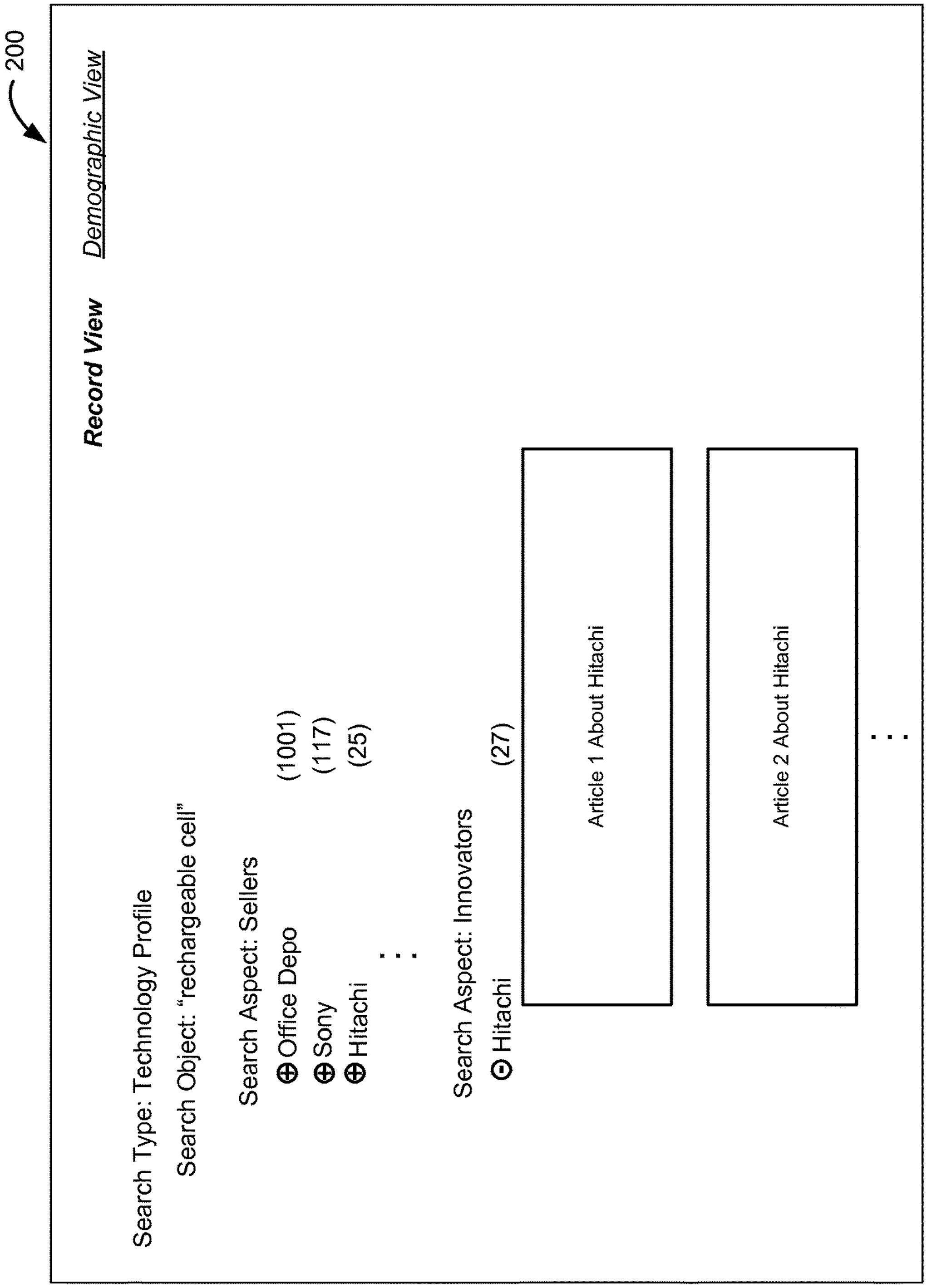
FIG. 2B is a record view that presents the same profile as FIG. 2A, except that an innovator has been expanded.

FIG. 2B is a record view that presents the same profile as FIG. 2A, except that the innovator Hitachi has been expanded, such that some of the records, upon which the identification of Hitachi is based, are shown. In FIG. 2B, only the first two records, of the 27 records upon which Hitachi is based, are shown. The records on Hitachi are referred-to as being "articles," but any appropriate information source can be displayed.

Figure 2C:
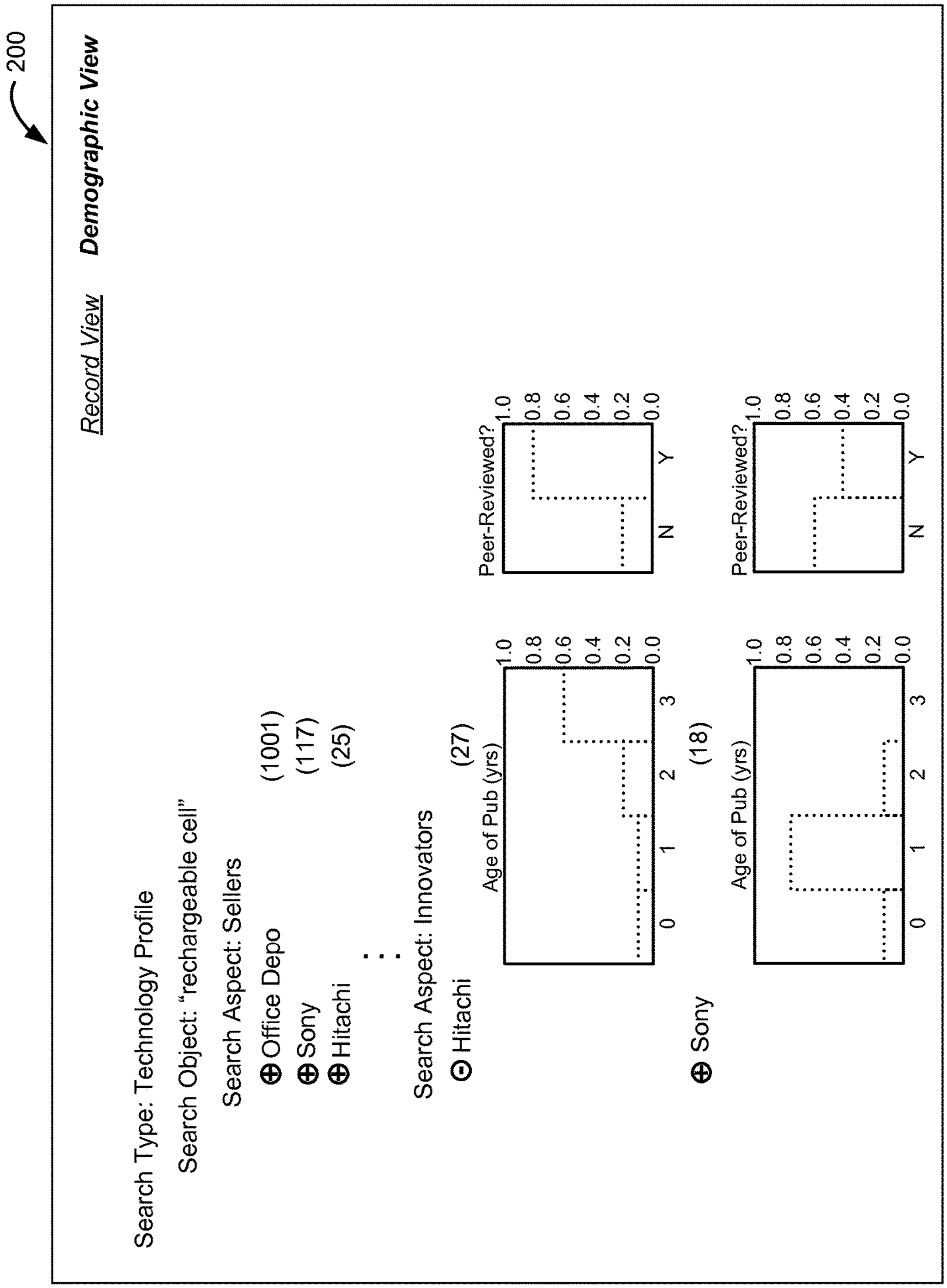
FIG. 2C shows information regarding the same profile of FIGS. 2A-2B, except that a Demographic View is selected.

FIG. 2C shows information regarding the same profile of FIGS. 2A-2B, except that now a "Demographic View" has been selected. Further, result-values "Hitachi" and "Sony," for the aspect of innovators, have already been selected for expansion so that the demographic data of each can be seen. For each of result-values "Hitachi" and "Sony," the following two demographic characteristics are shown:

Age of Pub (yrs) and

Peer-Reviewed?

Definitions, respectively, for each of these demographic characteristics are as follows:

- For each item of a result-base, its year of "publication" (or year of general accessibility) is determined. A count is tallied for the number of items published in the current year, and in each of the 3 prior years. The four counts are then normalized, such that each is a number in the range 0.0-1.0 and the sum of the counts equal 1.0.
- For each item of a result-base, a determination is made as to whether it was published in a peer-reviewed journal. A count is tallied for the number of items published in a peer-reviewed journal and the number of items not published in a peer-reviewed journal. The two counts are then normalized, such that each is a number in the range 0.0-1.0 and the sum of the counts equal 1.0.

A brief discussion, of how the demographics depicted in FIG. 2C can be helpful to understanding the Technology Profile, follows. The Technology Profile produced has identified both Hitachi and Sony as innovators of rechargeable cells. The demographics, however, show that there are differences:

- Over the period of the current year and three years prior, Hitachi's publications are weighted towards three years prior (at 0.6 or 60%) while Sony's are most heavily weighted towards the prior year (at 0.8 or 80%).
- While Hitachi's publications on the subject are older, they are heavily weighted at being peer-reviewed publications (at 0.8 or 80%) while most of Sony's publications are not peer-reviewed (at 0.6 or 60%).

Figure 2D:
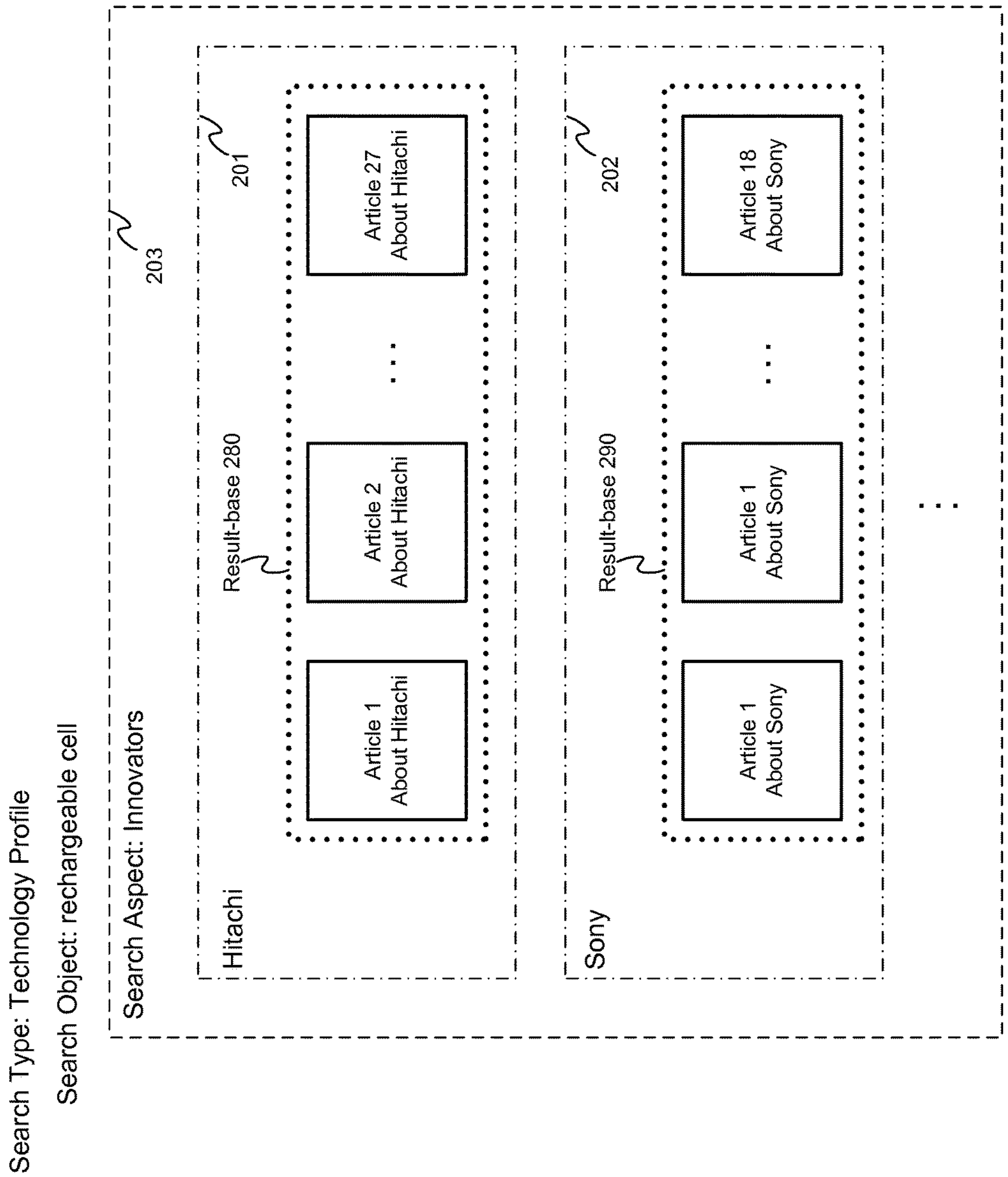
FIG. 2D shows an example data organization, upon which the results of FIGS. 2A-2C can be based.

FIG. 2D shows an example data organization, upon which the results of FIGS. 2A-2C can be based. FIG. 2D is intended to most directly support FIG. 2C. As can be seen, the "Innovators" Search Aspect of FIG. 2C corresponds to data grouping 203 (see dashed outline 203) in FIG. 2D. In addition to containing the "Innovators" Search Aspect itself, data grouping 203 is depicted as containing result-pairs 201 and 202 (see dashed outlines 201 and 202).

Specifically, result-pair 201 contains result-value "Hitachi" and result-base 280. Result-pair 202 contains result-value "Sony" and result-base 290. As can be seen, the records of result-base 280 are enumerated by starting at 1 (for the leftmost record) and continuing up to 27. The records of result-base 290 are enumerated by starting at 1 (for the leftmost record) and continuing up to 18.

2.3 Healthcare-Related

Healthcare-related content is a knowledge domain that is of both great importance and vast size. Items sought-for, in a healthcare-related search, can include the following: a treatment for a condition, the causes and/or complications of a condition and the pros and/or cons of a treatment. For a set of records (the result-base) identified as addressing any of these sought-for items (the result-value), understanding the result-base's demographics can be useful.

An example search result, for treatments to the condition "heart attack," is shown in FIG. 3A. For ease of organization, the treatments shown are divided into three sub-types:

1. Drugs and Medications
2. Food and Plants
3. Other Treatments

Figure 3B:
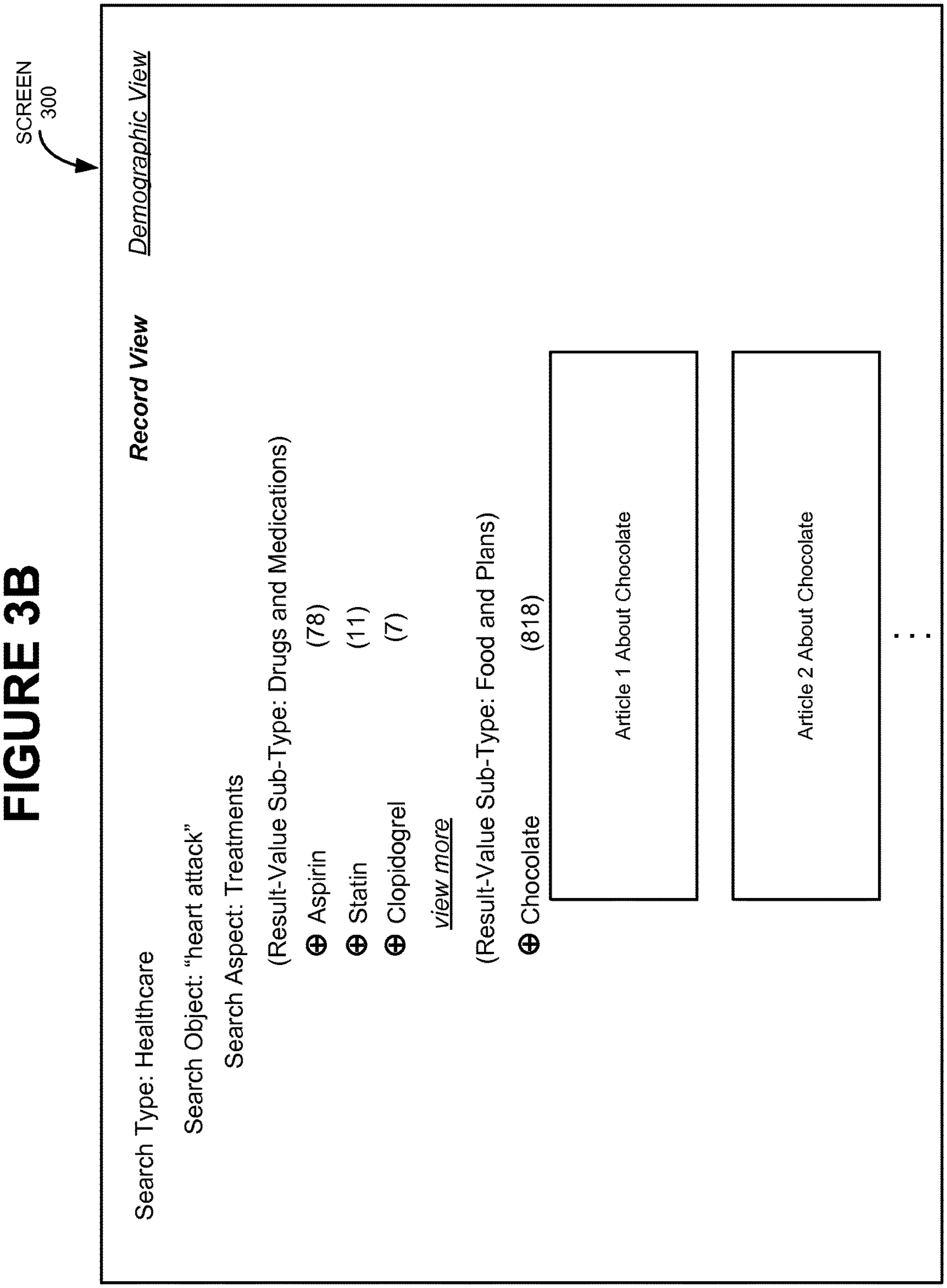
FIG. 3B is a record view of the same profile shown in FIG. 3A, except that the a treatment has been expanded.

FIG. 3B is a record view of the same profile shown in FIG. 3A, except that the treatment "Chocolate" (under the Food and Plants sub-type) has been expanded, such that some of the records, upon which the identification of Chocolate is based, are shown. In FIG. 3B, only the first two records, of the 818 records upon which Chocolate is based, are shown. The records regarding "Chocolate" are referred-to as being "articles," but any appropriate information source can be displayed.

Figure 3C:
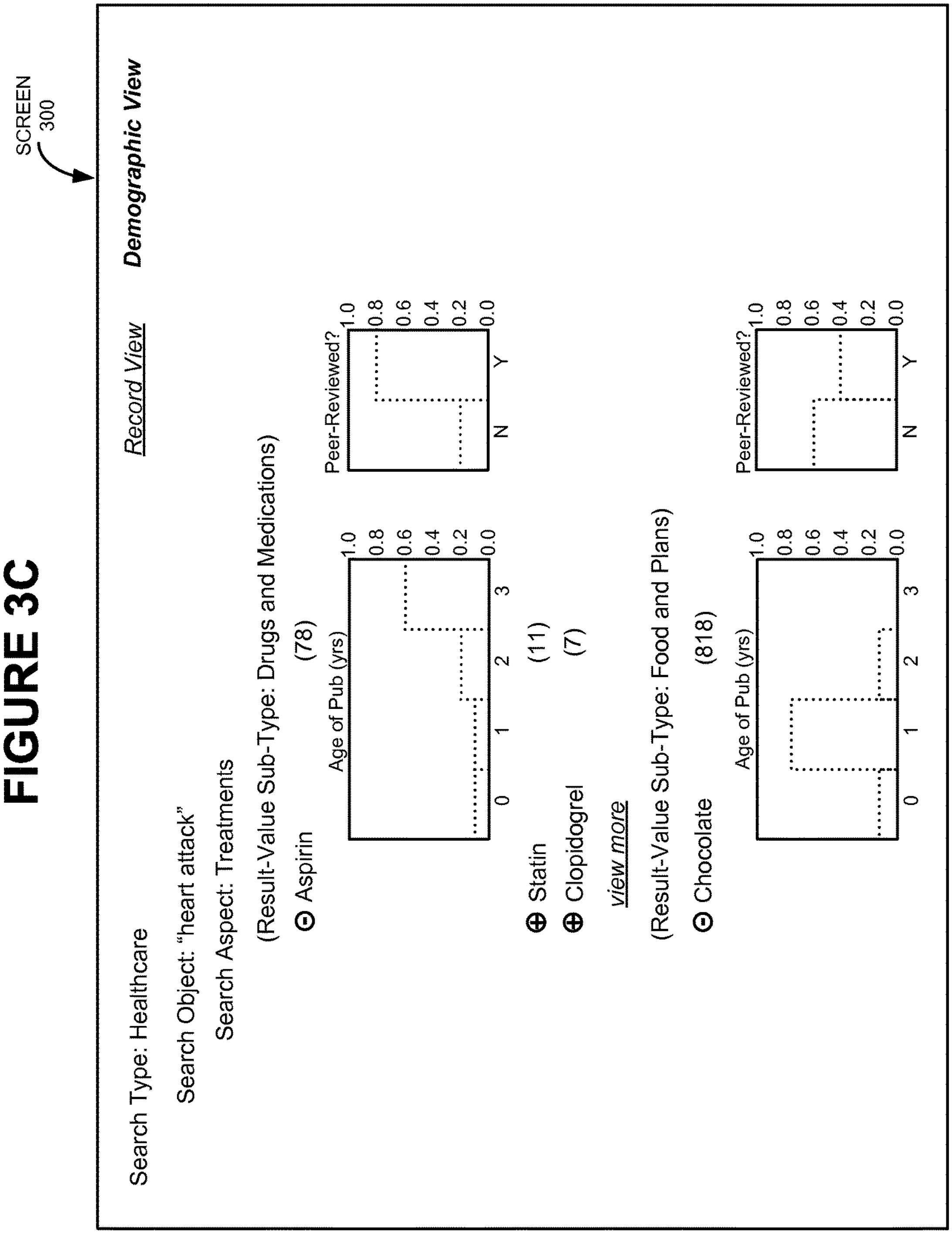
FIG. 3C shows information regarding the same search result as FIGS. 3A-3B, except that a Demographic View is selected.

FIG. 3C shows information regarding the same search result as FIGS. 3A-3B, except that now a "Demographic View" has been selected. Further, result-values "Aspirin" (under the Drugs and Medications sub-type) and "Chocolate" have already been selected for expansion so that the demographic data of each can be seen. For each of result-values "Aspirin" and "Chocolate," the following two demographic characteristics are shown:

Age of Pub (yrs) and

Peer-Reviewed?

These demographic characteristics are the same as those discussed above for a Technology Profile search. Therefore, please refer to Section 2.2 for definitions of them.

A brief discussion, of how the demographics depicted in FIG. 3C can be helpful to understanding the Healthcare-related search, follows. The Healthcare-related search has identified both Aspirin and Chocolate as potential treatments for a heart attack. The demographics, however, show that there are differences:

- Over the period of the current year and three years prior, publications about Aspirin are weighted towards three years prior (at 0.6 or 60%) while publications about Chocolate are most heavily weighted towards the prior year (at 0.8 or 80%).
- While publications about Aspirin are older, they are heavily weighted at being peer-reviewed publications (at 0.8 or 80%) while most of the publications about Chocolate are not peer-reviewed (at 0.6 or 60%).

Figure 3D:
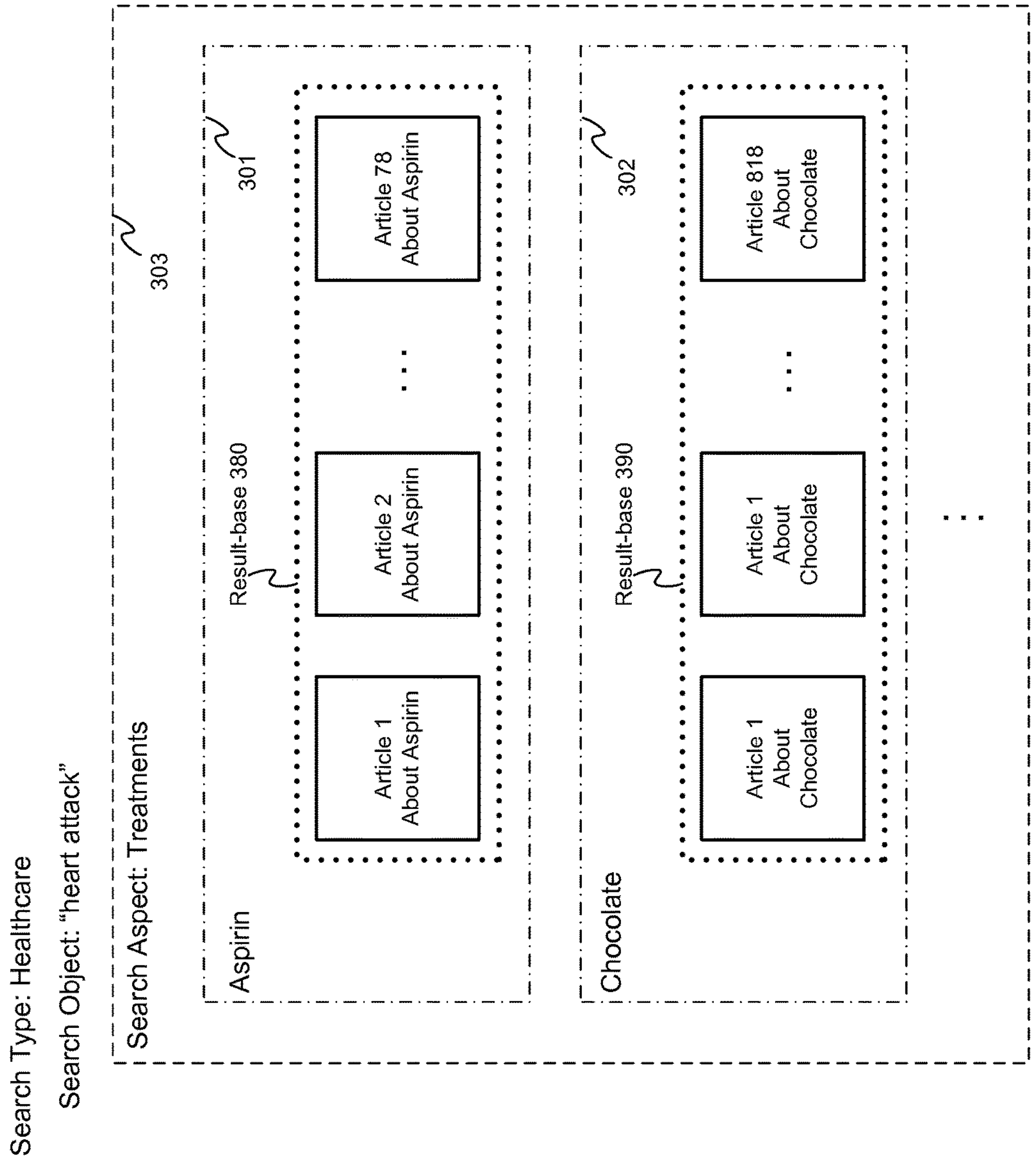
FIG. 3D shows an example data organization, upon which the results of FIGS. 3A-3C can be based.

FIG. 3D shows an example data organization, upon which the results of FIGS. 3A-3C can be based. FIG. 3D is intended to most directly support FIG. 3C. As can be seen, the "Treatments" Search Aspect of FIG. 3C corresponds to data grouping 303 (see dashed outline 303) in FIG. 3D. In addition to containing the "Treatments" Search Aspect itself, data grouping 303 is depicted as containing result-pairs 301 and 302 (see dashed outlines 301 and 302).

Specifically, result-pair 301 contains result-value "Aspirin" and result-base 380. Result-pair 302 contains result-value "Chocolate" and result-base 390. As can be seen, the records of result-base 380 are enumerated by starting at 1 (for the leftmost record) and continuing up to 78. The records of result-base 390 are enumerated by starting at 1 (for the leftmost record) and continuing up to 818.

2.4 Brand Research

A professional of marketing research is constantly seeking to better understand the perception of brands, as seen by members of a relevant market. As part of achieving this, a set of records (i.e., a result-base) can be identified as addressing an important characteristic (i.e., a result-value) of a brand. In a manner similar to that discussed above for a Technology Profile, a collection of result-pairs (each addressing a distinct but important characteristic) can be determined and the results presented in the form of a Brand Profile.

Once a Brand Profile has been determined, a next task can be to better understand the market members responsible for the result-value. Demographics can be very useful to achieving this goal.

Figure 4A:
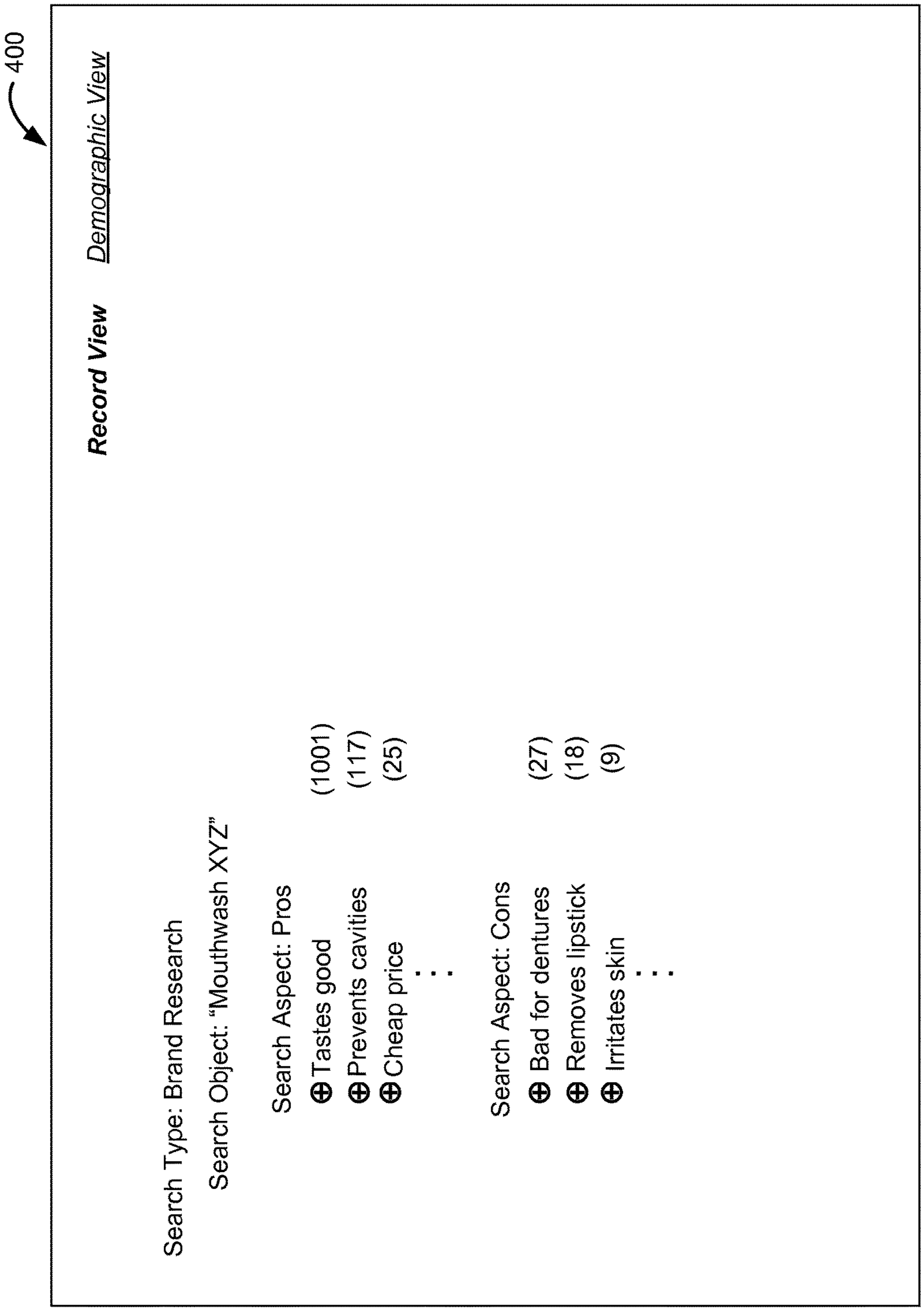
FIG. 4A shows a screen where part of a profile for a mouthwash brand is shown.

FIG. 4A shows a screen 400 where part of a profile, for the mouthwash brand "Mouthwash XYZ," is shown. In particular, two aspects of Mouthwash XYZ are shown:

- Characteristics that market members have identified as "pros" of Mouthwash XYZ (i.e., "tastes good," "prevents cavities" and "cheap price") and
- Characteristics that market members have identified as "cons" of Mouthwash XYZ (i.e., "bad for dentures," "removes lipstick" and "irritates skin").

Figure 4B:
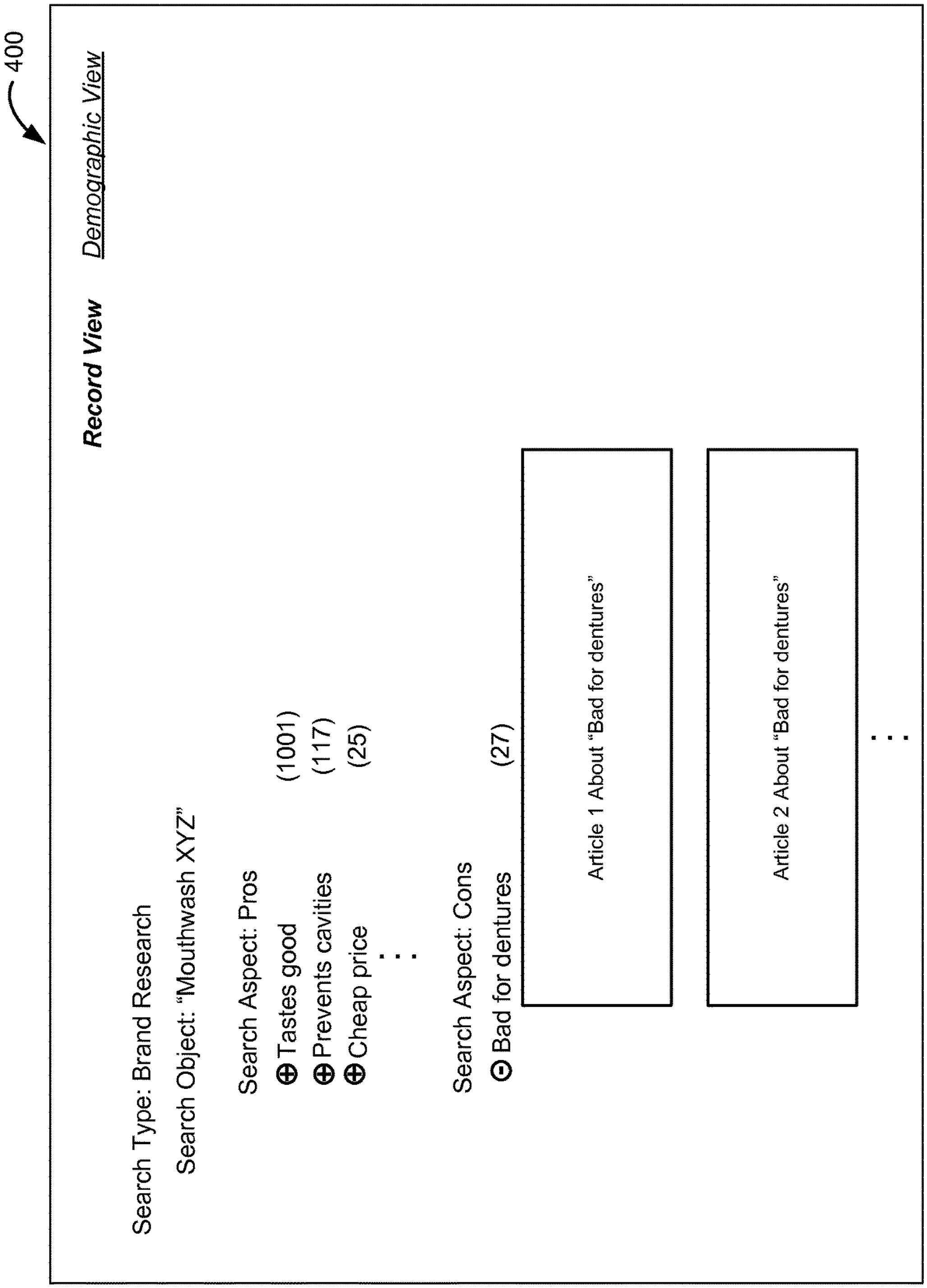
FIG. 4B is a record view that presents the same profile as FIG. 4A, except that a con has been expanded.

FIG. 4B is a record view that presents the same profile as FIG. 4A, except that the con "bad for dentures" has been expanded, such that some of the records, upon which the identification of "bad for dentures" is based, are shown. In FIG. 4B, only the first two records, of the 27 records upon which "bad for dentures" is based, are shown. The records on "bad for dentures" are referred-to as being "articles," but any appropriate information source can be displayed.

Figure 4C:
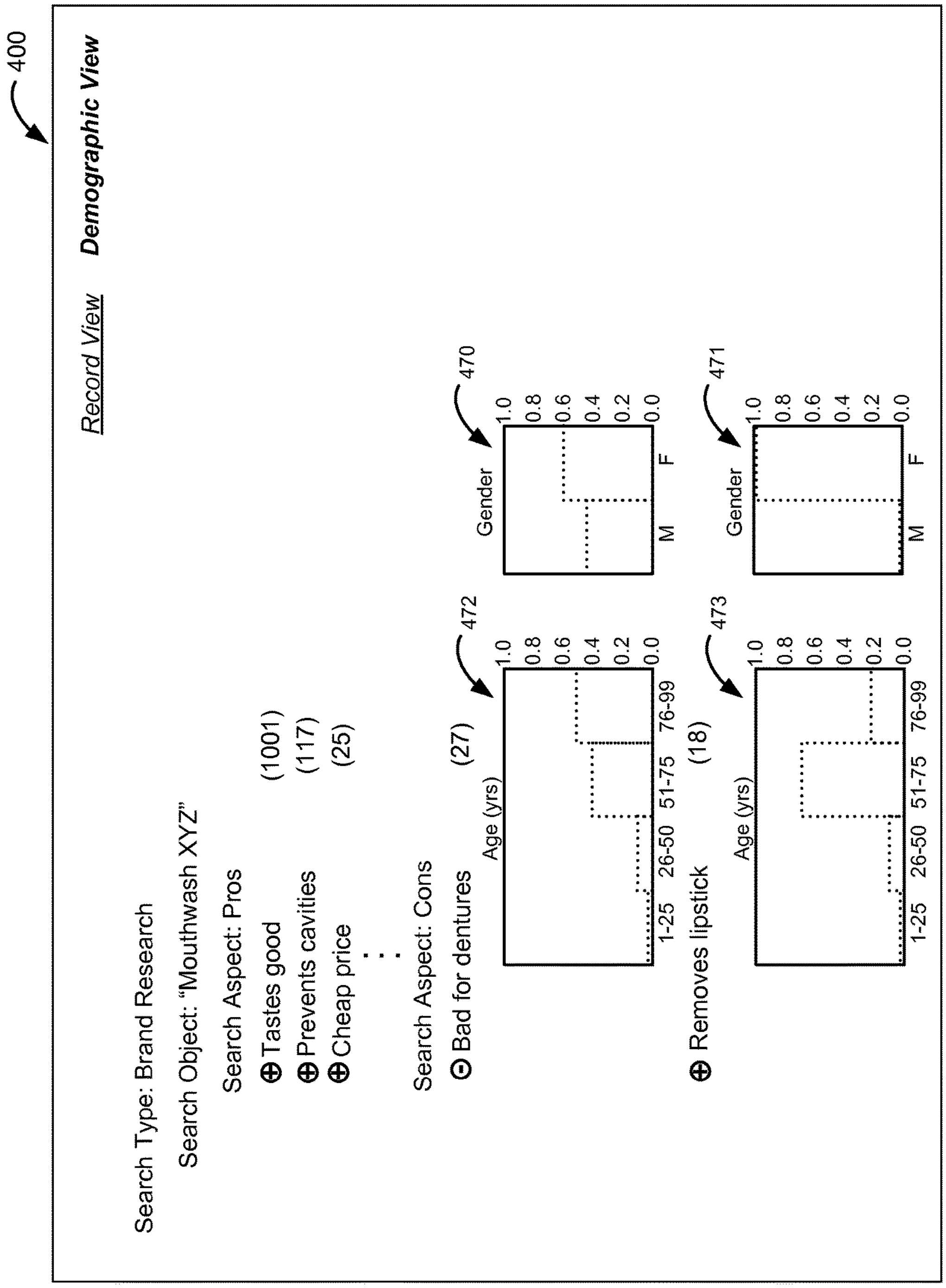
FIG. 4C shows information regarding the same profile of FIGS. 4A-4B, except that a Demographic View is selected

FIG. 4C shows information regarding the same profile of FIGS. 4A-4B, except that now a "Demographic View" has been selected. Further, result-values "bad for dentures" and "removes lipstick," for the aspect of cons, have already been selected for expansion so that the demographic data of each can be seen. For each of result-values "bad for dentures" and "removes lipstick," the following two demographic characteristics are shown:

- Age (yrs) and
- Gender

Definitions, respectively, for each of these demographic characteristics are as follows:

- For each item of a result-base, the age of its "Declarant" (see below Glossary of Selected Terms for definition) is determined. A count is tallied for the number of items whose Declarants fit into one of four age ranges. The four counts are then normalized, such that each is a number in the range 0.0-1.0 and the sum of the counts equal 1.0. The four age ranges are:
  - 1-25
  - 26-50
  - 51-75
  - 76-99
- For each item of a result-base, a determination is made as to the gender (Male or Female) of its Declarant. A count is tallied for the number of items with a Male Declarant and the number of items with a Female Declarant. The two counts are then normalized, such that each is a number in the range 0.0-1.0 and the sum of the counts equal 1.0.

A brief discussion, of how the demographics depicted in FIG. 4C can be helpful to understanding the Brand Profile, follows. The Brand Profile produced has identified both "bad for dentures" and "removes lipstick" as cons of the mouthwash brand Mouthwash XYZ. The demographics, however, show that there are differences:

- "bad for dentures" is a con that is heavily weighted towards both the older age groups (0.5 or 50% for 76-99 and 0.4 or 40% for 51-75) while "removes lipstick" is heavily weighted towards just the second oldest age group (at 0.7 or 70% for 51-75).
- "bad for dentures" is a con that is important for both Males (0.4 or 40%) and Females (0.6 or 60%) while "removes lipstick" is much more important to Females (1.0 or 100%) than Males (0.0 or 0%).

Figure 4D:
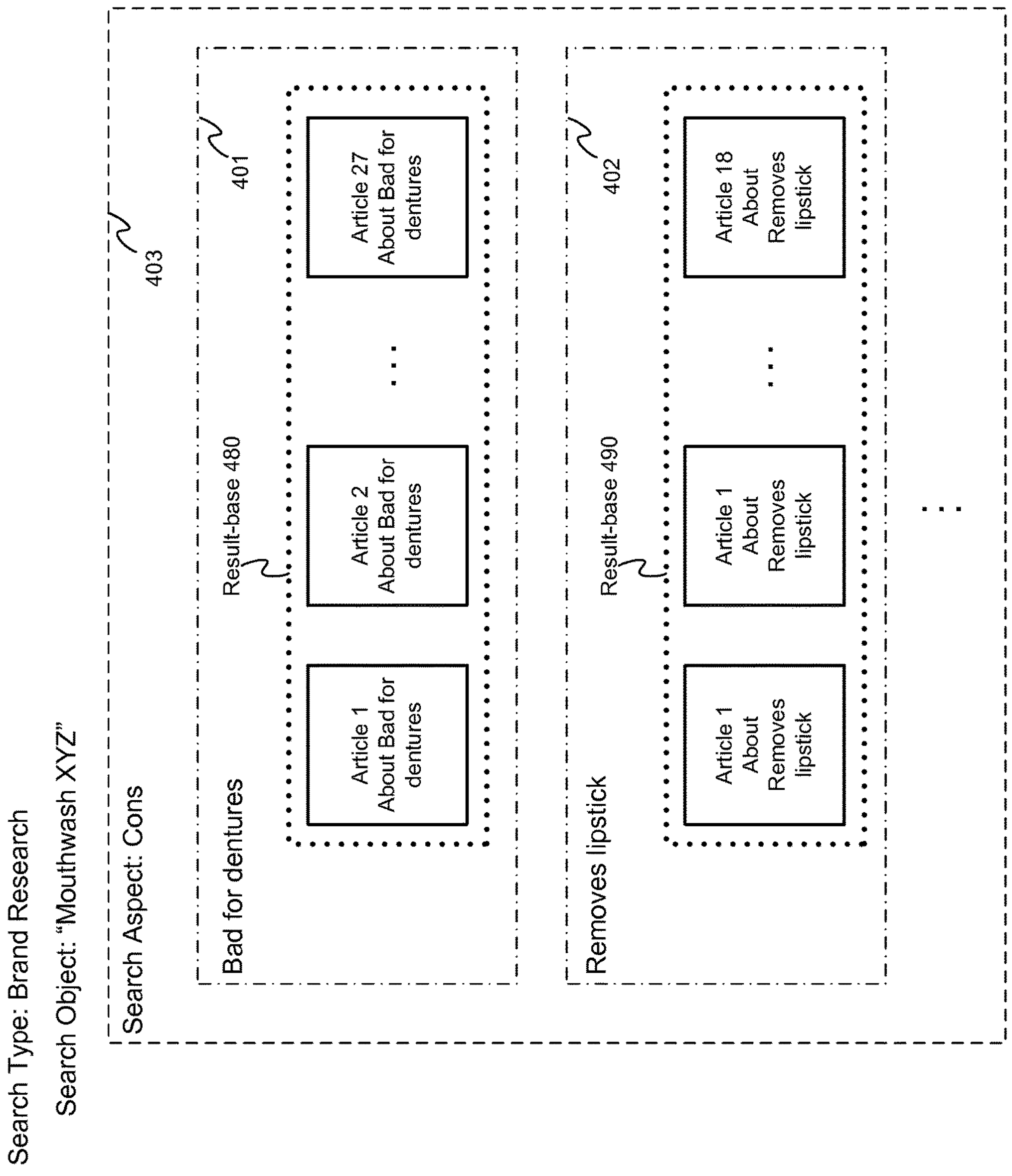
FIG. 4D shows an example data organization, upon which the results of FIGS. 4A-4C can be based.

FIG. 4D shows an example data organization, upon which the results of FIGS. 4A-4C can be based. FIG. 4D is intended to most directly support FIG. 4C. As can be seen, the "Cons" Search Aspect of FIG. 4C corresponds to data grouping 403 (see dashed outline 403) in FIG. 4D. In addition to containing the "Cons" Search Aspect itself, data grouping 403 is depicted as containing result-pairs 401 and 402 (see dashed outlines 401 and 402).

Specifically, result-pair 401 contains result-value "bad for dentures" and result-base 480. Result-pair 402 contains result-value "removes lipstick" and result-base 490. As can be seen, the records of result-base 480 are enumerated by starting at 1 (for the leftmost record) and continuing up to 27. The records of result-base 490 are enumerated by starting at 1 (for the leftmost record) and continuing up to 18.

3 DETERMINING DEMOGRAPHICS 3.1 Overview

Having introduced the utility of demographics, for several example research projects, this Section addresses techniques for determining such demographics. Section 3.2 introduces "Confidence Distributions" as a way of representing the application of a demographic characteristic, both at the level of an individual record and for summarizing a population (or result-base) of records. Section 3.3 addresses techniques for combining Confidence Distributions. This is particularly useful for determining the summarizing Confidence Distribution of a population, since it can be produced by combining the Confidence Distributions produced for each individual record. Section 3.4 discusses types of demographic characteristics, and ways in which such demographic characteristics can be determined.

3.2 Confidence Distributions

Determination of a demographic characteristic "DC_1," with respect to a population "P_1," involves at least the following two levels of determination:

1. Individual Member: For each member "M_1" (such as a record) of P_1, the applicability of DC_1 needs to be determined.
2. Whole Population: The applicability of DC_1, to each of its members, needs to be summarized for P_1 as a whole.

At the Individual Member level, two main types of results, of applying a demographic characteristic DC_1 to a population member M_1, are addressed:

1. Total Certainty: DC_1 assigns a single value "V_1," from its range of potential values, to M_1. Such an assignment can also be regarded as a classification of M_1, as being of a type V_1. Such assignment or classification is treated as being totally reliable, and the user is not aware of there being (or is not interested in modeling) any uncertainty in the result.
2. Partial Certainty: DC_1 assigns one or more values, from its range of potential values, to M_1. Under these circumstances, each assignment of (or classification with) a value is treated as having a level "confidence"

associated with it. Such "confidence levels" can also be referred to as levels of certainty or probability.

Total Certainty can be regarded as a sub-variety of Partial Certainty, where the following two limitations apply:

1. DC_1 assigns only one value to M_1; and
2. The assignment has a 100% confidence level.

Summarization of the demographic characteristic, at the Whole Population level, depends upon whether individual members of the population have been assigned values with Total or Partial Certainty.

With Total Certainty at the member level, a population can be summarized with a histogram: for each value, from the range of potential values, the number of members assigned such value can be provided. If desired, the histogram can be normalized, so that each value is assigned a number in the range of 0.0 to 1.0 and the assigned numbers sum to 1.0.

Figure 5A:
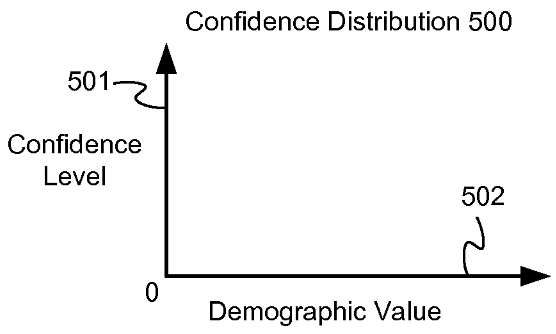
FIGS. 5A-C depict Confidence Distributions.

With Partial Certainty at the member level, summarization for the population is more complex. FIG. 5A depicts an example representation (any suitable representation can be used) for the application of a demographic characteristic DC_1 to a member M_1 (where M_1 is from a population P_1). FIG. 5A can be referred to herein as a "Confidence Distribution" (or "CD") and is comprised of two axes:

Axis 502 that represents the range of values that DC_1 can assign to a member M_1.

Axis 501 that represents a level of confidence (or certainty or probability) with which each value of Axis 502 is assigned to M_1.

If desired, the confidence levels can be normalized such that they all fit within a predetermined range, such as 0.0 to 1.0 (in the manner of probabilities) or 0.0 to 100.0 (like percentages), and the sum of the confidence levels typically equals (but does not exceed) the maximum value of the range.

Figure 5B:
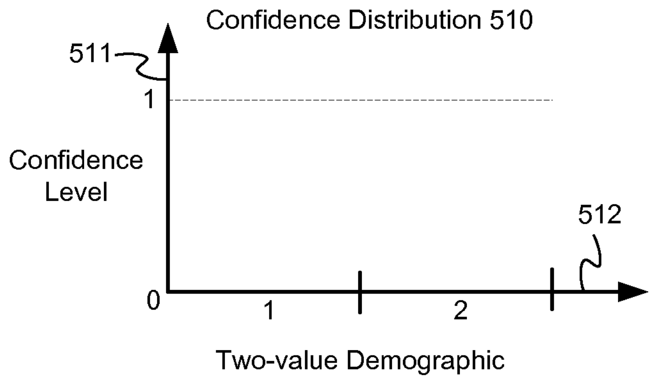

FIG. 5B depicts an example Confidence Distribution 510, where the demographic characteristic has just two values ("1" or "2") that it can assign to a member M_1. The confidence level, with which each value is determined applicable to M_1, is limited to the range 0.0 to 1.0. An example use, of a two-value Confidence Distribution, is presented in Section 1.4 ("Brand Research"). In Section 1.4, the examples address the gender of the Declarants of a population (or result-base) of records, rather than an individual record. The examples of Section 1.4 are illustrated in FIG. 4C and are identified as follows:

Confidence Distribution 470: for the result-value "Bad for dentures"

Confidence Distribution 471: for the result-value "Removes lipstick"

Each of these Confidence Distributions, however, can be interpreted, with respect to a single record, as follows:

Confidence Distribution 470: if applied to a record M_1, indicates that the Gender, of the Declarant of M_1, has the following probabilities:
- 0.4 likelihood of being Male and
- 0.6 likelihood of being Female.

Confidence Distribution 471: if applied to a record M_1, indicates that the Gender, of the Declarant of M_1, has the following probabilities:
- 0.0 likelihood of being Male and
- 1.0 likelihood of being Female.

Figure 5C:
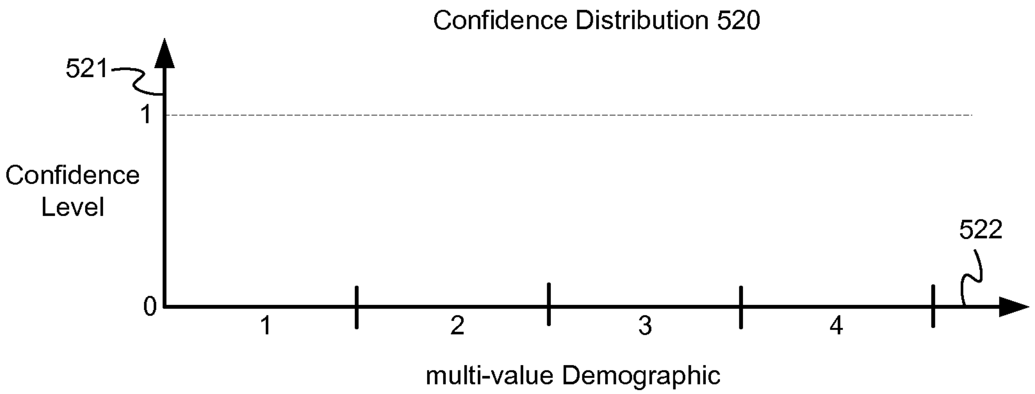

FIG. 5C depicts an example Confidence Distribution 520, where the demographic characteristic has three or more values (four values are shown in FIG. 5C) that it can assign to a member M_1. The confidence level, with which each value is determined applicable to M_1, is limited to the range 0.0 to 1.0. Example uses, of a multi-value Confidence Distribution, are presented in Section 1.4 ("Brand Research"). In Section 1.4, the examples address the age of the Declarants of a population (or result-base) of records, rather than an individual record. The examples of Section 1.4 are illustrated in FIG. 4C and are identified as follows:

Confidence Distribution 472: for the result-value "Bad for dentures"

Confidence Distribution 473: for the result-value "Removes lipstick"

Each of these Confidence Distributions, however, can be interpreted, with respect to a single record, as follows:

Confidence Distribution 472: if applied to a record M_1, indicates that the age, of the Declarant of M_1, has the following probabilities:
- 0.0 likelihood of being in the age group 1-25
- 0.1 likelihood of being in the age group 26-50
- 0.4 likelihood of being in the age group 51-75
- 0.5 likelihood of being in the age group 76-99

Confidence Distribution 473: if applied to a record M_1, indicates that the age, of the Declarant of M_1, has the following probabilities:
- 0.0 likelihood of being in the age group 1-25
- 0.1 likelihood of being in the age group 26-50
- 0.7 likelihood of being in the age group 51-75
- 0.2 likelihood of being in the age group 76-99

3.3 Combining Confidence Distributions

Once the Confidence Distribution has been produced, for each member of a population P_1, any suitable technique can be used to combine such Confidence Distributions into a value or values that appropriately summarize P_1 with respect to a demographic characteristic DC_1. For purposes of example, one combining technique is presented herein.

Figure 6A:
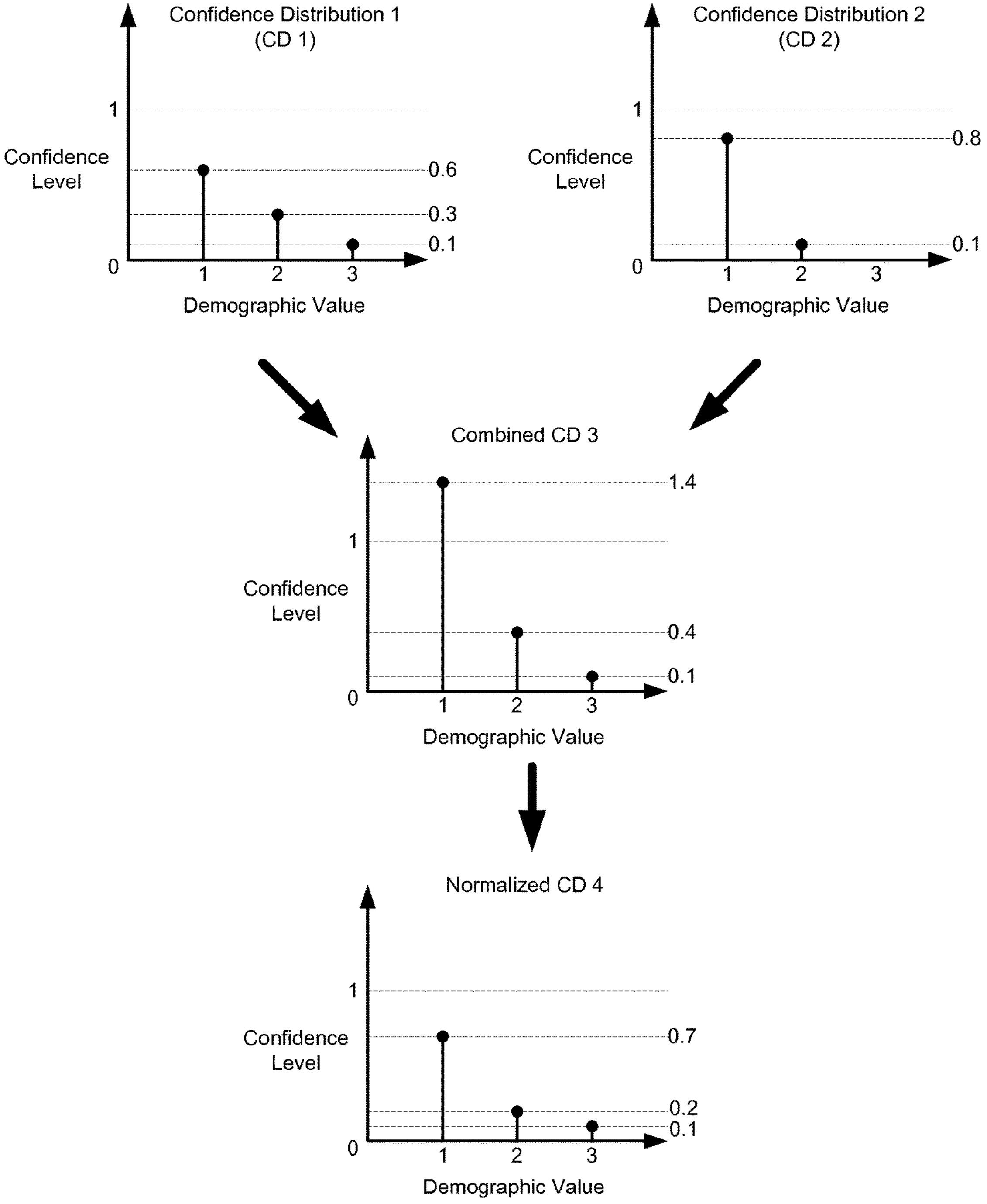

The combining technique presented herein is depicted graphically in FIG. 6A and with pseudo-code in FIG. 6B.

FIG. 6A depicts two, three-value, Confidence Distributions "CD 1" and "CD 2." Consider the case where CD 1 and CD 2 each represent a demographic characteristic DC_1 as applied to two distinct, but single, records. The records shall be referred to as, respectively, M_1 and M_2. CD 1 and CD 2 each have the following properties, regarding their confidence levels: they are in the range 0.0 to 1.0 and they sum to 1.0. Confidence Distribution "CD 3" represents the result of combining CD 1 and CD 2 by adding corresponding confidence levels. For example, in CD 1, the confidence level assigned to value 2, when DC_1 is applied to M_1, is 0.3. In CD 2, the confidence level assigned to value 2, when DC_1 is applied to M_2, is 0.1. In CD 3, the combined confidence level, assigned to value 2, is the sum of 0.3 and 0.1 or 0.4. As can be seen, just summing the corresponding values of two Confidence Distributions produces a Confidence Distribution CD 3 that no longer meets the properties of the confidence levels of CD 1 and CD 2 (i.e., the confidence levels of CD 3 are in the range 0.0 to 1.4 and the confidence levels sum to 1.9). However, CD 3 can be normalized to produce a "CD 4" where its confidence levels satisfy the same properties of CD 1 and CD 2 (i.e., the confidence levels of CD 4 are in the range 0.0 to 1.0 and the confidence levels sum to 1.0). If there are more records to be combined, such as a record M_3, its Confidence Distribution can be combined with CD 4 in the same manner as described above for combining CD 1 and CD 2.

The combining techniques of FIG. 6A can also be applied to the following situation: where there are two or more "Approaches" to determining the same demographic characteristic. In this situation, CD 1 and CD 2 can each represent the application of a different Approach, respectively, DC_1_A1 and DC_1_A2, to a same record M_1. Although representative of different approaches, CD 1 and CD 2 can still be combined in the same way, as described above, to produce CD 3 and CD 4.

Utilization of multiple Approaches, for determining a same demographic characteristic, can be useful in a variety of situations. For example, the Confidence Distributions of different Approaches can reinforce each other, thus leading to higher net confidence levels in the values identified for a record. Also, the impact of an erroneous Confidence Distribution, from one Approach, can be mitigated by other Approaches producing more accurate Confidence Distributions.

Once multiple Confidence Distributions, resulting from the application of multiple Approaches to a single record M_1, have been combined to produce a single Confidence Distribution, this single Confidence Distribution can be treated, for purposes of combining M_1 with other records, as the single Confidence Distribution for M_1. Thus, in the example discussed above, where CD 1 and CD 2 were each described as representative of different records, respectively, M_1 and M_2, it is possible that each of CD 1 and CD 2 has been produced by some prior combining process, in which the results of multiple Approaches were applied to M_1 and M_2.

FIG. 6B can be understood as determining a demographic output for the result-pairs of a Search Aspect. Specifically, FIG. 6B can be understood as producing the demographic output, in FIG. 4C, for the "Cons" Search Aspect (FIG. 4C is discussed above in Section 1.4 "Brand Research"). This can be accomplished by applying, as follows, the pseudo-code of FIG. 6B to data grouping 403 of FIG. 4D.

The variable current_search_aspect (line 1, FIG. 6B) is assumed to be set to Search Aspect 403 of FIG. 4D. Each iteration of the "for" loop (lines 1-20, FIG. 6B) sets current_rp (which stands for "current result pair") to a successive result-pair of 403. First, current_rp is set to result-pair 401 and, second, current_rp is set to result-pair 402. For current_rp set to result-pair 401, where the result-value is "Bad for dentures," demographics 470 and 472 (see FIG. 4C) can be produced as follows.

The "for" loop, of lines 3-8, FIG. 6B, can produce Confidence Distribution 470 for the "Gender" demographic characteristic, where "D1" is assumed to refer to a determination of the gender of a record's Declarant. This "for" loop applies two Approaches, called D1_A1 and D1_A2 (see lines 4 and 5), to produce two Confidence Distributions, called CD_A1 and CD_A2. A "combine_CD" function (see line 6) is then applied to combine the Confidence Distributions, resulting from the two Approaches, to produce a single Confidence Distribution for the current_record (called "current_record.D1_CD"). The operation of combine_CD can be very similar to that described above with respect to FIG. 6A. The combine_CD function can then be applied again (see line 7), so that a single Confidence Distribution, representative of the current result-pair, can be accumulated into current_rp.D1_CD.

In the same manner as described above (for the "for" loop of lines 3-8), the "for" loop, of lines 10-15, FIG. 6B, can produce Confidence Distribution 472 for the "Age" demographic characteristic, where "D2" is assumed to refer to a determination of the age of a record's Declarant. As with demographic characteristic D1, D2 is also assumed to have two different Approaches.

For result-pair 401, each of the "for" loops iterates over the 27 records, regarding "Bad for dentures," to produce Confidence Distributions 470 and 472. Lines 17-18, FIG. 6B, can then be executed in order to display the Confidence Distributions (such as the display in FIG. 4C).

In its second iteration, the "for" loop of lines 1-20 sets the current result-pair to 402 (see FIG. 4D). Each of the two inner "for" loops (i.e., lines 3-8 and lines 10-15) iterates over the 18 records, regarding "Removes lipstick," to produce Confidence Distributions 471 and 473.

Within the general requirement, for a display or visualization that can represent a variation of confidence, as a demographic's values vary, any suitable technique, for data display or visualization, can be used. Some of these display or visualization techniques can include (but are in no way limited to) the following:

- Rather than plot a Confidence Distribution as points within a space defined by axes, the data can be represented, in part or in whole, numerically.
- Variation of confidence (or probability) can be indicated by a variation in color, color intensity or grey scale.

3.4 Declarant Demographics

Example demographic characteristics, discussed above, are as follows:

1. Gender: is Declarant male or female?
2. Age: what is the age of Declarant?
3. Peer-review: is the content source, for the record, a journal that is reviewed by peers in the relevant field?
4. Years since publication: For each item of a result-base, its year of publication (if known with Total Certainty), or likely years of publication (if known with Partial Certainty) is determined. The term "publication" can be construed to mean, for example, the date of general accessibility to a record.

Characteristics 1 and 2 can be put under the more general classification of "Declarant Demographics," where a Declarant Demographic can be any demographic characteristic regarding the Declarants of a result-base's records. More example Declarant Demographics can include the following:

1. Geographical Location: where is Declarant located, geographically?
2. Affluence: what is the income level of Declarant?
3. Psychographic: a characteristic that represents a complex set of behaviors, such as whether someone is a "soccer mom."

This section focuses on Approaches (where an "Approach" was introduced above in Section 3.3) for determining Declarant Demographics. The Approaches discussed herein can be used individually, in any combination with each other or in combination with other Approaches not addressed herein. The Approaches discussed herein can be summarized as follows:

1. Linguistic Clue: Use linguistic clues, in a record itself, to determine demographics of the record's Declarant.
2. Content Source Demographics: Use demographic characteristics, of the content source from which a record has been located, to determine demographics of the record's Declarant.
3. Explicit Declarant Information: If explicit information about the Declarant of a record is available (e.g., the Declarant's name is included in a specific field where "authors" are identified), it can be used to determine demographics of the record's Declarant.
4. Machine Learning: automated procedures can be executed, on source corpora, to deduce linguistic patterns (such as the presence of particular lexical units) indicative of particular demographics of a record's Declarant.

Each of these Approaches is now addressed in greater detail.

3.4.1 Linguistic Clue 3.4.1.1 Lexical-to-Demographic Association

The technique of "lexical-to-demographic association," when applicable to a demographic characteristic "DC_1," works as follows. If a particular lexical unit is present in a record, there is a certain (above zero) probability that the Declarant of the record has characteristic "DC_1." Depending on the demographic sought and the lexical unit detected, the probability can range from low or inaccurate (e.g., 0.2) to high or accurate (e.g., 0.9). Even a low level of probability, however, can be useful—particularly if combined with probability information determined from other Approaches to the same demographic.

Lexical-to-demographic association can be used, for example, with regard to determining the geographic location of a Declarant. This is because certain lexical units are known to be more frequently utilized (or, perhaps, only utilized) in certain geographical areas. Thus, if lexical units are included in a record, where such lexical units are indicative of a geographical area "GA1," there is a certain (above zero) probability that the Declarant of the record is from GA1.

Sources of geographically-indicative language include the web site (www.UrbanDictionary.com) and books (such as "Urban dictionary: fularious street slang defined," Andrews McMeel Publishing, Kansas City, Mo., 2005) by Aaron Peckham. For example, the word "hyphy" has been associated with the area of Oakland, in the San Francisco Bay Area, CA, U.S.A.

3.4.1.2 Self-Referential Demographic Identification

For some demographic characteristics, a record can be analyzed for statements wherein the Declarant describes himself or herself as having a sought-for characteristic "DC_1." If a self-referential statement is found that has the sought-for properties, there is a certain (above zero) probability that the Declarant of the record has the characteristic DC_1. This technique can be referred to herein as "self-referential demographic identification." As with "lexical-to-demographic association," the probability can range from low or inaccurate (e.g., 0.2) to high or accurate (e.g., 0.9).

For example, a linguistic rule can be written that triggers upon a Logical Form that satisfies all of the following properties:

The verb is a form of "to be"

The Actor is the word "I" and

The Undergoer states, or implies, the presence of the sought-for demographic characteristic.

Such linguistic rules can be written in the form of "frame extraction rules," as discussed below in Sections 4-6 and defined in Section 7.2 ("Frame Extraction Rules"). However, the "action" portion of a frame extraction rule, suitable for identification of a demographic characteristic, does not need to produce a frame instance when triggered. Instead, the action needs to indicate, with an appropriate Confidence Distribution, presence of the demographic characteristic.

Self-referential demographic identification can be used, for example, with regard to determining the geographic location of a Declarant. For example, a linguistic rule can be written that triggers upon a Logical Form satisfying all of the following properties:

The verb is a form of "to be"

The Actor is the word "I" and

The Undergoer uses the preposition "in" followed by a lexical unit indicative of a geographic location (e.g., "Texas").

A linguistic rule satisfying the above properties would trigger, for example, on the input sentence "I am in Texas."

Self-referential demographic identification can also be used, for example, with regard to determining the gender of a Declarant. For example, a linguistic rule can be written that triggers upon a Logical Form satisfying all of the following properties:

The verb is a form of "to be"

The Actor is the word "I" and

The Undergoer is a noun phrase using the feature FEMALE.

A feature (indicated by all capitals) is a shorthand way of including a set of lexical feature alternatives in a frame extraction rule. In the present case, FEMALE can include any lexical unit that indicates, directly or indirectly, a person who is female. An example set for FEMALE is as follows:

{woman, girl, female, gal, sister, daughter, wife, girlfriend, heiress, heroine, mistress, . . . }

A linguistic rule satisfying the above properties would trigger, for example, on the input sentence "I am a woman."

For the linguistic rules presented thus far, the confidence in the presence of the demographic characteristic, if found, is very high (e.g., 1.0 on a scale of 0.0 to 1.0). However, the confidence of a match, by a particular linguistic rule, can vary depending upon the particular lexical unit (or units) that are part of the match. In this case, lexical units associated with the detection of a particular value V_1 (such as "Female"), from the range of values (e.g., Male or Female) that can be assigned by a demographic characteristic DC_1 (e.g., gender) to a member M_1 of its population, can be paired with an appropriate confidence level that V_1 is, in fact, present. Any suitable data format, to represent such pairing, can be used. For purposes of simplicity of exposition herein, the above-given feature set for FEMALE can be expressed as follows:

{(woman, 1.0), (girl, 1.0), (female, 1.0), (gal, 1.0), (sister, 1.0), (daughter, 1.0), (wife, 1.0), (girlfriend, 1.0), (heiress, 1.0), (heroine, 1.0), (mistress, 1.0), (secretary, 0.7), . . . }

The above feature set of pairs, contains all of the same lexical units as present in the non-paired form, except the lexical unit "secretary" has been added. As can be seen, "secretary" is the one lexical unit shown that is not paired with a confidence level of 1.0. This is because a Declarant, describing himself or herself as a "secretary," does not lead to Total Certainty (where "Total Certainty" is discussed above in Section 3.2 "Confidence Distributions") that the Declarant is female (e.g., a confidence level of 0.7 is shown). Depending upon the application, the pairing can be between a lexical unit and a Confidence Distribution. In the case of the gender demographic, since only two values are possible, a Confidence Distribution need only have two values. For example, FEMALE can be expressed as follows (where each Confidence Distribution is ordered with the confidence values for Female, Male):

{(woman, (1.0, 0.0)), (girl, (1.0, 0.0)), (female, (1.0, 0.0)), (gal, (1.0, 0.0)), (sister, (1.0, 0.0)), (daughter, (1.0, 0.0)), (wife, (1.0, 0.0)), (girlfriend, (1.0, 0.0)), (heiress, (1.0, 0.0)), (heroine, (1.0, 0.0)), (mistress, (1.0, 0.0)), (secretary, (0.7, 0.3)), . . . }

3.4.2 Content Source Demographics

It is often the case that the producer (or publisher) of a content source keeps demographic data on its content contributors and users. Also, there are companies that specialize in producing demographic data on content providers.

For a record "M_1," of a result-base, its content producer "C_1" can be identified and the demographics, of such content source, can be accessed. Such demographic information can be used to deduce a Confidence Distribution, for the Declarant of "M_1," with respect to a particular demographic characteristic "DC_1."

For example, DC_1 can be gender and the demographic data, for C_1, can be that 90% of its contributors are female while only 10% are male. Thus, in the particular case of record M_1, it can be reasonable to deduce that there is a 90% probability that its Declarant is female.

An example category of content source are online sources, such as Internet web sites. In this case, many web sites compile demographic data on its contributors and users. Also, there are companies that compile demographics across many online content sources.

Example web sites, that compile demographic data on its contributors and users, include:

www.Facebook.com: Operated by Facebook, Inc., Palo Alto, Calif., U.S.A.

www.Twitter.com: Operated by Twitter, Inc., San Francisco, Calif., U.S.A.

An example company, that compiles demographics across many online content sources, is www.QuantCast.com, operated by Quantcast Corporation, San Francisco, Calif., U.S.A. Quantcast provides a database wherein an Universal Resource Locator (or "url") can be input and a variety of demographics, describing that url, are output.

3.4.3 Explicit Declarant Information

If explicit information about the Declarant of a record is available, it can be used to deduce demographics of the record's Declarant.

For example, the Declarant's name can be included as part of a record (sometimes in a specific field where "authors" are identified). Based on a Declarant's name, demographics, such as the Declarant's likely gender and/or age, can be determined.

For example, if a Declarant's name is "Mary," it can be deduced, with a high level of probability, that the Declarant is female. However, since the name "Mary" has been popular for a long time, and remains popular, it is not useful for deducing the age of the Declarant. Names such as "Gertrude" or "Beatrice" are no longer popular and therefore it can be deduced, with a certain level of probability, that the Declarant is in an older age range (such as 50 years or older).

An example database, that provides detailed information on the popularity of names over a long period of time (e.g., over the past 100 years), is www.BabyNameWizard.com, operated by Laura Wattenberg, Wellesley, Mass., U.S.A and Generation Grownup, LLC.

3.4.4 Machine Learning

Additional linguistic patterns for detection of demographics, that are not amenable to being manually deduced, can be created by the application of automated machine learning procedures. Any suitable machine learning procedures can be used, with such procedures executed on source (or "training") corpora.

An example type of linguistic patter, that can be deduced from machine learning, is as follows. It can be determined that the presence of a particular lexical unit, in a record, implies a certain (above zero) probability that the record's Declarant has a particular demographic characteristic. In this situation, machine learning can be use to produce additional lexical-to-demographic associations, as described above in Section 3.4.1.1.

4 FRAME-BASED DEMOGRAPHICS

Frames and frame-based search systems are discussed extensively in the following patent applications (see citations above): the '122 Application, the '127 Application and the '068 Application. The entirety of each of these applications is incorporated by reference in the present description. However, for purposes of convenience, certain information of such applications is repeated herein.

A key advantage, of a frame-based search system, is that result-pairs can be generated automatically. The following nomenclature can be used herein:

Result-pair-F: result-pair produced by a frame-based search system

Result-value-F: result-value produced by a frame-based search system

Result-base-F: result-base produced by a frame-based search system

For any of the techniques described in Sections 2 ("Example Search Results") and 3 ("Determining Demographics"), the result-pairs, result-values and result-bases can be replaced by, respectively, their frame-produced versions. In terms of determining demographics, as addressed above in Section 3 ("Determining Demographics"), the "items" or "records" processed, for purposes of evaluating a demographic characteristic, can be replaced by snippets. For example, with respect to FIG. 6B, discussed above in Section 3.3 ("Combining Confidence Distributions"), FIG. 6C presents the same pseudo-code, except that a current snippet is processed (current_snippet) rather than a current record (current_record).

A generic frame-based search engine (or FBSE) is described below in Section 5 ("Frame-Based Search") and, more particularly, in Section 5.1.3. The following sub-Sections 4.1 to 4.3 show how to apply this FBSE to each of the three example search areas.

4.1 Technology Profiling

Technology profiling and, more broadly, the profiling of an entity, is addressed extensively in the '068 Application. While the entirety of the '068 Application has been incorporated by reference, for purposes of convenience, certain information of such application is repeated herein.

Described herein are techniques for generating a profile of an entity as it is addressed by a corpus of natural language (or "Source Corpus"). More particularly, the profile is generated by using a set of frames referred to as an "Entity Profile Frame Set." Each frame, of an Entity Profile Frame Set, shares a role in common, called herein an "Anchor Role." For each instance produced from an Entity Profile Frame Set, the value assigned to its Anchor Role is called herein an "Anchor Role Value." The particular entity, that an Anchor Role Value indicates (or maps to) is called herein an "Anchor Entity."

The profile of an entity (or an "Entity Profile") is a set of instances (called herein an "Entity Profile Instance Set") that satisfies the following two properties:

1. All the instances are based on a same "Entity Profile Frame Set."
2. All the instances have an Anchor Role Value that indicates (or maps to) a same Anchor Entity.

An "Anchor Entity" (as used herein) is an abstraction, defined, in practice, by the range of Anchor Role Values that are understood as indicating a same Anchor Entity.

With regard to the example technology profiling of Section 2.2 above, and its illustration in FIGS. 2A-2D, an "Aspect" contains instances that are all from a same frame.

An example Entity Profile Frame Set is presented below in Section 6.1 ("Technology Profiling"). In the remainder of this Section, the operation of this Entity Profile Frame Set is illustrated by pursuing an example Entity Profile Instance Set through the operation of the generic FBSE. For this example, it is assumed that the Entity Profile Instance Set corresponds to an Instance Superset.

4.1.1 Instance Generation and Merging

Figure 7A:
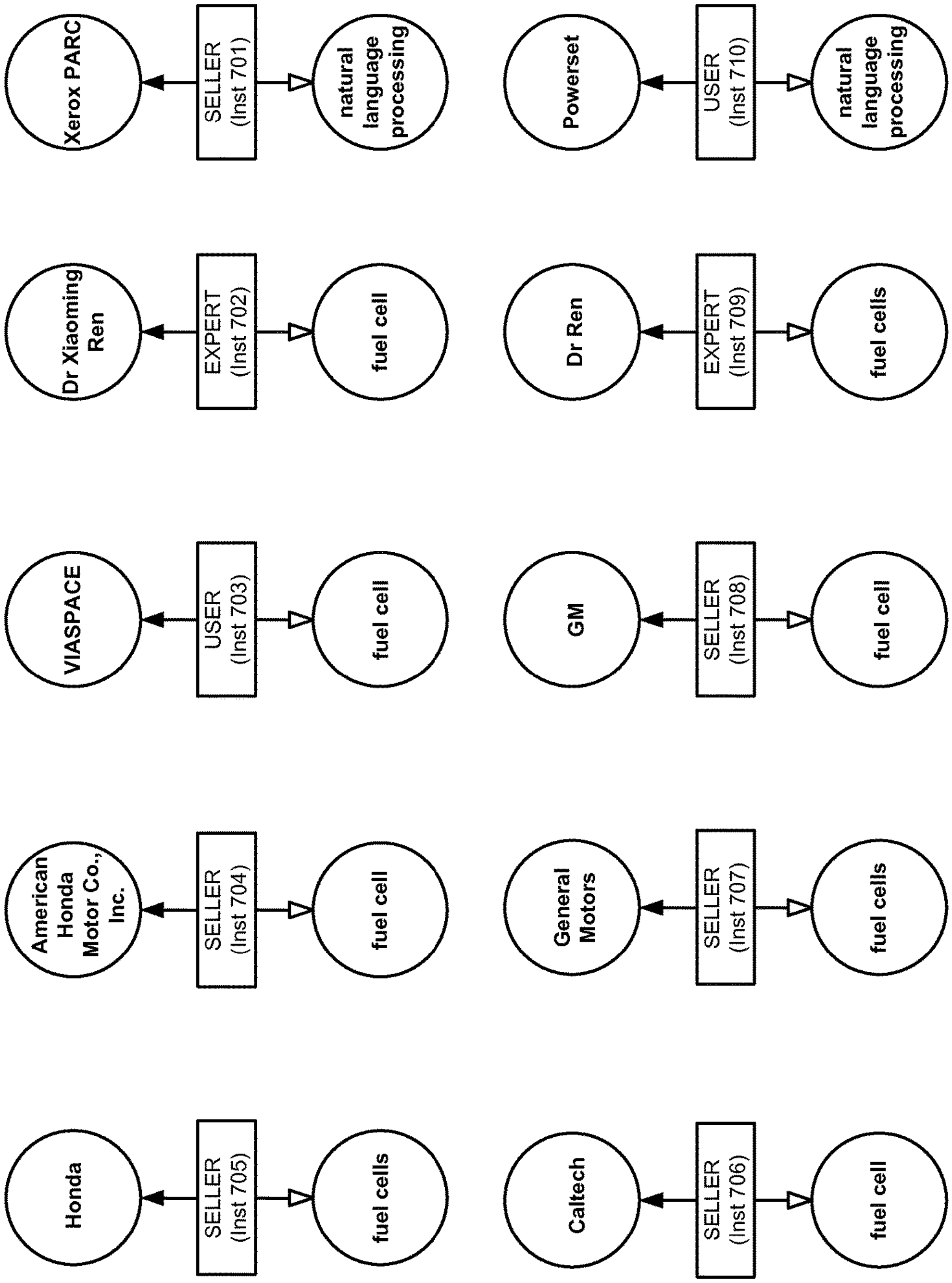
FIGS. 7A-D depict processing stages, at the instance level, for the determination of an example technology profile.

An Instance Superset, to which Instance Merging can be applied, is assumed to have been already produced and is depicted in FIG. 7A. All the instances are produced from the frames, used for creating a profile for a Technology Candidate, presented in Section 6.1. It should be noted that the instances of FIG. 7A are assumed to have been produced from a general Source Corpus, prior to a user entry of a query for a particular technology. This is why instances, for technologies as divergent as "fuel cells" and "natural language processing" are shown. FIG. 7A can be assumed to be a small fragment of the set of instances that would be produced.

FIG. 7A has 10 instances, 701-710. Each instance is depicted as follows:

The frame it is based on is shown in the box;

The hollow arrow points to its Anchor Role Value; and

The solid arrow points to the Non-Anchor Role Value.

The frames upon which each instance is based are as follows:

Seller Frame: instances 701, 704, 705, 706, 707, 708.

Expert Frame: instances 702, 709.

User Frame: instances 703 and 710.

Figure 7B:
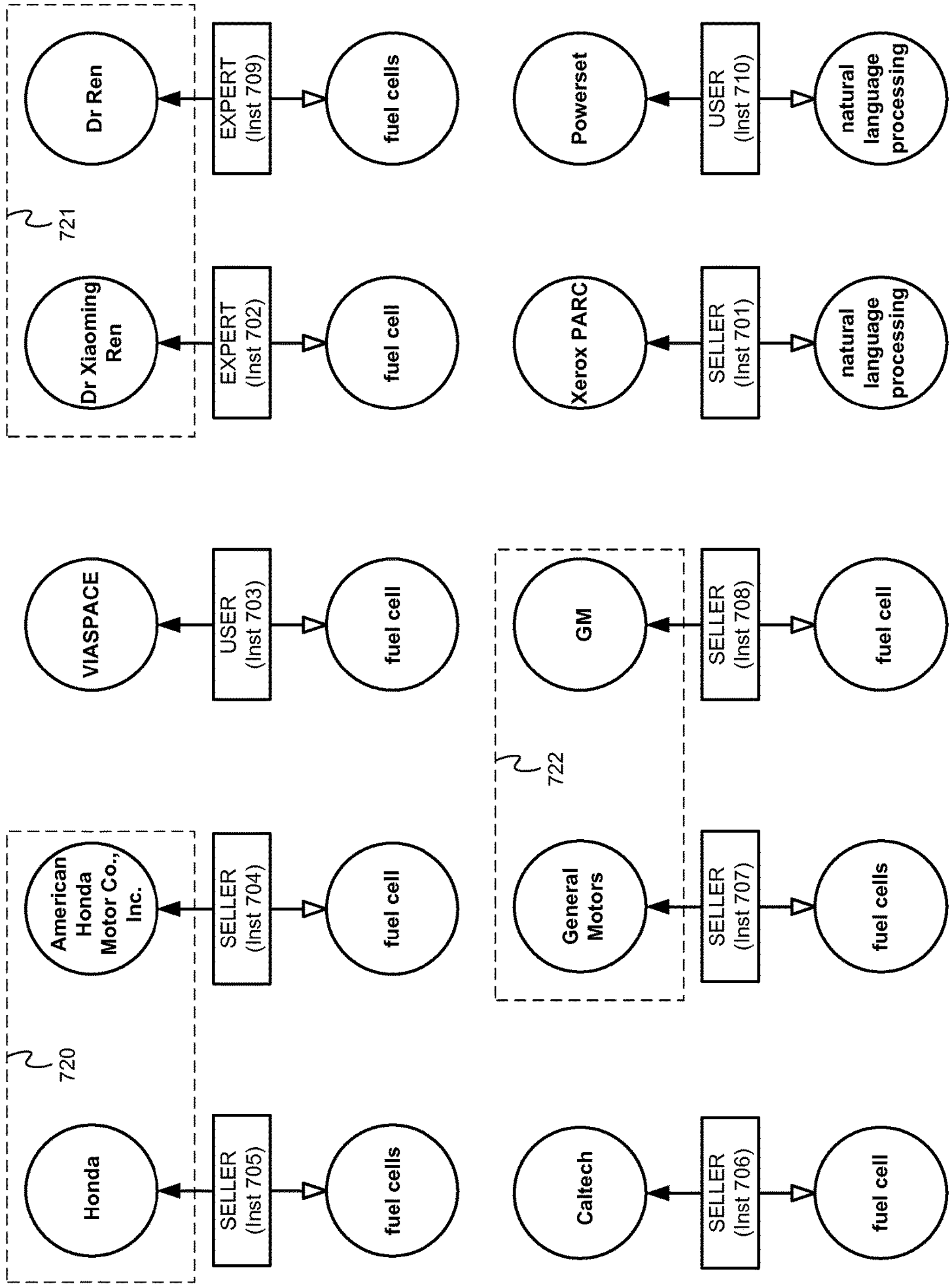

FIG. 7B is the same as FIG. 7A, except that the following Instance Merging has been accomplished:

- Instances 704, 705, merged for following reasons:
  - both are from the Seller Frame
  - through lexical unit level analysis, the Anchor Entity, represented by each of the following Anchor Role Values, was determined to be the same: "fuel cells", "fuel cell"
  - through lexical unit level analysis, the Seller entity, represented by each of the following role values, was determined to be the same: "American Honda Motor Co., Inc.", "Honda"
- Instances 702, 709, merged for following reasons:
  - both are from the Expert Frame
  - through lexical unit level analysis, the Anchor Entity, represented by each of the following Anchor Role Values, was determined to be the same: "fuel cells", "fuel cell"
  - through lexical unit level analysis, the Seller entity, represented by each of the following role values, was determined to be the same: "Dr Xiaoming Ren", "Dr Ren"
- Instances 707, 708, merged for following reasons:
  - both are from the Seller Frame
  - through lexical unit level analysis, the Anchor Entity, represented by each of the following Anchor Role Values, was determined to be the same: "fuel cells", "fuel cell"
  - through lexical unit level analysis, the Seller entity, represented by each of the following role values, was determined to be the same: "General Motors", "GM"

After the merging, the following instances, with their instance-mentions, are as follows:

Instance 720, comprised of instance-mentions 704 and 705

Instance 721, comprised of instance-mentions 702 and 709

Instance 722, comprised of instance-mentions 707 and 708

4.1.2 Instance Selection

Figure 7C:
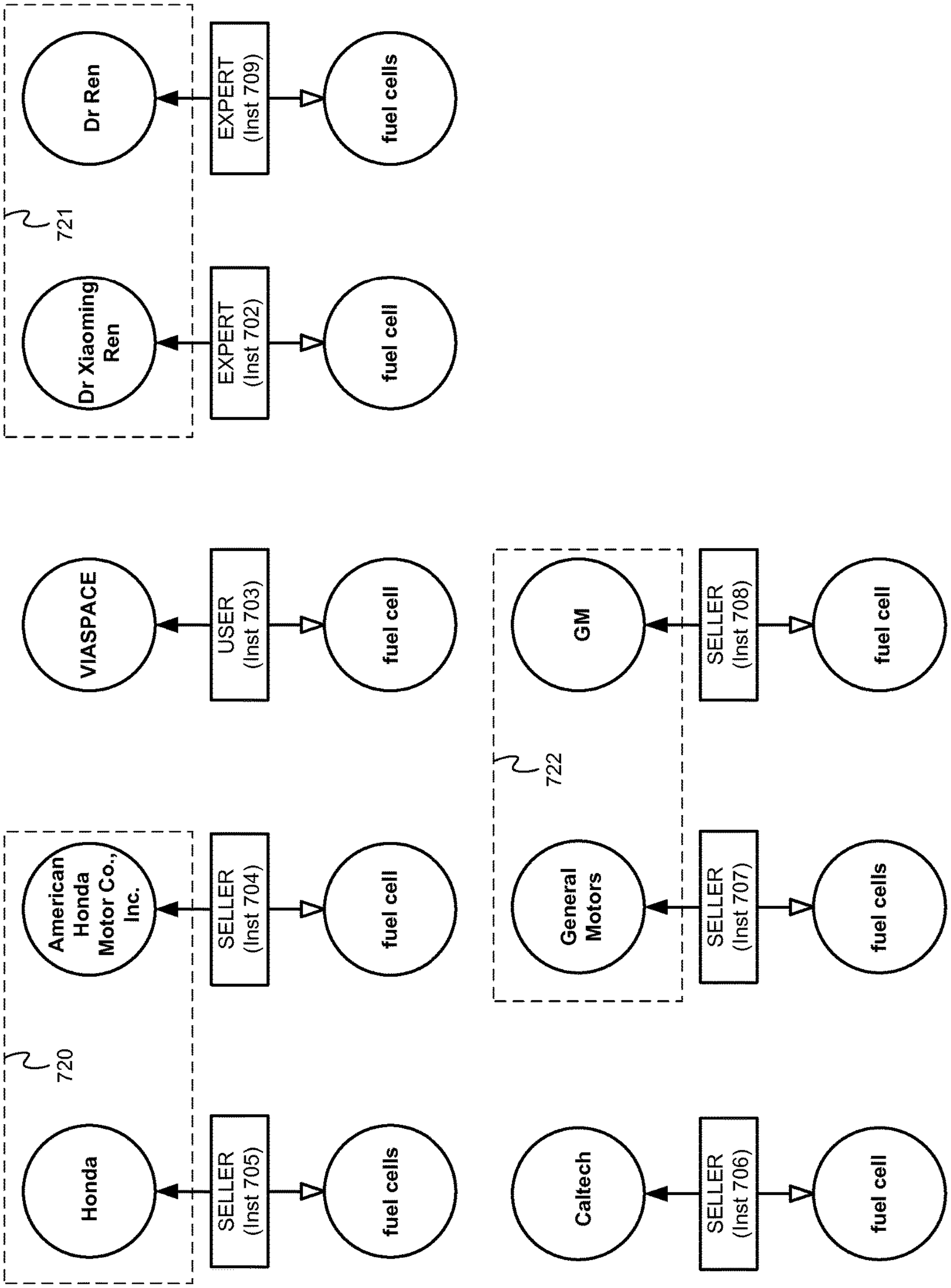

FIG. 7C is the same as FIG. 7B, except that the only instances remaining are those whose Anchor Role Value sufficiently match an input Anchor Role Value (or user's query). For this example, the user's query is assumed to be "fuel cells."

Specifically, all the instances of FIG. 7B have been kept in FIG. 7C, except for instances 701 and 710. The Anchor Role Values of instances 701 and 710 (i.e., the string of lexical units "natural language processing"), are clearly identifying a different Anchor Entity (in this case, a different technology) than the technology identified by "fuel cells."

Figure 7D:
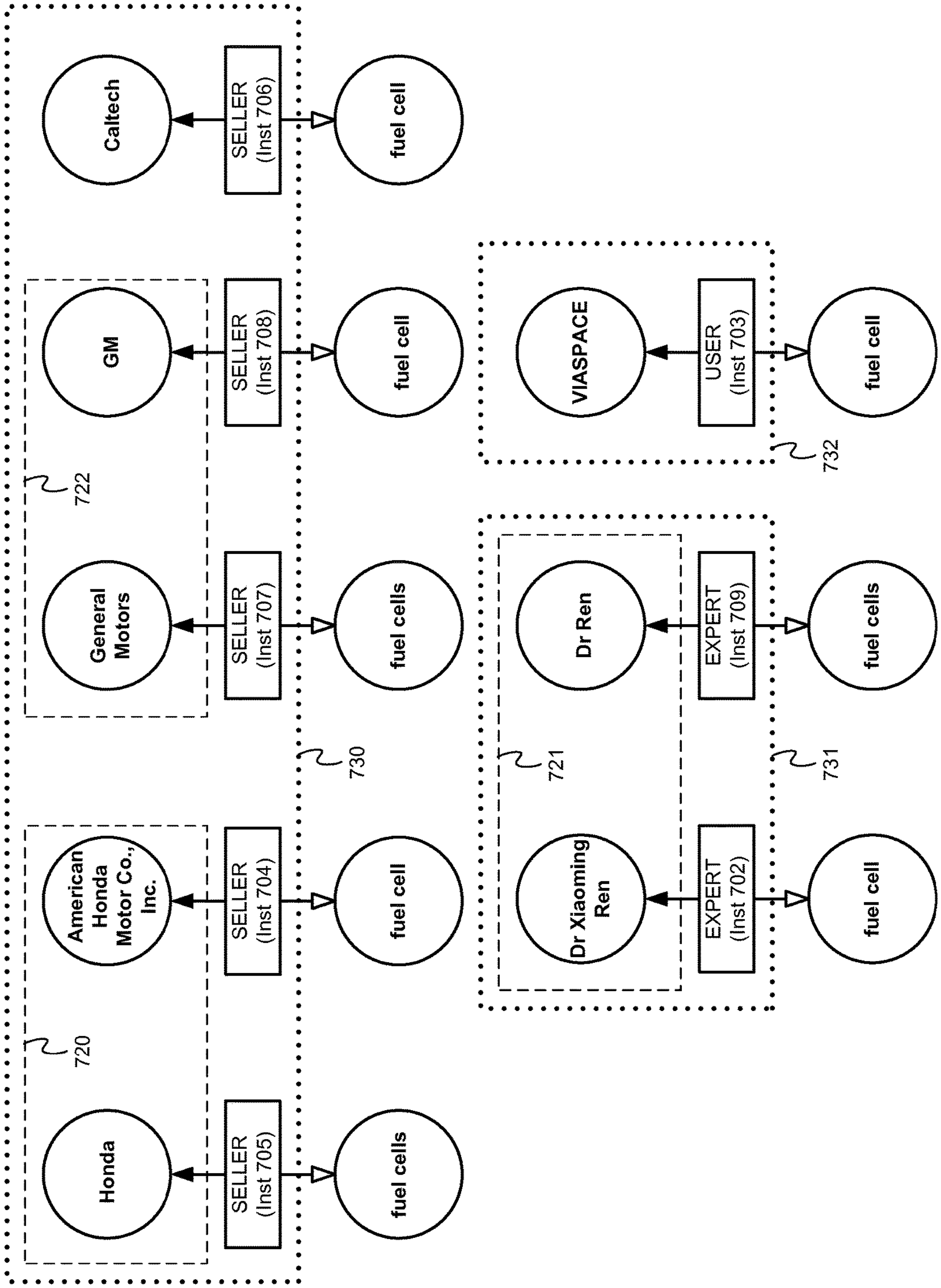

Thus, the instances of FIG. 7C can all be part of a profile for the Technology Candidate "fuel cells." FIG. 7D is the same as FIG. 7C, except that instances produced from a same frame have been grouped together. Such grouping can be useful for presentation of the profile.

In terms of the example Technology Profiling discussed above in Section 2.2 ("Technology Profiling") and illustrated in FIGS. 2A-2D, the general structure of FIG. 7D can be related as follows. (Since they are the result of different search queries, "rechargeable cell" for Section 2.2 and "fuel cells" for FIG. 7D, the particular instances and instance types, of the two results, differ.)

Each of 730, 731 and 732 corresponds to what is called an "Aspect" in FIGS. 2A-2D. More particularly, each of 730, 731 and 732 corresponds to Aspect 203 of FIG. 2D. Within, for example, Aspect 730 are instances 720, 722 and 706. In terms of FIG. 2D, each of these instances can be represented by a result-pair-F, such as 201 or 202. For example, the result-pair-F for instance 720, can comprise:

"Honda," as a result-value-F, representative of the output values "Honda" and "American Honda Motor Co., Inc." of instance-mentions 705 and 704.

A result-base-F containing the snippets that triggered instance-mentions 705 and 704.

4.2 Healthcare-Related 4.2.1 Overview

A search engine, specialized for the domain of healthcare-related computer-accessible content, can be referred to as "healthcare-related search engine" (or "HRSE"). Currently available HRSE's include, for example, the following web sites: PubMed (provided by the United States National Library of Medicine of the National Institutes of Health), WebMD (provided by the WebMD Health Corporation) and Healthline (provided by Healthline Networks, Inc.).

An approach to a frame-based search engine ("FBSE") is presented in this section (Section 4.2 "Healthcare-related"). More particularly, the principles of frame-based search are applied to the domain of healthcare-related knowledge. The resulting system can be referred to as a frame-based HRSE.

The development of a frame-based HRSE includes the development of a Frame Set (called a "Healthcare Frame Set" or "HFS") that models concepts of particular importance to people working within the healthcare field (or "healthcare professionals").

4.2.2 Healthcare Frame Set

This section presents an example HFS, called "HFS52," that contains 5 frames, with each frame having two roles. Each frame of HFS52 is depicted in FIG. 10 and is listed below:

1. Treatment Frame 1003;
2. Cause Frame 1001;
3. Effect Frame 1002; (It is important to note that, in the healthcare field, it is often the case that the "effects" of a condition are called "complications.")
4. Pro Frame 1004; and
5. Con Frame 1005.

Figure 10:
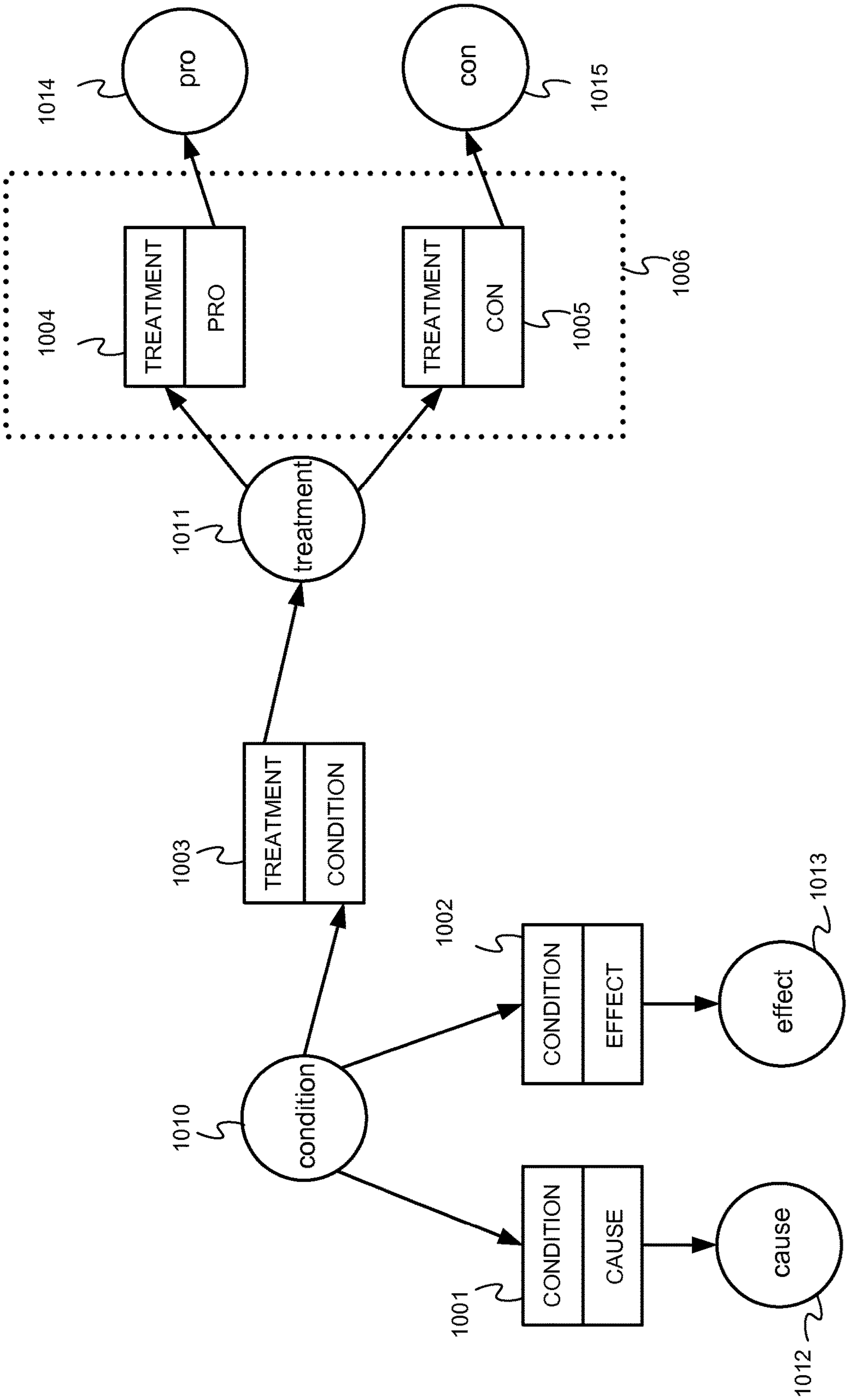
FIG. 10 illustrates an example Healthcare Frame Set.

Within each frame of FIG. 10 are its (two) role names in all capital letters. In other diagrams, for purposes of clarity, the suffix "_ROLE" may be added to a role name.

A set of values, that can be assigned to the roles of an "instance" of a frame, is indicated in FIG. 10 by all lower-case letters. The 6 sets of values depicted in FIG. are:

1. condition 1010;
2. treatment 1011;
3. cause 1012;
4. effect 1013;
5. pro 1014; and
6. con 1015.

For each frame of FIG. 10, one role is indicated as the "input role" (see below Glossary of Selected Terms for definition) and the other role serves as the output role.

More detailed discussion, of each of the five frames of HFS52, can be found in Section 6.2 ("Healthcare-related").

4.2.3 Frame-Based HRSE

An approach, to implementing a frame-based HRSE, is as follows: utilize four frame-based search engines (or FBSE's), where each such FBSE has been described, generically, in Section 5.1.3. Each of the four FBSE's accomplishes the following:

FBSE I: supports searching by condition to find treatments by using Treatment Frame 1003 as its Organizing Frame.

FBSE II: supports searching by condition to find causes by using Cause Frame 1001 its Organizing Frame.

FBSE III: supports searching by condition to find effects by using Effect Frame 1002 is its Organizing Frame.

FBSE IV: supports searching by treatment to find Pros and Cons by using Pro Frame 1004 and Con Frame 1005 as the Organizing Frames.

Each of the main steps of an FBSE, customized for Healthcare-related search, is described in more detail in the following sub-sections of Section 4.2.

4.2.4 Example Instance Generation

To illustrate the principles of Instance Generation, presented in Section 5.2, this section (Section 4.2.4) presents an example of Instance Generation related to a specific healthcare-related search.

Specifically, the example of Instance Generation relates to a user seeking to find treatments for the condition "heart attack."

As presented in Section 2.3 ("Healthcare-related"), the results of the search (shown in FIG. 3A) include the treatments of "Aspirin" (under the category of "Drugs and Medications") and "Reduce cholesterol" (under the category of "Other Treatments").

FIG. 3C shows that one of the results (specifically, the result relating to aspirin) is from such sources as MedicineNet (see 320) and Medical News Today (see 321).

According to the Pre-Query Processing of Section 5.2.2, the results of FIG. 3C can result from an FBDB for the Treatment Frame (or FBDB (Treatment Frame)) that is indexed to include snippets from MedicineNet and Medical News Today.

Applying the Post-Query Processing of Section 5.2.3.1 ("Producing A Query Selective Corpus"), with the FBDB being FBDB (Treatment Frame) and the query being "heart attack," can produce a Query Selective Corpus that includes snippets 801-804 of FIG. 8A. Each of snippets 801-804 depicts, in dotted underline, a location where the query ("heart attack") resulted in its retrieval.

Applying the Post-Query Processing of Section 5.2.3.2 ("Producing An Instance Superset"), to snippets 801-804, can produce an Instance Superset that includes instances 810-815 of FIG. 8D. The Query Selective Corpus of FIG. 8A can be processed on a UNL-by-UNL basis (e.g., on a sentence-by-sentence basis).

FIG. 8B shows where the third (or focus) sentence of each snippet has triggered a frame extraction rule to produce a Treatment Frame. Each dotted underline depicts a text fragment that is assigned to a CONDITION_ROLE (the input role) and each solid underline depicts a text fragment that is assigned to a TREATMENT_ROLE (output role). For each snippet of FIG. 8B, the triggering of a frame extraction rule produces an instance (shown in FIG. 8D) where the role value of the CONDITION_ROLE is "heart attack." Specifically, snippets 801-804 of FIG. 8B correspond to, respectively, the following instances of FIG. 8D: 810, 811, 813 and 815.

FIG. 8C also shows where the third (or focus) sentence, of snippets 802-803, has triggered a frame extraction rule to produce a Treatment Frame. For each of snippets 802-803 of FIG. 8C, the triggering of a frame extraction rule produces an instance (shown in FIG. 8D) where the role value of the CONDITION_ROLE is "stroke." Specifically, the snippets 802-803 of FIG. 8C correspond to, respectively, the following instances of FIG. 8D: 812 and 814. It is the production of instances such as 812 and 814, that do not relate to the query ("heart attack"), that justify the name of Instance Superset for the output of Instance Generation.

4.2.5 Example Instance Merging

An example Instance Superset (produced above in Section 4.2.4), to which Instance Merging can be applied, is depicted in FIG. 8D. All the instances are produced from a Treatment Frame. This Treatment Frame, along with other example frames for a frame-based HRSE, are addressed in Section 6.2 ("Healthcare-related").

FIG. 8D has 6 instances, 810-815.

Figure 8E:
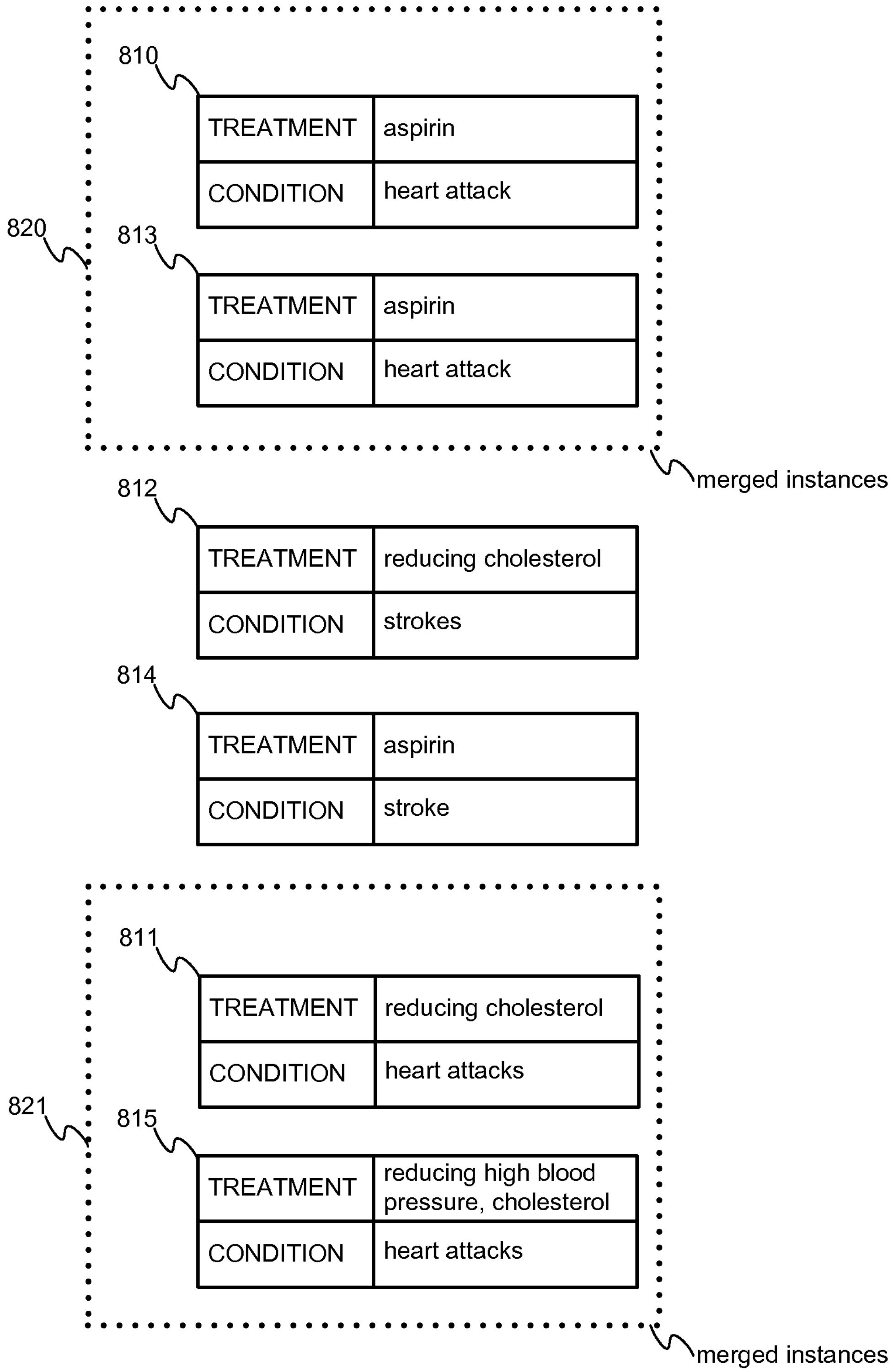

FIG. 8E is the same as FIG. 8D, except that the following Instance Merging has been accomplished:

- Instances 810, 813 are merged for following reasons:
  - both are instances of the Treatment Frame
  - through lexical unit level analysis, the input role values, represented by the following values of the input role (CONDITION), were determined to be the same: "heart attack", "heart attack"
  - through lexical unit level analysis, the output role values, represented by the following values of the output role (TREATMENT), were determined to be the same: "aspirin", "aspirin"
- Instances 811, 815 are merged for following reasons:
  - both are instances of the Treatment Frame
  - through lexical unit level analysis, the input role values, represented by the following values of the input role (CONDITION), were determined to be the same: "heart attacks", "heart attacks"
  - through lexical unit level analysis, the output role values, represented by the following values of the output role (TREATMENT), were determined to be sufficiently similar: "reducing cholesterol", "reducing high blood pressure, cholesterol"
- Instances 812, 814 might appear to be mergeable for following reasons:
  - both are instances of the Treatment Frame
  - through lexical unit level analysis, the input role values, represented by the following values of the input role (CONDITION), are determined to be sufficiently similar: "strokes", "stroke"
- However, instances 812, 814 are not merged for following reason:

through lexical unit level analysis, the output role values, represented by the following values of the output role (TREATMENT), are determined to not be sufficiently similar: "reducing cholesterol", "aspirin"

After the merging, FIG. 8E has the following four instances (from top to bottom): 820, 812, 814 and 821.

Regarding instances 820 and 821, each contains the following instance-mentions:

Instance 820 contains instance-mentions 810 and 813

Instance 821 contains instance-mentions 811 and 815

4.2.6 Example Instance Selection

Figure 8F:
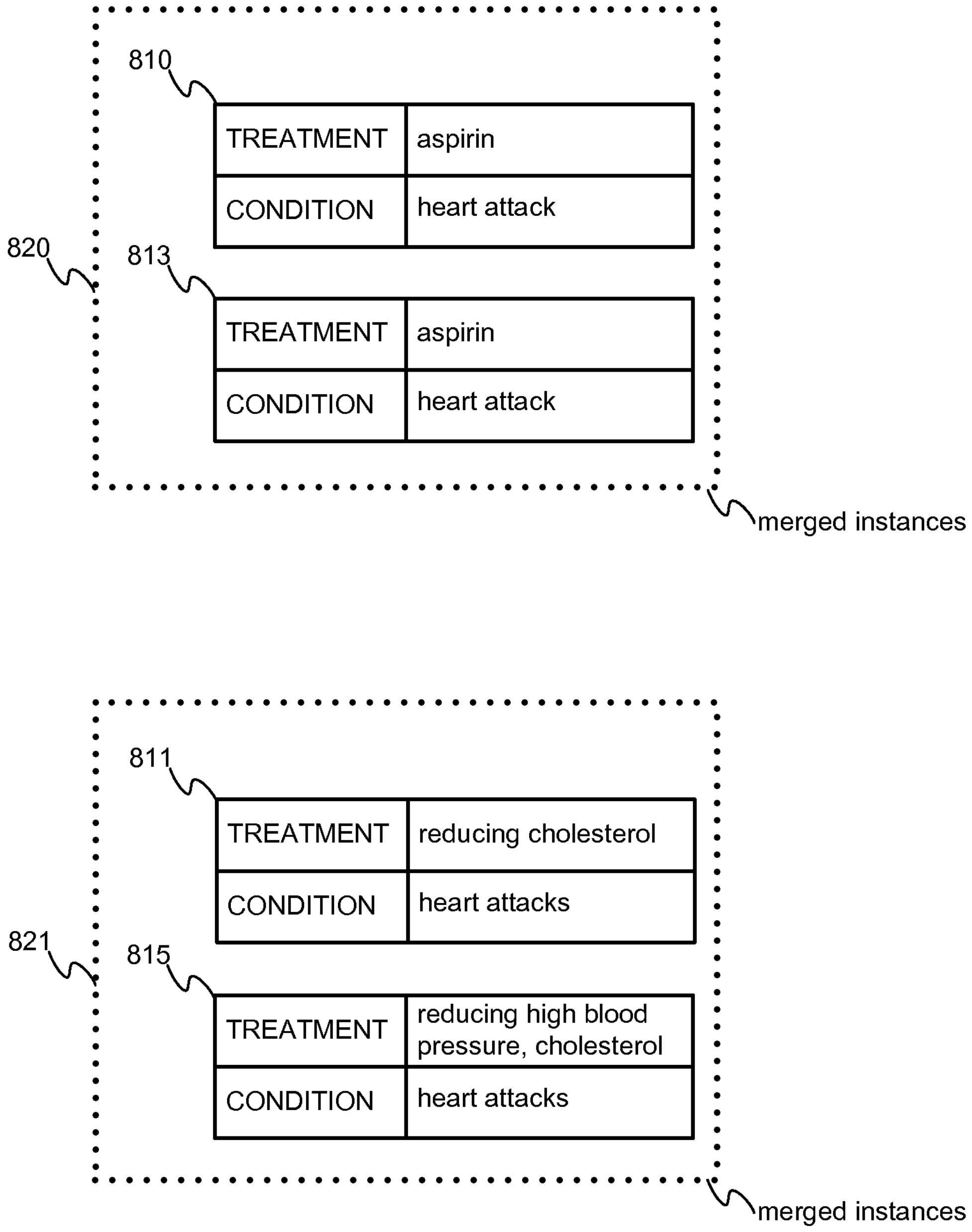

FIG. 8F is the same as FIG. 8E, discussed above in section 4.2.5 ("Example Instance Merging"), except that the only instances remaining are those whose input role value sufficiently match a query. For this example, the query is "heart attack."

Specifically, all the instances of FIG. 8E are kept in FIG. 8F, except for instances 812 and 814. The CONDITION role values of instances 812 and 814 (i.e., lexical units "strokes" and "stroke"), are clearly not a match to the query "heart attack."

Thus, the instances of FIG. 8F can all be part of a search result for treatments to heart attacks.

4.2.7 Example Result Presentation 4.2.7.1 Role-Value Oriented Presentation

The role-value oriented approach, to Search Result presentation, can be illustrated with the example Search Result fragment of FIG. 8F. This search result is comprised of two instances (820 and 821), each of which contains two instance-mentions. For instance 820, an appropriate role-value-oriented search result is "aspirin," since it cannot be simplified and it is the same role value for both its instance-mentions. For instance 821, an appropriate role-value-oriented search result is "reduce cholesterol," which is a commonality or summarization of the role values of its instance-mentions. An example presentation, that includes both of these role-value-oriented search results, is shown in FIG. 3A (discussed above in Section 2.3 "Healthcare-related"), where "Aspirin" is the first result under "Drugs and Medications" and "Reduce cholesterol" is the second result under "Other Treatments."

An example, of being able to see the snippets forming the basis of a role-value-oriented search result, is shown in FIG. 9A. FIG. 9A shows the search result "Aspirin" as having been expanded. As can be seen, the expansion of Aspirin has resulted in two snippets (indicated in FIG. 9A as 920 and 921) being displayed. Rather than displaying the full snippet, FIG. 9A just shows the "focus sentence" for each (see Section 7.4 "Snippet Formation" for a discussion of "focus sentence"). For each of 920 and 921, the portion that corresponds to the role-value-oriented search result is emphasized by solid underlining, while the portion that matches the input query is emphasized by dotted underlining.

4.2.7.2 Grouping by Role Value Type

For example, in the case of a frame-based HRSE, it can be useful to group the treatments, found for a condition, according to type. Example types, into which treatments can be grouped, include the following: "Drugs and Medications," "Foods and Plants," and "Other Treatments." An example use of these three types, for grouping potential treatments for "heart attack," is shown in FIG. 3A.

4.2.7.3 Grouping by Frame Type

In the example of the treatments for a heart attack, as shown in FIG. 3A, it was not useful to use frame-type grouping because all the search results are based upon instantiation of just one frame: the Treatment Frame.

Figure 9B:
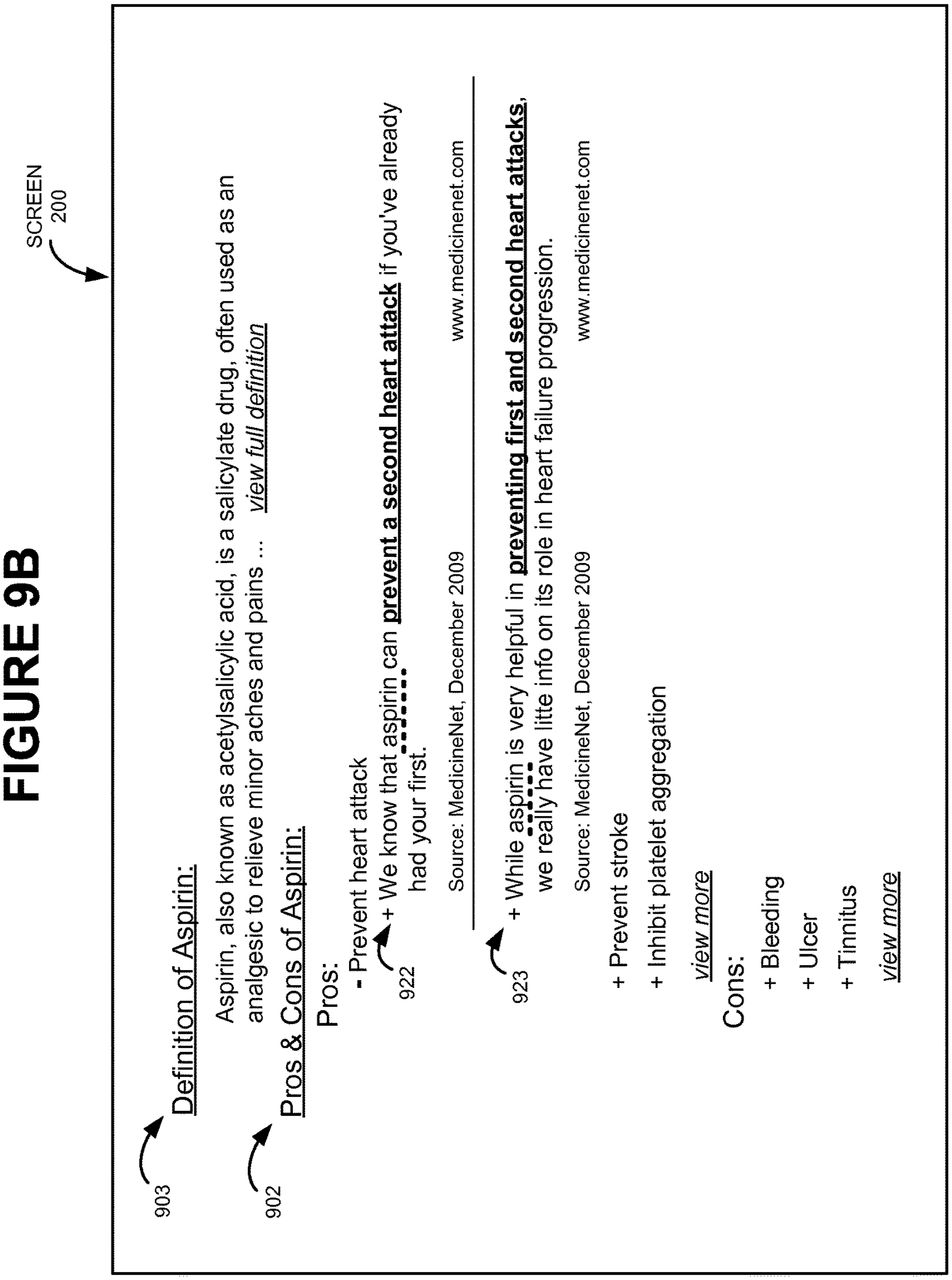
FIG. 9B shows an example to motivate grouping of each result-value under its respective frame type.

However, for the example of finding the pros and cons of using aspirin, as shown in part 902 of FIG. 9B, the following two frame types were used: Pro Frame and Con Frame. As can be seen in FIG. 9B, role-value-oriented search results instantiated from the Pro Frame are grouped under a "Pros" heading while the role-value-oriented search results instantiated from the Con Frame are grouped under a "Cons" heading.

Part 903, of FIG. 9B, is a definition of the treatment (in this case, aspirin) upon which the pros and cons search was performed. The automated generation of definitions is addressed in Section 5.2.4.1 ("Descriptor") of the '068 Application. The '068 Application addressed the generation of definitions for a "technology." However, essentially the same process can be used to generate a definition for a treatment (or a condition).

4.3 Brand Research

An FBSE that performs brand research, in the manner of the example of Section 2.4 ("Brand Research"), can be constructed very similarly to a technology profiling FBSE, as discussed above in Section 4.1 ("Technology Profiling"). Rather than producing a profile of a technology, the profile of a "brand" is produced instead.

To determine the pros and cons of a brand, essentially the same techniques can be used as those that were described for finding the pros and cons of a technology.

Finding pros and cons of a technology are discussed in the following sections:

Section 2.2 ("Technology Profiling") and its illustrations of FIGS. 2A-2D Section 4.1 ("Technology Profiling")

Section 6.1 ("Technology Profiling") and, in particular:

6.1.4.2 ("Pros Frame")

6.1.4.3 ("Cons Frame")

For any brand-related frame extraction rule, rather than use the feature TECHNOLOGY, as is used, for example, in the example frame extraction rule of Section 6.1.2.1 ("Benefits Frame"), a feature called BRAND can be substituted. It is possible to produce a useful brand research system where the definition, for the BRAND feature, is essentially the same as that given (see, for example, Section 7.3 "Features") for TECHNOLOGY.

In addition to a Pros Frame and a Cons Frame, additional frames, that can be useful for brand research, include:

1. Emotion-related Frames
   a. Any frame that relates a brand to an emotion, such as "Love," "Hate" or "Like."
   b. Frame extraction rules, for a frame of this type, look for a member (e.g., a person) of a relevant market expressing the target emotion in relation to the brand.
   c. An example emotion-related frame, for the emotion "like," can be structured as follows. It relates a brand, as identified by a brand name in the Brand_Role, to what is liked about the brand, as identified by the value of the Like_Role:
      Name: "Like Frame"
      Brand Role: <Brand Name>
      Like Role: <What is liked?>
2. Memories evoked by a brand
   a. It can be useful to identify memories evoked by a brand, in members of the relevant, because memories can produce emotional responses—such as those sought by the above-discussed Emotion-related Frames.

b. An example memory-evoked frame can be structured as follows. It relates a brand, as identified by a brand name in the Brand_Role, to what is remembered because of the brand, as identified by the value of the Memory_Role:
Name: "Memory Frame"
Brand Role: <Brand Name>
Memory_Role: <What is remembered?>

3. Behavior-related frames
   a. Any frame that relates a brand to a behavior, such as: preferring the brand over other options or not using the brand because of other options.
   b. Frame extraction rules, for a frame of this type, look for a member (e.g., a person) of a relevant market exhibiting a target behavior in relation to the brand.
   c. An example behavior-related frame, for the behavior of preferring the brand, can be structured as follows. It relates a brand, as identified by a brand name in the Brand_Role, to an option (including other brands) that the brand is seen as preferable to, as identified by the value of the Prefer_Role:
      Name: "Prefer Frame"
      Brand Role: <Brand Name>
      Prefer_Role: <What is brand preferable to?>
   d. An example behavior-related frame, for the behavior of not-using the brand, can be structured as follows. It relates a brand, as identified by a brand name in the Brand_Role, to an option (including other brands) that is used instead of the brand, as identified by the value of the Instead_Role:
      Name: "Instead Frame"
      Brand Role: <Brand Name>
      Instead Role: <What is used instead of brand?>

5 Frame-Based Search

This section (i.e., Section 5) addresses how a search result can be produced using frames, where such search result uses the knowledge (or semantics) expressed in the corpus of natural language (or "Source Corpus") that is searched.

5.1 Overview

5.1.1 Frames

Figure 13:
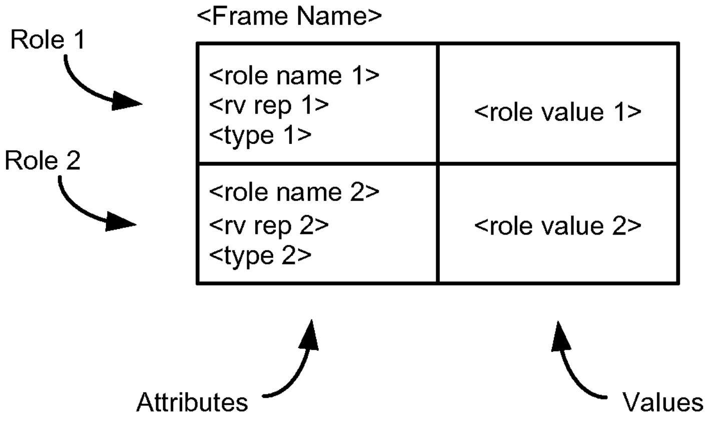
FIG. 13 depicts a generic frame structure.

In general, a frame is a structure for representing a concept, wherein such concept is also referred to herein as a "Frame Concept." A frame specifies a concept in terms of a set of "roles." Any type of concept can be represented by a frame, as long as the concept can be meaningfully decomposed (or modeled), for the particular application, by a set of roles. FIG. 13 shows a generic frame comprised of two roles. A frame can be referred to by a unique label called a "Frame Name" (in FIG. 13, a location, where a Frame Name can be stored, is shown as <Frame Name>). Each role of a frame can be represented by a collection of attributes, called herein "role attributes." For the example frame of FIG. 13, each role is shown as having three attributes: role name, role value representation and role type.

The attribute "role name" stores a label for a role that is unique (at least within its frame). In FIG. 13, the two locations, where a role name can be stored, are shown as <role name 1> and <role name 2>.

A role's value requires some kind of representation, referred to herein as its "role value representation" (in FIG. 13, the two locations, where the role value representation can be specified, are shown as <rv rep 1> and <rv rep 2>).

Depending upon the role, and its function in representing a frame's Frame Concept, a particular "type" (or types) of role value can be assigned to it. Thus, among the full set of values that could otherwise be assigned to a role, a "role type" serves to limit the set of permissible values. The type of a role value can be specified by one or more attributes. In the example of FIG. 13, each role is shown as having one type-specifying role attribute: <type 1> for Role 1 and <type 2> for Role 2.

A set of frames, that serves as the semantic basis of a frame-based search, can be called the search's "Frame Set." Example Frame Sets, for the example search types discussed herein, are presented below in Section 6 ("Example Frame Sets").

5.1.2 Frame Extraction Rules

A particular "invocation" (see below Glossary of Selected Terms for definition) of a Frame Concept, by a "UNL" (see below Glossary of Selected Terms for definition), can be represented by an "instance" of the frame (also called a "frame instance"). A frame instance is the same as the frame itself, except that, for each role, a value (also referred to herein as a "role value") has been assigned (in FIG. 13, the two locations, where a role value can be stored, are shown as <role value 1> and <role value 2>). These role values (usually drawn from the invoking UNL) represent the specifics of how the Frame Concept is used at a particular location in a Source Corpus.

Identification, of when a frame's Frame Concept is invoked by a UNL, can be determined by a set of linguistic rules, each rule herein called a "frame extraction rule." A set of frame extraction rules, that all relate to a particular frame, can be called the frame's "Rule Set." Ideally, a frame's Rule Set is able to detect whenever the frame's Frame Concept is invoked, and thereby produce a frame instance representing each particular use of the Frame Concept. "Frame extraction," as used herein, refers to the utilization of a frame extraction rule to determine whether a frame is invoked by a UNL.

Example frame extraction rules, for the example search types discussed herein, are presented below in Section 6 ("Example Frame Sets").

5.1.3 Frame-Based Search Engine

Figure 14A:
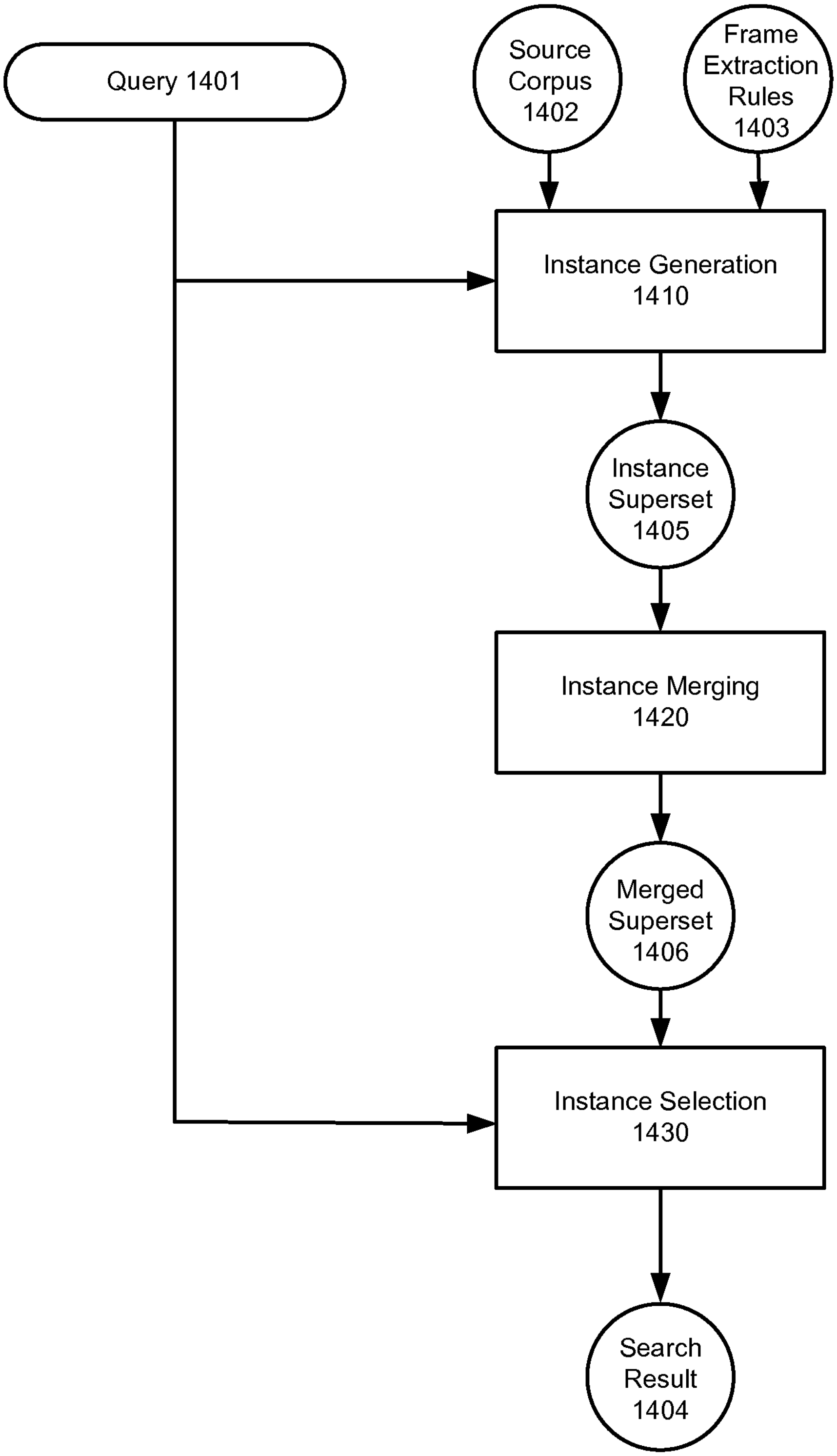
FIGS. 14A-B present a generic Frame-Based Search Engine (FBSE).

A Frame-Based Search Engine (FBSE), that accepts a user's query and outputs a search result, can be described as operating in three main steps (see FIG. 14A):

1. Instance Generation (step 1410): generation of a set of instances (called the "Instance Superset" and indicated, in FIG. 14A, as set 1405), by applying frame extraction rules (see 1403), for the frames relevant to the search, and a search query (see 1401), to a Source Corpus (see 1402). The frames relevant to the search can be called the "Organizing Frames."
2. Instance Merging (step 1420): merging together seemingly independent instances, of a set of instances (such as Instance Superset 1405), into a single instance "x." If a merge is deemed appropriate, the previously independent instances are re-classified as just different "instance-mentions" of a same instance "x." The result of Instance Merging 1420 is depicted as Merged Superset 1406.
3. Instance Selection (step 1430): selecting instances, of an input set of instances (such as Merged Superset 1406), for inclusion in a Search Result (see 1404), using the criteria of a user Query (see 1401).

Instance Generation is performed before the steps of Instance Merging or Instance Selection. Instance Merging and Instance Selection, however, can be performed in either order, depending upon the particular application. For example, if the ordering is Instance Merging 1420 followed by Instance Selection 1430, then the input to Instance Merging 1420 is Instance Superset 1405 and the input to Instance Selection 1430 is Merged Superset 1406. Alternatively, if the ordering is Instance Selection 1430 followed by Instance Merging 1420, then the input to Instance Selection 1430 is Instance Superset 1405 and the input to Instance Merging 1420 is Search Result 1404 (with Merged Superset 1406, produced by Instance Merging 1420, serving as the actual search result).

Production of a search result can be accomplished by using, for example, the computing environment described in Section 7.5.

5.2 Instance Generation 5.2.1 Overview

The Instance Superset can be generated in accordance with any suitable technique, depending on the particular application. While the principles described herein can be applied to a small Source Corpus, this section (Section 5.2) will focus upon instance generation where the Source Corpus is large. Small and large Source Corpora are defined as follows:

Small Corpus: an amount of computer-accessible data (e.g., text) small enough such that it can be fully processed (from the source computer-accessible data to a desired search result), in an amount of time acceptable to a user, after a query is entered.

Large Corpus: an amount of computer-accessible data (e.g., text) large enough such that it cannot be fully processed (from the source computer-accessible data to a desired search result), in an amount of time acceptable to a user, after a query is entered.

Figure 14B:
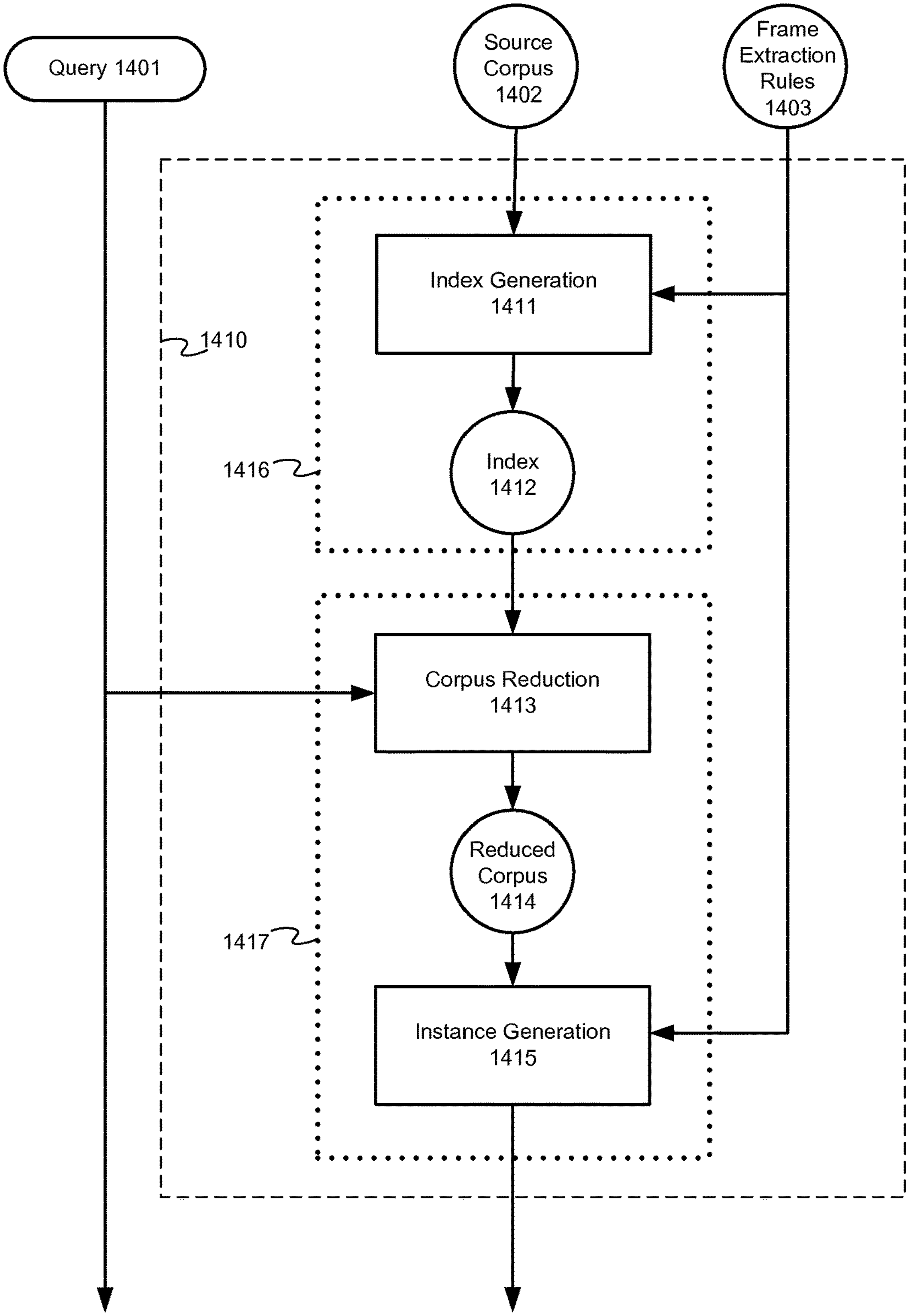

Instance Generation is described below in conjunction with FIG. 14B. FIG. 14B represents a possible expansion of Instance Generation process box 1410 of FIG. 14A. In FIG. 14B, process box 1410 is represented by a dashed outline 1410, said outline 1410 receiving the same inputs, and producing the same outputs, as process box 1410 of FIG. 14A.

FIG. 14B divides process 1410 into two main phases: pre-query processing (enclosed in dotted outline 1416) and post-query processing (enclosed in dotted outline 1417). Each of these phases is described below.

5.2.2 Pre-Query Processing 5.2.2.1 Overview

The objective of pre-query processing is to produce a "Frame-Based DataBase" (FBDB) from the Source Corpus. An FBDB means that a Source Corpus has been analyzed for where (if at all) certain concepts are used within it. The concepts, for which the Source Corpus is analyzed, are the Frame Concepts of the Organizing Frames of the FBDB. An FBDB may be produced for just one Frame Concept as represented by one Organizing Frame.

Production of an FBDB means that, at least, an index has been produced. The index permits the fast location of occurrences, in the Source Corpus, of concepts modeled by the Organizing Frames.

Thus, in FIG. 14B, pre-query processing 1416 is represented by the production of an index 1412, by an index generation process 1411, given the inputs of a Source Corpus 1402 and frame extraction rules 1403.

Pre-query processing can be divided into the following two main operations:

1. UNL-by-UNL Preprocessing
2. Pre-query Indexing

Each of these operations is described below.

5.2.2.2 UNL by UNL Preprocessing

A large Source Corpus can be processed on a UNL-by-UNL basis (e.g., on a sentence-by-sentence basis) to produce an FBDB. For each UNL ("UNL current") processed, each potentially applicable frame extraction rule ("rule_current") is evaluated for whether it is invoked by UNL_current to produce an instance ("I_current").

Whether a rule_current is evaluated depends upon the FBDB being generated and the frame(s) such FBDB includes as its Organizing Frames.

To determine whether a rule_current applies to a UNL_current, each UNL_current can be converted, by a semantic parser, into a representation known as "Logical Form." Logical Form is described in greater detail in below Section 7.1 ("Logical Form"). To present more detailed definitions, of example frame extraction rules, a pseudo-coded representation is defined below in Section 7.2 ("Frame Extraction Rules").

5.2.2.3 Pre-Query Indexing

For each UNL ("UNL_current") that produces an instance I_current, as a result of the UNL-by-UNL processing, an amount of content, referred to herein as a "snippet," that at least includes UNL_current, can be indexed for an FBDB. The index then makes it possible, during post-query processing, that a suitably fast response is provided to a user's query.

Design of a Pre-query Indexing process involves the following choices:

1. Size of snippet: typically, the snippet includes, at least, the UNL_current that has triggered a frame extraction rule, of a frame's Rule Set. The snippet, however, can include an amount of content of the Source Corpus that is larger than UNL_current. Section 7.4 ("Snippet Formation") discusses further some of the issues in determining snippet size. Regardless of the snippet size used, UNL_current can be called the "focus UNL" (or, where the UNL is the sentence, the "focus sentence") of the snippet.
2. Snippet caching: a copy of each snippet can be cached in the FBDB for which it was produced, with each such snippet copy having a pointer to the location in the Source Corpus from which it is derived. In this case, the index of the FBDB can point to the snippet copies. Alternatively, the FBDB can be comprised of an index that has pointers, and snippet size information, such that a copy of any needed snippet can be regenerated, as needed, from the Source Corpus.
3. Snippet indexing: any suitable index or indices can be determined for fast retrieval of snippets from an FBDB. Two example indices, discussed just below, are keyword indexing and frame indexing.

For keyword indexing, any kind of conventional keyword index can be produced. For this type of index, each word of each snippet, except for "stop words" (see below Glossary of Selected Terms for definition), can be indexed.

For frame indexing, the following can be performed. Each time a focus UNL causes the invocation of a frame "F_1," to produce an instance "I_1," each word, of the role value of I_1's input role, can be indexed.

A frame index is likely to yield less snippets, in response to a user's query, than a keyword index. If the topic sought for searching is thoroughly discussed by the Source Corpus (e.g., it is a well-known condition or treatment), then utilization of a frame index will likely yield sufficient results. If the topic sought for search is infrequently discussed by the Source Corpus (e.g., it is a rare condition), then a frame index may not produce sufficient results. For such infrequently-referenced topics, a user may want to apply a keyword index as an addition to, or instead of, a frame index.

5.2.2.4 Alternation

Alternation, between UNL-by-UNL Preprocessing and Pre-query Indexing, can vary depending upon the particular application and the particular desired characteristics of the FBSE. For example, essentially all UNL-by-UNL Preprocessing can be completed first, before Pre-query Indexing is begun. As another example approach, pre-query processing can alternate (between UNL-by-UNL Preprocessing and Pre-query Indexing) on a UNL-by-UNL basis.

5.2.3 Post-Query Processing

The objectives of post-query processing (shown within dotted outline 1417 of FIG. 14B) are twofold:

1. Production of a reduced corpus 1414 (by Corpus Reduction step 1413) through use of index 1412 and query 1401; and
2. Generating the instances of an Instance Superset 1405 (by Instance Generation step 1415) from reduced corpus 1414.

Each of these operations is further described below.

5.2.3.1 Producing a Query Selective Corpus

Production of a reduced corpus can also be called production of a query-selective corpus, since a query is the basis by which to select limited content from a Source Corpus.

Once produced, as described above (see Section 5.2.2.3 "Pre-query Indexing"), an index or indexes can be used (by, for example, Corpus Reduction process 1413 of FIG. 14B) to retrieve a set of snippets (also called a Reduced or Query Selective Corpus 1414), from an appropriate FBDB, that are likely to be of relevance for the search result to be generated. Such snippet selection represents a rapid way to reduce a large Source Corpus to a smaller Query Selective Corpus (such as the retrieved set of snippets) that can be processed in the time available for responding to a query (e.g., within a delay period that is acceptable to a user of the FBSE).

For example, when used with a keyword index, the query can be decomposed into a set of its constituent lexical units, excepting any stop words (while well known in the art, a definition of stop words is presented in the Glossary). Such set of lexical units is called herein a "constituent lexical unit set." Standard techniques can then be used, that access the keyword index with each member of the constituent lexical unit set and produce an initial set of snippets for a Query Selective Corpus. In essentially the same manner as for a keyword index, a frame index can be accessed, with the constituent lexical unit set of the query, to produce a Query Selective Corpus.

The snippets of the Query Selective Corpus can be ranked in order of decreasing match quality to the query (e.g., Query 1401). If the Query Selective Corpus is too large, only the first "n" snippets can be kept for further processing. As an example value for "n," only the first 3,000 snippets can be kept in the Query Selective Corpus.

5.2.3.2 Producing An Instance Superset

A similar process to that described above (see Section 5.2.2.2, "UNL by UNL Preprocessing"), which is applied to a Source Corpus, can be applied (by Instance Generation process 1415) to the Query Selective Corpus. The Query Selective Corpus can be processed on a UNL-by-UNL basis (e.g., on a sentence-by-sentence basis). For each UNL ("UNL_current") processed, each potentially applicable frame extraction rule ("rule_current") is evaluated for whether it is invoked by UNL_current to produce an instance ("I_current"). Each I_current produced can be added to the Instance Superset (such as Instance Superset 1405 of FIG. 14A).

5.3 Instance Merging 5.3.1 General Description

The set of instances to which Instance Merging is applied can be the Instance Superset, if just Instance Generation (as described above in Section 5.2) has been performed. Alternatively, Instance Merging can be applied to a Search Result, if Instance Generation and Instance Selection (described below in Section 5.4) have been accomplished. For either case, in this section (Section 5.3), the input set of instances shall be referred to as the "Instance Set."

The Instance Merging described in this section assumes that each member, of the Instance Set, has just two roles. A subset of an Instance Set (called "Subset_1") can have its members merged together when such subset satisfies the following two conditions:

Each member of Subset_1 is instantiated from a same frame; and

For each unique role, when considered across all members of Subset_1, the same (or sufficiently similar) value has been assigned.

If all members of a Subset_1 are merged together, the subset can be regarded, for purposes of producing a search result, as a single instance. Each member, of a merged Subset_1, can be referred-to as an instance-mention.

5.3.2 Pseudo-Code

FIG. 16 presents an example pseudo-coded (see below Glossary of Selected Terms for definition) procedure, called "Instance_Merge," for performing Instance Merging on an Instance Set called "Instance_Set." The pseudo-code operates as follows, with line numbers being references to FIG. 16.

Instance_Set is assumed to have internal state (referred to herein as "sequence-state") whereby a function, such as "Next_Pair" (line 7), is able to generate a sequence of possible instance pairs of Instance_Set. Instance Merge begins by re-setting the sequence-state of Instance_Set with a call to "Reset_Next_Pair" (line 4).

A "while" loop is then begun (line 7), that continues to execute while Next_Pair returns TRUE. Each call to Next_Pair causes the following. A pair of instances is selected from Instance_Set and assigned to: Instance_1 and Instance_2. For a given set of instances in Instance_Set, Next_Pair is defined as returning a sequence (one pair per invocation) of the possible instance pairs.

First and second tests are then performed which, if both satisfied, result in a merging of Instance_1 and Instance_2 by "Merge_Instances" (line 19). Merge_Instances is defined as replacing its two arguments, in Instance_Set, with the merger of Instance_1 and Instance_2. Such modification of Instance_Set creates the possibility for a new sequence of possible instance pairs. For this reason, following Merge_Instances, the sequence-state is reset by a call to Reset_Next_Pair (line 20).

The first test checks for whether Instance_1 and Instance_2 were produced from the same frame by calling "Same_Frame" (line 10). Same_Frame is defined to return TRUE if the instances are from a same frame. If the first test is satisfied, a second test checks for whether the corresponding roles, of Instance_1 and Instance_2, have sufficiently similar values. The second test is performed by two calls to "Match_Role_Values" (lines 13-14 and 16-17). In the first call to Match_Role_Values (lines 13-14), the role value assigned to the input role of Instance_11 is compared to the role value assigned to the input role of Instance_2. In the second call to Match_Role_Values (lines 16-17), the role value assigned to the output role of Instance_1 is compared to the role value assigned to the output role of Instance_2.

A discussion of Match_Role_Values is presented in the following section.

5.3.3 Matching Role Values

Matching, between role values, depends on the type of representation to be compared. The two main role value representations addressed herein are:

- A string type representation that is treated as one or more lexical units; or
- A representation internally analyzable; for example, a representation that can be converted to Logical Form (see Section 7.1 "Logical Form" for a definition of Logical Form).

5.3.3.1 Lexical Unit

Matching, between role values, where each role value is treated as one or more lexical units, can proceed as follows.

If the two role values are identical, a match can be indicated.

If one role value is determined to be a substring of the other role value, or if both role values are determined to share a sufficiently substantial substring, a match can be indicated. Any suitable techniques for substring matching, known in the art, can be used. For example, the phrases "the fuel cell technology," "the fuel cell application" and "the fuel cell software" can all be regarded as sharing a sufficiently substantial substring, such that all can be regarded as referring to a "fuel cell."

If one role value is determined to be an acronym of the other, or if both role values are determined to be acronyms of a common term, a match can be indicated.

Any suitable techniques for acronym matching, known in the art, can be used. For example, if one role value is "natural language processing," the role value "NLP" could be regarded as matching.

Each role value RV_1 can be replaced by a set of role values RVS_1, where each member of RVS_1 is believed to mean the same as RV_1, by a process called "lexical expansion." In lexical expansion, the following operation can be performed on any combination of the lexical unit or units forming RV_1: for each lexical unit, within RV_1, it can be replaced by another lexical unit that is known to be synonymous. For example, if a role value "fuel cell" is to be matched, the lexical unit "battery" could replace the lexical unit "cell." Such replacement would mean that the role value "fuel battery" could be regarded as matching the role value "fuel cell."

5.3.3.2 Logical Form

Matching, between two role values, where each role value is represented as (or converted into) a Logical Form, can proceed as follows.

Matching can begin at the root node of each role value. Each corresponding pair of nodes can be selected by traversing each Logical Form in any appropriate order (e.g., depth first or breadth first). Each node, of a pair of corresponding nodes, has a fragment (comprised of one or more lexical units) of the UNL that triggered creation of the Logical Form. In a manner similar to that discussed above (5.3.3.1 "Lexical Unit"), the pair of textual fragments can be compared.

As long as identity, or sufficient identity, is determined between each pair of textual fragments traversed, the two Logical Forms are considered to match.

As an example, two Logical Forms may only be traversed from the root (which can represent a verb) to the direct children (that can represent the object of the verb). For example, the phrases "increased density" and "increased bone density" will appear the same if the Logical Form for each is only compared from the root to the direct child. In each case, the root is the verb "increased" and the object (at the direct child level) is "density." The modifier "bone," for the phrase "increased bone density," appears in the Logical Form at the grandchild level.

5.4 Instance Selection

Once a suitable Instance Set has been generated, selection, of those instances corresponding to an input query, can be accomplished. As discussed above, such selection can be accomplished before or after Instance Merging.

FIG. 17 depicts an example pseudo-coded procedure, called "Instance_Select," for accomplishing Instance Selection. Line numbers, referenced below, refer to FIG. 17. The inputs to Instance_Select are as follows:

- Input Instance_Set a set of instances (such as Instance Superset), from which a subset of instances is to be selected;
- Input_Rep: a representation of the query, that is to be selected-for among the input roles of the instances of Input Instance_Set.

The outputs of Instance_Select are as follows:

- Output Instance_Set the subset, of Input Instance_Set, selected by Instance_Select; assumed by Instance_Select to be initially empty;
- Output_Rep_Set a set of query representations, each indicating the same query as that of Input_Rep; Output_Rep_Set is assumed to be initially empty and its members are identified by Instance_Select through the process of selection for Output_Instance_Set.

Instance_Select begins by setting (at line 4) the output set (i.e., Output_Rep_Set), of query (or input role value) representations, to contain just the query passed to the procedure by Input_Rep.

Next, a "while-loop" is begun (line 7). The while-loop iterates through the instances of Input_Instance_Set by successively calling "Next_Instance." Next_Instance sets Instance_Current to a next instance of Input Instance_Set, and Next_Instance sets state, associated with Input_Instance_Set, such that, after sufficient calls to Next_Instance, each instance of Input Instance_Set has been assigned to Instance_Current.

Within each iteration of the while-loop, a "for-loop" is begun (line 9). The for-loop iterates through the query values stored in Output_Rep_Set, setting each such representation to Current_Rep. For each iteration of the for-loop, Match_Role_Values (line 10) compares the role value of the input role of Instance_Current with the query value assigned to Current_Rep. If the values are the same, or sufficiently similar, lines 11-16 are executed. Lines 11-16 perform the following.

The Instance_Current is moved from the Input_Instance_Set to the Output_Instance Set (line 11). Next, a test is made of whether the two values, just compared by Match_Role_Values, are represented in exactly the same way (line 12). If the two representations are not exactly the same, then the input role value assigned to Instance_Current appears to represent a broadening of the set of possible representations for the query, and lines 13-14 are executed. Lines 13-14 perform the following.

The alternate representation of the query, assigned to Instance_Current, is added to the set Output_Rep_Set (line 13). Also, the iteration of the while-loop, through the instances of Input Instance_Set, is reset (line 14). The reset is performed because the new representation of the query, added to the set Output_Rep_Set, means that each instance not previously added to Output Instance_Set, because its input role value did not match the set of query representations of Output_Rep_Set, might now match the newly-added query representation.

Regardless of whether the two values match exactly, once a match has been determined, it is known that the for-loop need no longer be executed, since Instance_Current has already been added to the Output_Instance_Set. Therefore the for-loop is ended (line 16).

5.5 Result Presentation 5.5.1 Overview

Once a Search Result has been produced, any appropriate technique(s) can be used to achieve a more effective presentation, to the user, of the instances of which it is comprised. This Section presents several example techniques. Any combination of the following techniques can be used, depending upon the particular application.

5.5.2 Role-Value Oriented Presentation

It is often useful to present to a user a Search Result that emphasizes the role values of the output roles. The usefulness of this presentation approach arises from the fact that it emphasizes the information the user is seeking. Also, because a single instance can represent multiple records (or snippets) that have matched a query, it also presents a more compact search result that a user can review more quickly.

A role-value oriented presentation, of a search result, can be achieved as follows: for each instance of the Search Result, its output-role role value is displayed (by using some appropriate character string) as a primary "result" of the search. The character string, representative of the role value of an instance's output role, can be referred-to as a "role-value-oriented search result."

When an instance contains only one output-role role value, its role-value-oriented search result can be the same as its output-role role value. However, where an instance of a search result is comprised of multiple instance-mentions, a common (or summarizing) role-value-oriented search result is needed. Any suitable technique can be used to determine a role-value-oriented search result that represents an appropriate commonality and/or summarization of an instance's multiple output-role role values.

Once a user has identified a role-value-oriented search result of particular interest, the user can be provided with an option to view the records (or snippets) on which it is based. For each such snippet displayed, the portion that corresponds to the role-value-oriented search result can be highlighted (or otherwise emphasized). Also, it may be useful to display, in some other highlighted (or emphasized) way, the portion of each snippet that matches the input query.

5.5.3 Grouping by Role Value Type

When viewing a role-value oriented search presentation, it can be useful to group the role-value-oriented search results according to their type.

5.5.4 Grouping by Frame Type

When viewing a search result, of a frame-based HRSE, it can be useful to group each search result according to the frame from which it is instantiated.

6 EXAMPLE FRAME SETS 6.1 Technology Profiling 6.1.1 Overview

This section describes an example Entity Profile Frame Set, where the entity for profiling is a Technology Candidate. Such Entity Profile Frame Set can be referred to as a "Technology Profile Frame Set."

Frames are first categorized according to their meta-type, which are:

1. Action-centric: Used where main characteristic sought for modeling is, with respect to a profile's Anchor Entity, the doing of an action or occurrence of an event.
2. Relational: Used where main characteristic sought for modeling is a relationship between the Anchor Entity and at least one other entity.
3. Categorical: Used where the main objective is to capture descriptive information about the Anchor Entity.

Within each frame meta-type, each frame definition follows the following format:

1. Begins with the frame's name (that is usually chosen to be representative of the frame's Frame Concept)
2. Lists the set of roles comprising the frame (representing the major components of the frame's Frame Concept)
3. Pairs each role with a symbolic role value of the form <role value>
4. Discussion of frame's semantics For just the Benefits Frame, an example frame extraction rule is also presented in a pseudo-coded form. The pseudo-code format is defined in section 7.2 ("Frame Extraction Rules"). An example frame extraction rule, for each of the other frame types, can be found in the '068 Application.

Since the Anchor Role Value, for each frame of this section, is representative of a technology-type entity, all of the example frame extraction rules use a "feature" (see Section 7.3 "Features," for definition of feature) called TECHNOLOGY. An example definition for the TECHNOLOGY feature is also presented in Section 7.3. The example definition of TECHNOLOGY is intended to be broad. In this way, when a Source Corpus is subjected to Entity Profile processing, the set of entities with profiles will be broader and more likely to cover a Technology Candidate of the technology searcher.

6.1.2 Action-Centric Type 6.1.2.1 Benefits Frame 6.1.2.1.1 Frame Definition

Name: "Benefit Frame TP"
Technology_Role: <Technology Name>
Benefit_Role: <Benefit Here>

6.1.2.1.2 Discussion

The "Benefit Frame TP" is used to answer the question: "what are the benefits of this technology?" Benefit Frame TP (where "TP," when used as part of the name for a frame or a frame extraction rule, means Technology Profiling) is used as part of profiling a Technology Candidate. Compared with the Benefit Frame utilized for technology scouting in the '122 and '127 Applications (that is re-presented below in Section 6.2.1 "Benefit Frame"), Benefit Frame TP is simplified. The Instrument and Benefactor roles, of the Benefit Frame, become the Technology_Role in Benefit Frame TP. Of the other roles of Benefit Frame, just the Benefit role is used in Benefit Frame TP.

6.1.2.1.3 Example Rule

An example frame extraction rule for a Benefit Frame TP is shown in FIG. 11A. A general description of the rule's function is as follows. If IMPROVE is identified, with an Actor representing a TECHNOLOGY and an Undergoer, then the IMPROVE, along with the textual parts of its sub-tree, maps to the Benefit_Role and the TECHNOLOGY maps to the Technology_Role.

In terms of the pseudo-code of FIG. 11A, the frame extraction rule can be described, in more detail, as follows. As can be seen, the name for the rule is "IMPROVE_Rule_TP" (line 1). The rule matches a Logical Form where:

The text assigned to a root node "r_1" names an IMPROVE verb (line 2);

A child node "c_1," to root node r_1, is of type Actor (line 3);

The text, assigned to c_1, is TECHNOLOGY;

A child node "c_2," to root node r_1, is of type Undergoer (lines 4-5);

The text, assigned to c_2, is a BADTHING or a NON-BADTHING.

Once the conditional part of the IMPROVE_Rule_TP has been determined to fire, its action part can do the following:

The text satisfying the TECHNOLOGY feature is assigned to the Technology_Role (line 3);

The text assigned to the Benefit_Role comprises the text assigned to r_1 (line 2); and Because the Benefit_Role is enclosed in square brackets, the verb phrase (see section 7.2.2 "Pseudo-Coded" for discussion of verb phrase) under r_I is assigned to the Benefit_Role (and not just the verb that matches IMPROVE).

FIG. 11B shows an example sentence that can be converted, by a semantic parser, to a Logical Form of FIG. 11C. The Logical Form of FIG. 11C will match the rule of FIG. 11A, producing the instance of FIG. 11D.

6.1.2.2 Problems Frame 6.1.2.2.1 Frame Definition

Name: "Problem Frame TP"
Technology_Role: <Technology Name>
Problem_Role: <Problem Here>

6.1.2.22 Discussion

The Problem Frame TP is used to answer the question: "what are the problems with this technology?" Problem Frame TP is used as part of profiling a Technology Candidate. Compared with the Problem Frame utilized for "market scouting" in the '122 and '127 Applications (that is re-presented below in Section 6.2.2 "Problem Frame"), Problem Frame TP is simplified. The Adversary and Method roles, of the Problem Frame, become the Technology_Role in Problem Frame TP. Of the other roles of Problem Frame, just the Problem role (specified as Problem_Role) is used in Problem Frame TP.

Problem Frame TP allows one to identify problems, of the Technology Candidate itself, from users of a technology. (To highlight the differences, between the profiling of a technology and the technology scouting process by which candidate technologies can be identified, it is worth noting that the Problem role, of the Benefit Frame of technology scouting, is used to identify technologies that can solve a problem.) Knowledge of a technology's problems can be helpful for such activities as: the design of a new product or the improvement of an existing product.

6.1.3 Relational Type 6.1.3.1 Inventors Frame 6.1.3.1.1 Frame Definition

Name: "Inventors Frame"
Technology_Role: <Technology Name>
Inventors_Role: <Inventor Here>

6.1.3.1.2 Discussion

The value for the Inventor role describes an entity that has developed or contributed to the development of the Technology. Typically the entity is a person. The Inventors Frame is used to answers the question: "who invents the technology?"

6.1.3.2 Experts Frame 6.1.3.2.1 Frame Definition

Name: "Experts Frame"
Technology_Role: <Technology Name>
Experts_Role: <Expert Here>

6.1.3.22 Discussion

The value of the Expert role describes a person who has been noted for their expertise in the Technology. The Experts Frame is used to answer the question: "who are the experts on this technology?"

6.1.3.3 Sellers Frame

This frame is used to answers the question: Who makes or sells the technology?

6.1.3.3.1 Frame Definition

Name: "Sellers Frame"
Technology_Role: <Technology Name>
Sellers Role: <Seller Here>

6.1.3.3.2 Discussion

The value of the Seller role describes an entity that sells the Technology. Typically the entity is a company. The Sellers Frame is used to answers the question: "who makes or sells the technology"

6.1.3.4 Users Frame 6.1.3.4.1 Frame Definition

Name: "Users Frame"
Technology_Role: <Technology Name>
Users_Role: <User Here>

6.1.3.4.2 Discussion

The value of the User role describes an entity that uses the Technology. Typical entities can include an organization, person or location. The Users Frame is used to answers the question: "who uses this technology?"

6.1.3.5 DerivedProducts Frame 6.1.3.5.1 Frame Definition

Name: "DerivedProducts Frame"
Technology_Role: <Technology Name>
DerivedProducts_Role: <DerivedProduct Here>

6.1.3.5.2 Discussion

The value of the Derived Products (or Products Based On) role describes a product that is based on the Technology. A product can be a branded commercial product such as "TOYOTA PRIUS" or a product category such as "staplers." The DerivedProducts Frame is used to answers the question: "which products are derived from this technology?"

6.1.4 Categorical Type 6.1.4.1 Descriptor Frame 6.1.4.1.1 Frame Definition

Name: "Descriptor Frame"
Technology_Role: <Technology Name>
Descriptor_Role: <Definition Here>

6.1.4.1.2 Discussion

The Descriptor Frame is used to produce a definition of the Technology Candidate indicated by <Technology Name>.

6.1.4.2 Pros Frame 6.1.4.21 Frame Definition

Name: "Pros Frame"
Technology_Role: <Technology Name>
Pros_Role: <Pro Here>

6.1.4.2.2 Discussion

The Pros Frame is an example of a Modifier frame type, within the Categorical frame meta-type. It is used to represent GOOD features of the Anchor Entity and, in the case of a Technology Candidate, favorable modifiers of such technology.

6.1.4.3 Cons Frame 6.1.4.3.1 Frame Definition

Name: "Cons Frame"
Technology_Role: <Technology Name>
Cons_Role: <Con Here>

6.1.4.3.2 Discussion

The Cons Frame is an example of a Modifier Frame type, within the Categorical frame meta-type. It is used to represent BAD features of the Anchor Entity and, in the case of a Technology Candidate, unfavorable modifiers of the technology.

6.2 Healthcare-related 6.2.1 Overview

An example HFS, HFS52, that can be used to produce a frame-based HRSE (Section 4.2), is presented in this section (Section 6.2).

In the following Sections 6.2.2 to 6.2.6, each of the five frames of HFS52 is defined. An example frame extraction rule is also presented in Section 6.2.2 for the Treatment Frame. The frame extraction rule is presented in a pseudo-coded form and is then used to produce an example instance from an example input sentence.

The frame extraction rule pseudo-coded format is defined in Section 7.2. Before being tested against a frame extraction rule, an example input sentence is converted (by a semantic parser) into a representation called "Logical Form." The Logical Form format used herein is defined in Section 7.1.

When considering example pseudo-coded frame extraction rules, a "feature" can be identified as follows:

1. It can only appear in the "text based sub part" of a frame extraction rule's Logical Form rule; and
2. It appears in all capital letters.

Definitions for such features can be found in Section 7.3

6.2.2 Treatment Frame 6.2.2.1 Frame Definition

In general, and as depicted by frame 1003 of FIG. 10, a Treatment Frame relates a condition (such as a condition of condition set 1010 of FIG. 10) to a treatment (such as a treatment of treatment set 1011 of FIG. 10).

FIG. 10 depicts Treatment Frame 1003 as comprised of two roles:

II. Condition
  1. Used as input role.
  2. When used as an output role, can answer the following question: what medical condition can be solved (or at least mitigated) by the good action of a treatment?
  3. Typically limited to include only those lexical units that are from a specialized lexicon called "Condition Lexicon" (see below Glossary of Selected Terms for definition).

II. Treatment
  1. Used as output role.
  2. Can answer the following question: what treatment can produce a good action that solves (or at least mitigates) a condition?
  3. Its values can be grouped under categories, referred to herein as "Treatment Categories." Four example treatment Categories can include the following:
     1. Drugs & Medications,
     2. Chemicals,
     3. Foods & Plants,
     4. Treatments.

6.2.2.2 Example Rule

An example frame extraction rule for a Treatment Frame is shown in FIG. 12A. A general description of the rule's function is as follows.

Line 1 of FIG. 12A indicates the rule's name is: "DECREASE_POSSIBILITY_OF_PROBLEM_Rule."

First, a node must be found, in the Logical Form matched against the rule, that matches the root Logical Form rule of line 2 of FIG. 12A. If this root Logical Form rule is not matched, then greater computational efficiency can be achieved by avoiding the testing of any other of the rule's Logical Form rules. The root Logical Form rule is satisfied by a Logical Form node "n1," where n1 is the root of a Logical Form and the text represented by n1 matches (the feature) DECREASE. Note that the root Logical Form rule, even if triggered, does not have its action part assign a value to a role (indicated by "no_role" in the Logical Form rule's action part).

If the root Logical Form rule is satisfied, there are two mandatory Logical Form rules:

1. Logical Form rule of line 3:
   a. requires a Logical Form node meeting two conditions:
      i. it is of semantic constituent type "actor" and
      ii. its textual part represents (the feature) ANY_LEX_UNIT
   b. if its conditions are met (along with any other mandatory rules), assigns ANY_LEX_UNIT to the TREATMENT_ROLE
2. Logical Form rule of line 4:
   a. requires a Logical Form node meeting two conditions:
      i. it is of semantic constituent type "undergoer" and
      ii. its textual part represents (the feature) CHANCE
   b. the meeting of its conditions does not, in itself, satisfy the rule, but does result in a sub-Logical Form rule (of line 5) becoming mandatory for applicability of the entire frame extraction rule.
      i. Logical Form rule of line 5:
         1. requires a Logical Form node meeting two conditions:
            a. it is a "modifier" semantic constituent
            b. its textual part represents (the feature) DISEASE with a preposition
         2. Assuming the Logical Form rules of lines 2-4 have been met, satisfying line 5 means that the whole frame extraction rule (of FIG. 12A) will fire and thus create an instance. Line 5's contribution, to such instance, is to assign DISEASE (without the proposition) to the Condition_Role The frame extraction rule of FIG. 12A also includes an optional Logical Form rule:

1. Logical Form rule of line 6:
   a. Since it is an optional Logical Form rule, it need not be satisfied for the frame extraction rule to produce an instance.
   b. However, if the rule of line 6 is to contribute to the instance produced, it requires a Logical Form node meeting two conditions:
      i. it is a semantic constituent type "cause" and
      ii. its textual part represents (the feature) VING with a preposition
   c. if its conditions are met, assigns VING (without the proposition) to the TREATMENT ROLE FIG. 12B shows an example sentence that can be converted, by a semantic parser, to a Logical Form of FIG. 12C. The Logical Form of FIG. 12C will match the rule of FIG. 12A, producing the instance of FIG. 12D. Specifically, the following is accomplished:

modifier "heart attack" (FIG. 12C, line 4) gets assigned (by line 4 of FIG. 12A) to a CONDITION_ROLE (FIG. 12D, line 1)

actor "statins" (FIG. 12C, line 2) gets assigned (by line 3 of FIG. 12A) to a TREATMENT_ROLE (FIG. 12D, line 2)

cause "lowering blood cholesterol" (FIG. 12C, line 5) gets assigned (by line 6 of FIG. 12A) to a TREATMENT_ROLE (FIG. 12D, line 3)

6.2.3 Cause Frame

In general, and as depicted by frame 101 of FIG. 1A, a Cause Frame relates a condition (such as a condition of condition set 110 of FIG. 1A) to a potential cause of such condition (such as a cause of cause set 112 of FIG. 1A).

FIG. 1A depicts Cause Frame 101 as being comprised of two roles:

I. Condition
  A. Used as input role (same as I.A of Section 3.1 "Treatment Frame")
  B. When used as an output role, can answer the following question: what medical condition can be created (or at least enabled) by a cause?
  C. Typically limited to include only those lexical units from the Condition Lexicon.

II. Cause
  A. Used as output role.
  B. Can answer the following question: what causes (or at least enables) a condition?
  C. Typically limited to include only those lexical units from the Condition Lexicon.

The fact that the values for CONDITION and CAUSE are drawn from a same Condition Lexicon permits a cause to be, itself, input as a condition and its cause found with the Cause Frame. The process, of finding the "cause of a cause," can be applied indefinitely and/or in conjunction with finding the "effect of an effect" (see Section 3.3 "Effect Frame").

6.2.4 Effect Frame

In general, and as depicted by frame 102 of FIG. 1A, an Effect Frame relates a condition (such as a condition of condition set 110 of FIG. 1A) to a potential effect of such condition (such as an effect of effect set 113 of FIG. 1A).

FIG. 1A depicts Effect Frame 102 as being comprised of two roles:

I. Condition
  A. Used as input role (same as I.A of Section 3.1 "Treatment Frame")
  B. When used as an output role, can answer the following question: what medical condition can cause (or at least enable) an effect?
  C. Typically limited to include only those lexical units from the Condition Lexicon.

II. Effect
  A. Used as output role.
  B. Can answer the following question: what effect can be caused (or at least enabled) by a condition?
  C. Typically limited to include only those lexical units from the Condition Lexicon.

The fact that the values for CONDITION and EFFECT are drawn from a same Condition Lexicon permits an effect to be, itself, input as a condition and its effect found with the Effect Frame. The process, of finding the "effect of an effect," can be applied indefinitely and/or in conjunction with finding the "cause of a cause" (see Section 3.2 "Cause Frame").

Rather than using the more generally-know term of "effect," the healthcare profession generally refers to an effect as being either or both of the following: a "complication" or a "symptom." If needed for the particular HRSE, specialized lexicons, such as a Complication Lexicon of complications and a Symptom Lexicon of symptoms, can be used to appropriately categorize an effect.

6.2.5 Pro Frame

In general, and as depicted by frame 104 of FIG. 1A, a Pro Frame relates a treatment (such as a treatment of treatment set 111 of FIG. 1A) to a potential "pro" (or positive aspect) of such treatment (such as a pro of pro set 114 of FIG. 1A).

FIG. 1A depicts Pro Frame 104 as being comprised of two roles:

I. Treatment
  A. Used as input role.
  B. When used as an output role, can answer the following question: what healthcare treatment has its use favored by a pro?

II. Pro
  A. Used as output role.
  B. Can answer the following question: what consideration is in favor of utilization of a healthcare treatment?

6.2.6 Con Frame

In general, and as depicted by frame 105 of FIG. 1A, a Con Frame relates a treatment (such as a treatment of treatment set 111 of FIG. 1A) to a potential "con" (or negative aspect) of such treatment (such as a con of con set 115 of FIG. 1A).

FIG. 1A depicts Con Frame 105 as being comprised of two roles:

I. Treatment
  A. Used as input role.
  B. When used as an output role, can answer the following question: what healthcare treatment has its use disfavored by a con?

II. Con
  A. Used as output role.
  B. Can answer the following question: what consideration disfavors utilization of a healthcare treatment?

6.3 Brand Research

7 FURTHER INFORMATION 7.1 Logical Form

In general, a Logical Form representation is produced from analysis of a UNL "UNL_current" (where the UNL focused-upon herein is a sentence).

A Logical Form can be produced by what is known as, in the field of natural language processing, a "semantic parser." A Logical Form is intended to represent the semantics of a UNL_current. For this reason, it is desirable to produce a Logical Form that is, as much as possible, "semantically canonical." This means the following:

- Let "S_1" represent a set of UNL's, where each member of S_1 has a same underlying meaning but differing syntax.
- Each member of S_1 is, ideally, converted to a same Logical Form.

For example, a semantically canonical semantic parser, when given a passive sentence and an active sentence that both express the same meaning, will translate both sentences, as much as possible, into a same Logical Form.

A Logical Form can be represented as a collection of nodes, with each node representing a particular semantic aspect of a UNL_current. Assigned to each node of a Logical Form can be a fragment, of a UNL_current, closely associated with the semantics represented by such node.

If arranged in a tree form, such nodes (with their links) can be referred to as a "logical dependency tree." Some characteristics, of a dependency tree, are as follows:

- The root node is typically a logical verb (for a definition of logical verb, see "Glossary of Selected Terms").
- Each node under the root node can be called a "semantic constituent."
- A child node, at a level "n" of a logical dependency tree, is governed by its parent node at level n−1.

Semantic constituents comprise at least the following two types: core and modifier. Core semantic constituents specify key information, such as "who did what to whom." A core semantic constituent is also called (in the field of natural language processing) an "argument." Modifier semantic constituents carry information about other aspects of an action, that are optional or are only sometimes applicable.

Three core semantic constituents, and their definitions, follow:

Actor the logical subject

Undergoer the logical object

Complement: a secondary logical object, other than the Undergoer. Defined by a subcategorization feature of a logical verb.

Example modifier semantic constituents, and the types of questions they answer, include the following:

Time: answers the question of "when" did something happen

Location: answers the question of "where" did something happen

Cause: answers the question of "why" did something happen by denoting the cause of an action.

An important type of logical dependency tree (called herein an "ISA" tree) can be generated for what are called, at a more surface level, copula and appositive structures. Both copula and appositive structures refer to sentence forms that define a term (e.g., a noun phrase) by linking it to a definition (e.g., another noun phrase). For copula structures, the linking is performed by a verb (such as "to be" or "to become"). For appositive structures, the linking is indicated by a syntactic symbol (such as the comma) or by trigger words (such as "namely," "i.e." or "such as").

For an ISA dependency tree, the root node is the noun phrase that is being defined. One of the core semantic constituents is an "ISA" node that indicates a definitional noun phrase.

Examples, that help illustrate the above-listed semantic constituents, follow.

Because the Actor and Undergoer are logical, a passive and an active sentence, which both express the same meaning, will have the same Actor and Undergoer. For example, in both of the following sentences, "exercise" is the Actor and "bone density" is the Undergoer:

"Bone density can be enhanced by exercise" (passive form)

"Exercise can enhance bone density" (active form)

In both of the following examples (which are in ergative form at a surface level), the Undergoer is "the door":

"the door is opened"

"the door opens"

For both of the following sentences, "John" is the Actor, "book" is the Undergoer and "Mary" is the Complement:

"John gave Mary a book"

"John gave a book to Mary"

For the following phrase, "somebody" is the Undergoer and "for something" is the Complement:

"blame somebody for something"

The modifier semantic constituent Cause can be identified by searching for particular expressions that are indicative of something being a cause. Such expressions can include: "due to," "thanks to," "because of" and "for the reason of." In one of the above example sentences, depending upon the semantic parser, "by exercise" may also be identified as the Cause for the action "can be enhanced."

FIG. 11C depicts an example Logical Form that can be produced from the example sentence of FIG. 11B, by application (to FIG. 11B) of the frame extraction rule of FIG. 11A. Each line of FIG. 11C represents a node, while the tree structure is indicated by the indentation of the lines. The greater the indentation of a line (i.e., the further a line is from the margin), the further it is from the tree's root. A Logical Form node "LN_1" and a Logical Form node "LN_2" are, respectively, in a parent and child relationship when LN_1 is the first Logical Form node that is both above LN_2 and has a lesser indentation than LN_2. For example, in FIG. 11C, each of lines 2 and 3 specifies a node that is a child of the node specified by line 1, while line 4 is a child of line 3. Logical Form nodes "LN_1" and "LN_2" are in a sibling relationship when the following conditions are satisfied:

LN_1 and LN_2 are at the same indentation level; and between LN_1 and LN_2 there is no other Logical Form rule with a lesser amount of indentation.

In FIG. 11C, lines 2 and 3 represent sibling nodes.

Each node of a Logical Form, with the exception of the root node, can be represented by the following two parts:

1) a semantic-constituent indicating part; and 2) a textual part, that specifies the fragment of the input statement represented by the node.

In FIG. 11C, each of lines 2-4 represents a non-root node, with the semantic-constituent indicating part being to the left of a colon symbol and the textual part being to the right of the same colon symbol.

The root node of a Logical Form can be represented by the following two parts:

1) a root indicating part (that can be implicit); and 2) a textual part, that specifies the fragment of the input statement represented by the node.

In FIG. 11C, line 1 represents the root node, with the root indication being implicit (from the fact that line 1 has the least indentation) and the textual part comprising the text of the line.

7.2 Frame Extraction Rules 7.2.1 Overview

As discussed above, a frame extraction rule specifies a pattern that matches against a Logical Form which has been produced from an input statement (i.e., a UNL, such as a sentence). If the frame extraction rule matches, a frame instance is produced.

An overall structure, for a frame extraction rule, is that it expresses a tree pattern for matching against an input Logical Form. In general, a frame extraction rule has two main parts:

1) a conditional part that specifies the conditions under which the rule can match a node or nodes of an input Logical Form; and 2) an action part that specifies the action to be taken, in terms of assigning values to a role or roles of a frame instance, if the conditional part is satisfied.

For purposes of organization, each frame extraction rule can be given a name.

A frame extraction rule can be expressed as a collection of simpler rules, each such simpler rule referred to herein as a "Logical Form rule." A Logical Form rule, like the overall frame extraction rule of which it is a part, can also have a conditional part and an action part. Logical Form rules can be of two main varieties: mandatory and optional. For a frame extraction rule to take action, all of its mandatory Logical Form rules must be satisfied. Any optional Logical Form rules, that are also satisfied when all mandatory Logical Form rules are satisfied, can specify additional action that can be taken by the frame extraction rule.

7.2.2 Pseudo-Coded

In order to further discuss frame extraction rules, in general, it will be useful to present a format for presenting such rules as pseudo-code. An example tree-structured frame extraction rule, shown in the pseudo-code, is presented in FIG. 11A. For the pseudo-coded rules presented herein, the name for the rule is provided in the first line (for the example rule of FIG. 11A, "IMPROVE_Rule_TP" is its name).

For the pseudo-coded frame extraction rules presented herein, each line (other than the line specifying a name for the frame extraction rule) represents a Logical Form rule. Each Logical Form rule is mandatory, unless the entire line is enclosed in a pair of parenthesis.

For the type of Logical Form rule presented herein, its conditional part specifies the conditions under which it is satisfied by a node "n1" of the input Logical Form while its action part specifies the role, of a frame instance, that is assigned the value "n1."

The conditional part, of a Logical Form rule, can itself be comprised of two sub-parts (both of which must be satisfied by a single node of a Logical Form):

1) a node-based sub-part, whose satisfaction depends upon the type of node to which the Logical Form rule is applied; and
2) a text-based sub-part, whose satisfaction depends upon the fragment of the input statement represented by the textual part of the node to which the Logical Form rule is applied.

For each Logical Form rule presented herein, its syntax divides it into three parts (from left to right):

<node-based sub-part>: <text-based sub-part>→<action>

As can be seen, the node-based sub-part is separated from the text-based sub-part by a colon symbol, while the text-based sub-part is separated from the action by a right-pointing arrow symbol.

The node-based sub-part can specify either of the following two conditions:

1) that a satisfactory node of the Logical Form be the root node of a sub-tree that matches the frame extraction rule, where such sub-tree is part of the Logical Form of the input statement (this condition is specified with the keyword "Root_node"); or
2) that a satisfactory node of the Logical Form be of a certain semantic constituent type.

The action specifies a role, of the frame instance created, that is assigned a value as a result of the Logical Form rule being satisfied. The value assigned to a role can comprise the textual part of the Logical Form node that satisfies the rule's node-based sub-part. Additional information, that can comprise the value assigned to a role, includes the following: if the node "n1," satisfying the node-based sub-part, is the root of a sub-tree, the textual parts of some essential child nodes, of such sub-tree, can be assigned to the role. For example, if n1 is the root of a verb phrase, it is typical for only the core argument structure, of such verb phrase, to be assigned to the role. The core argument structure of a verb phrase typically consists of the verb itself and, possibly, the undergoer and/or complement. Such core verb phrase typically excludes adverbial details, such as time and/or location. Assignment of the selected core textual parts, of a sub-tree's child nodes, is indicated herein by enclosing the role name in square brackets.

Regarding the specification of conditions, for matching the node-based sub-part of a Logical Form rule, line 2 of FIG. 11A depicts a Logical Form rule where the node-based sub-part requires a matching node to be a sub-tree root. By enclosing the role name (Benefit_Role) in square brackets, it is known that the verb phrase (and not just the verb matching IMPROVE) is assigned to the Benefit_Role. Line 3 of FIG. 11A depicts a Logical Form rule where the node-based sub-part requires a node to be of a certain semantic constituent type. For example, line 3 requires semantic constituent type "Actor."

Typically, only one Logical Form rule, of a frame extraction rule, uses a node-based sub-part that requires its matching node to serve as the sub-tree root. This Logical Form rule can be referred to as the "root Logical Form rule." The root Logical Form rule can be used as the entry point for a frame extraction rule: it can be tested, for matching against an input Logical Form, before any other Logical Form rules are tested. If the root Logical Form rule does not match, then no further Logical Form rules of the frame extraction rule need be tested.

The text-based sub-part, of a Logical Form rule, specifies a pattern of lexical units and/or features that need to appear in the textual part of a Logical Form node, even if that node already matches the node-based sub-part of the Logical Form rule. A "feature" is represented, in the pseudo-coded frame extraction rules, by any word that is entirely capitalized. Please see section 6.4 ("Features") for a definition of a feature. The frame extraction rule of FIG. 11A contains the following feature: TECHNOLOGY (line 3).

One type of pattern, that can be specified by the text-based sub-part, is a prepositional phrase. In particular, the text-based sub-part can specify that a preposition must be followed by a specific noun or by a feature that represents a collection of nouns. For example, the text-based sub-part of line 6 of FIG. 11A requires that the preposition "for" or "in" be followed by a noun that satisfies the feature HUMAN. The exact syntax is: Prep(for|in) . . . HUMAN.

The tree structure, specified by a pseudo-coded frame extraction rule, can be indicated by the indentation of its Logical Form rules and by the use, or non-use, of blank lines between such Logical Form rules. As with specifying the Logical Form itself, greater indentation of a line (i.e., further distance of a line from the left margin) is used herein to indicate a Logical Form rule calling for a node farther from the root.

A Logical Form rule "LF1" and a Logical Form rule "LF2" specify, respectively, two nodes in a parent and child relationship when LF1 is the first Logical Form rule that is both above LF2 and LF1 has a lesser indentation than LF2. For example, in FIG. 11A, each of lines 3-5 specifies a node that is a child of the node specified by line 2.

Logical Form rules "LF1" and "LF2" specify two nodes in a sibling relationship when the following conditions are satisfied:

- LF1 and LF2 are at the same indentation level;
- between LF1 and LF2 there is no other Logical Form rule with a lesser amount of indentation; and
- LF1 and LF2 are separated by at least one blank line (in the pseudo-coded rules presented, blank lines are not given a line number).

For example, in FIG. 11A, line 4 specifies a sibling to the node specified by line 3. However, line 5 does not specify a sibling to line 4 since lines 4 and 5 are not separated by a blank line.

In certain cases, multiple Logical Form rules can be combined, with an appropriate logical operator, to form one compound Logical Form rule. For example, a group of Logical Form rules can be combined by the XOR operator. In this case, when one, and only one, of the Logical Form rules is satisfied, the compound Logical Form rule is also satisfied.

For the pseudo-coded example frame extraction rules presented herein, a pair of Logical Form rules "LF1" and "LF2" are implicitly combined with an XOR operator when the following conditions are satisfied:

LF1 and LF2 are at the same indentation level;

between LF1 and LF2 there is no other Logical Form rule at a lesser level of indentation; and there is no blank line between LF1 and LF2.

For example, in FIG. 11A, lines 4-5 form a compound Logical Form rule. Both Logical Form rules specify that a node be of semantic constituent type "Undergoer," but the rule of line 4 requires the node's textual part specify a BADTHING while the rule of line 5 requires the node's textual part specify a NON-BADTHING. If a node satisfies line 4 it will be assigned to the Problem role of a frame instance while a node satisfying line 5, instead, will be assigned to the Gain role of a frame instance (where the Problem, Gain and Beneficiary roles are not utilized, in the particular Benefit instances produced by this rule).

7.3 Features

This section presents an example defining set (i.e., a set of lexical units) for each feature utilized in the example benefit frame extraction rules presented herein. As discussed above, a "feature" is represented, in the pseudo-coded frame extraction rules, by any word that is entirely capitalized. A multi-word lexical unit, that is a member of a defining set, is connected with the underscore character.

ABSTRACT_NOUN

Can be represented by a large set of lexical units that are abstract nouns, where only a small sample of such set is shown below:

{density, accuracy, happiness, movement, hatred, . . . }

ACTION

Can be represented by a set of lexical units that includes surface verbs ending in "-ing" (e.g., providing, removing, reducing) and the deverbal noun form of such verbs (e.g., provision, removal, reduction).

ANY_LEX_UNIT

Can include any lexical unit of a UNL that is represented by a Logical Form.

BAD

Can be represented by the following set of lexical units that are surface adjectives (all of which refer to or implicate, to at least some degree, the concept "Bad"). Example lexical units can include the following:

{bad, inadaptable, inadequate, disadvantageous, detrimental, undesirable, ineffective, inefficient, poor, unfavorable, unhelpful, flawed, negative, . . . }

BADTHING

Can be represented by the following set of lexical units that are surface nouns (all of which refer to something that has, to at least some degree, a connotation with the concept "Bad"):

{cancer, catastrophe, failure, . . . }

BODY_PART

Can include any lexical unit that indicates a part of the human body. Example lexical units can include the following:

{(leg, arm, hand, . . . }

CHANCE

Can include any lexical unit that implies, at least to some extent, the chance or possibility of something happening. Example lexical units can include the following:

{likelihood, chance, probability, possibility, . . . }

DECREASE

Can be a large set of lexical units, each representing a verb, where each lexical unit involves, at least in part, an action of decreasing or reducing something. Example lexical units can include the following:

{cut back, cut down, decrease, reduce, lessen, minify, minimize, restrain, scale down, slow down, suppress, trim down, trim off, constrain, curb, curtail, . . . }

DISEASE

Typically limited to include only those lexical units that are from a specialized lexicon that we shall call a "Disease Lexicon." A lexical unit is a member of the Disease Lexicon only if it is regarded, by the healthcare community, as referring to a disease. Example lexical units can include the following:

{cancer, influenza, flu, . . . }

DRUG

Can be limited to include only those lexical units that are regarded, by the healthcare community, as referring to a drug. Example lexical units can include the following:

{aspirin, penicillin, . . . )

EXPERT

Set of lexical units associated with being an expert, including the following:

{expert, researcher, scientist, technician, technologist, authority, professor, leader, pioneer, scholar, chemist, specialist, psychiatrist, master, mastermind, architect, guru, figure, whiz, discoverer, . . . }

GOOD

Can be represented by the following set of lexical units that are surface adjectives (all of which refer to or implicate, to at least some degree, the concept "Good"). Example lexical units can include the following:

{good, adaptable, adequate, admirable, advantageous, beneficial, desirable, effective, efficient, excellent, favorable, helpful, perfect, positive, successful, suitable, superior, valuable, viable, reliable, . . . }

GOODTHING

Can be represented by the following set of lexical units that are surface nouns (all of which refer to something that has, to at least some degree, a connotation with the concept "Good"):

{goodness, admirability, magnificence, triumph, fortune, success, prosperity, advantage, benefit, enjoyment, joy, delight, pleasure, efficacy, safety, relief, efficiency, promotion, prize, stability, reward, productivity, virtue, integrity, popularity, rewards, merit, harvest, miracle, treasure, reliability, excellence, perfection, breakthrough, supremacy, masterpiece, refinement, jewel, adequacy, victory, favor, . . . }

HUMAN

Can be represented by the following set of lexical units, where each member is a common noun or a person's proper name:

{guy, lady, teacher, John, Mary, . . . }

IMPROVE

Can be represented by the following set of lexical units that are logical verbs (all of which relate to increasing a level of goodness for a noun):

{improve, improvement, rally, purify, purification, refresh, refreshen, benefit, optimize, perfect, upgrade, restore, better, refurbish, enrich, polish, remodel, furbish_up, lighten_up, . . . }

INVENT

Set of lexical units associated with the process of inventing, including the following:

{invent, design, patent, devise, pioneer, . . . }

NON-BADTHING

Can be represented by any lexical unit that is not a member of the set of lexical units representing BADTHING.

NON-HUMAN

Can be represented by any lexical unit that is a noun and is not a member of the set of lexical units representing HUMAN.

PROBLEM

Can be represented by the following set of lexical units that are surface nouns (all of which refer to something that has, to at least some degree, a connotation with the concept of a "Problem"):

{problem, issue, trouble, head-ache, limitation, drawback, weakness, con, . . . }

PROCEDURE

Can be limited to include only those lexical units that are regarded, by the healthcare community, as referring to a procedure. Example lexical units can include the following:

{coronary_bypass, tonsillectomy, . . . }

PRODUCE_VERB

Can be a set of lexical units, each representing a verb, where each lexical unit involves, to at least some extent, an action of producing or creating something. Example lexical units can include the following:

{produce, create, generate, trigger, contribute_to, lead_to, result_in, bring_about, bring_forth, . . . }

PRODUCT

Membership of a lexical unit "LU_1," in this set of lexical units, depends upon whether LU_1 has been determined to be branded, as based on the output of an entity tagging module.

SELL

Set of lexical units associated with the process of selling, including the following:

{sell, distribute, market, ship, deliver, . . . }

SYMPTOM

Can include any lexical unit that indicates an observable effect of a disease. Example lexical units can include the following:

{weakness, dizzyness, . . . }

TECHNOLOGY

Set of lexical units, each of which satisfies at least one of the following:

1. Is capitalized, or is an acronym, and is not any of the following:
   a. The name of an organization
   b. A member of the defining set for the HUMAN feature
   c. The name of a product
   d. The name of a location
2. Is an entry in a lexicon of technical terms For 1, a set of lexical units can be "tagged" or "identified" as an "organization" (1.a.) or "location" (1.d.) using any standard technique for entity tagging. A set of lexical units can be tagged or identified as a "product" (1.c.) if it has been determined to be branded.

VING

Can include any lexical unit that represents a verb with the "ing" ending.

7.4 Snippet Formation

As discussed above, a snippet refers to the locality around the match of a frame to a location in computer-accessible content. More specifically, if a match of a frame has occurred in a UNL "UM1," the snippet comprises a copy of UM1 (also called the "focus" UNL) and may also comprise a copy of additional, surrounding, contextual content.

Choosing an appropriately-sized snippet depends on several factors. First, it can depend upon the UNL by which frame instances are identified (e.g., whether frames are identified within individual sentences or across larger units of text). Second, it can depend upon providing sufficient surrounding context for keyword searching. Third, snippet size can depend upon the amount of text necessary, for a user of a search system, such that a snippet can be read and evaluated, apart from its original source content.

A specific issue to consider, in determining snippet size, is pronoun resolution. In the context of snippet size determination, the pronoun resolution problem can be stated as follows. If a pronoun occurs in a UNL "U1," in which a frame instance has been identified, it is desirable that the pronoun's antecedent noun appear in the snippet context that surrounds "U1." The larger the snippet size, the more likely it is that all pronouns of "U1" will be resolved. Counter-balancing pronoun resolution, however, are such factors as making a snippet small enough for fast comprehension by the searcher.

If the UNL by which frame instances are identified is the sentence, a snippet size of five sentences has been experimentally determined as desirable. Once a frame instance has been identified in a focus sentence "S1," two sentences before S1 and two sentences after S1 can be added to the snippet to provide sufficient context for S1. While a desirable goal, depending upon the logical organization of the computer-accessible content from which snippets are being extracted, an individual snippet may comprise less than five sentences. For example, the computer-accessible content may be organized into separate documents. If S1 is at the beginning of a document, two sentences prior to S1 may not be available for addition to the snippet. Similarly, if S1 is at the end of a document, two sentences after S1 may not be available for addition to the snippet.

7.5 Computing Environment

Figure 15:
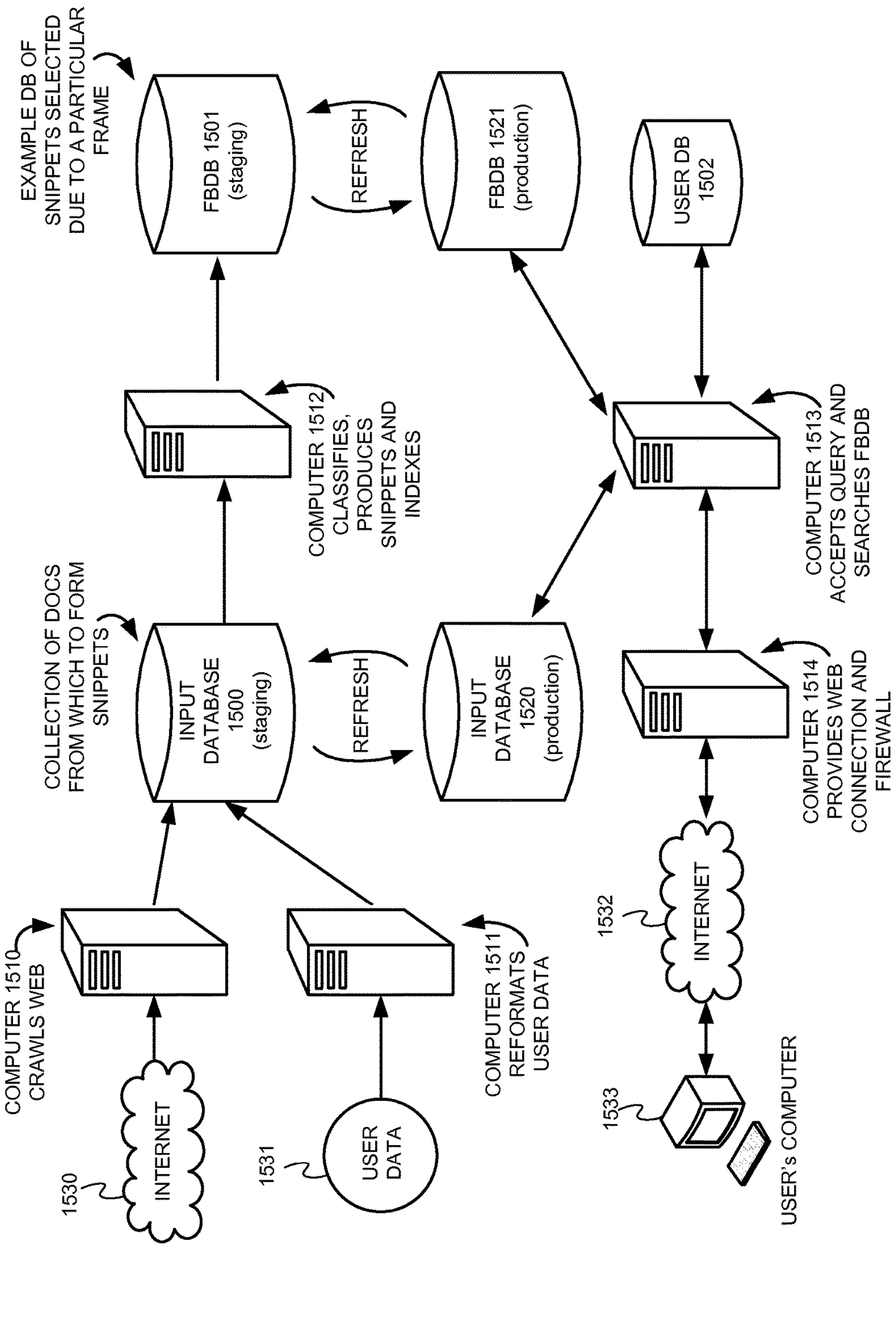
FIG. 15 depicts an example production-level computer system design in which the techniques described herein can be applied.

FIG. 15 depicts an example production-level computer system design in which the techniques described herein can be applied.

Cloud 1530 represents data available via the Internet. Computer 1510 can execute a web crawling program, such as Heritrix, that finds appropriate web pages and collects them in an input database 1500. An alternative, or additional, route for collecting input database 1500 is to use user-supplied data 1531. For example, such user-supplied data 1531 can include the following: any non-volatile media (e.g., a hard drive, CD-ROM or DVD), record-oriented databases (relational or otherwise), an Intranet or a document repository. A computer 1511 can be used to process (e.g., reformat) such user-supplied data 1531 for input database 1500.

Computer 1512 can perform the indexing needed for formation of an appropriate FBDB (for example, an FBDB as discussed in section 5.2.2.3 "Pre-query Indexing"). The indexing phase scans the input database for sentences that refer to an organizing frame, produces a snippet around each such sentence and adds the snippet to the appropriate frame-based database. FIG. 15 depicts an example frame-based database 1501. For an example frame-based HRSE as described in Section 4.2.3 ("Frame-Based HRSE"), four such FBDB's could be produced. Each FBDB could have the following organizing frame(s):

1. Cause Frame 101;
2. Effect Frame 102;
3. Treatment Frame 103; and
4. Pro Frame 104 and Con Frame 105.

Databases 1520 and 1521 represent, respectively, stable "snapshots" of databases 1500 and 1501. Databases 1520 and 1521 can provide stable databases that are available to service search queries entered by a user at a user computer

1533. Such user query can travel over the Internet (indicated by cloud 1532) to a web interfacing computer 1514 that can also run a firewall program. Computer 1513 can receive the user query and perform a search upon the contents of the appropriate FBDB (e.g., FBDB 1521). The search results can be stored in a database 1502 that is private to the individual user. When a snippet of interest is found in the search results, input database 1520 is available to the user to provide the full document from which the snippet was obtained.

In accordance with what is ordinarily known by those in the art, computers 1510, 1511, 1512, 1513, 1514 and 1533 contain computing hardware, and programmable memories, of various types.

The information (such as data and/or instructions) stored on computer-readable media or programmable memories can be accessed through the use of computer-readable code devices embodied therein. A computer-readable code device can represent that portion of a device wherein a defined unit of information (such as a bit) is stored and/or read.

8 GLOSSARY OF SELECTED TERMS

Abstract noun: a noun that does not refer to any specific physical object. Typically, an abstract noun describes a quality of something (e.g., density, beauty) or it is a deverbal noun.

"Bad" or "BAD": used herein to refer to the concept "Bad." The concept "Bad" occurs, in a UNL (typically, a single sentence), when that unit refers to, with regard to something, a negative, detriment or badness that is of, or related to, that something.

Common noun: a noun that is a member of the following set of nouns: the set of all nouns, minus the set of all proper names.

Computer-accessible content: any type of content that is accessible via computer. This includes database content as well as streaming sources of data.

Condition Lexicon: A lexical unit is a member of the Condition Lexicon only if it is regarded, by the healthcare community, as referring to at least one of the following: disease, complication, symptom or condition. Example lexical units can include the following:

{cancer, influenza, flu, fever, sweating, . . . }

Corpus: any collection of computer-accessible information.

Declarant: an entity that has, with respect to a UNL, at least one of the following relationships:

i. Author of
ii. Speaker of
iii. Producer of

Demographic:

a. Any characteristic that can be meaningfully summarized with respect to a population. Examples:
   i. Gender
   ii. Age
   iii. Affluence
b. Such summarization is usually expressed by a statistical measure. Examples:
   i. Average
   ii. % (or amount), of total, for each value (or range of values) of characteristic Deverbal noun: a surface noun that is derived from a surface verb. Some examples are as follows. The surface verb "enhance" can be converted into the deverbal noun "enhancement." The surface verb "work" (as in the example sentence "John works hard") can be converted into the deverbal noun "hard work" (as in the example sentence "John got good results by hard work").

Document repository: a collection of documents that pertains to a particular subject, topic or domain. A document repository can include unstructured data and/or data that is in a variety of formats. A document repository is often created to archive information for long-term retention and/or historical purposes.

FBSE: frame-based search engine. An example generic FBSE is described in Section 5.

Frame Concept: The concept represented by a frame.

Frame Name: A label by which a frame can be uniquely distinguished from other frames.

frame instance (or just instance): same as frame itself, except that, for each role, a role value has been assigned. The role values (usually drawn from the invoking UNL) represent the specifics of how a frame's Frame Concept is used at a particular location in a Source Corpus.

frame extraction: refers to the utilization of a frame extraction rule to determine whether a frame is invoked by a UNL.

frame extraction rule: a type of linguistic rule that identifies when a frame's Frame Concept is invoked by a UNL.

"Good" or "GOOD": used herein to refer to the concept "Good." The concept "Good" occurs when a UNL (typically, a single sentence) refers to, with regard to something, a positive, benefit or goodness that is of, or related to, that something.

input role: Given a query Q_1 and a set of instances IS_1 to be searched, the input role is the role that has its role value, for each member of IS_1, compared to Q_1 for a potential match.

Internet-accessible content: any type of content that is accessible via the Internet. This includes web pages, documents, database content and streaming data sources.

Internet-accessible location: an address or other identifier by which Internet-accessible content can be accessed.

Intranet: any computer network that is private to a particular company or other form of organization. Access to an Intranet can be granted to third parties who are not part of the company or organization. Such third parties can include customers, suppliers, consultants and contractors.

Invocation: A UNL "invokes" a frame's Frame Concept when that UNL uses linguistic expressions in such a way that the Frame Concept is regarded, by an ordinary reader of a human language "L," as: expressed, used or otherwise invoked.

Keyword-based search: The process by which a UNL of interest can be identified within a larger database based on the presence or absence of pre-selected query terms within that UNL. In the simplest implementation, the query is an exact word or phrase. One elaboration allows for each query to be a pattern that specifies a set of possible matching words or phrases. One common manner of elaboration is to allow a word to be substituted by any of its grammatical forms (e.g., "written," "writes," and "wrote" all matching a query of "write"). Another common manner of elaboration is to allow expressions of queries linked together with the operators of standard or nonstandard logics, where the expression is deemed to be present if each internal term is interpreted as a subquery, and the expression, applied to those subqueries evaluates to true.

Lexical unit: A sequence of one or more words that has at least one meaning "m" for which the sequence operates as an indivisible unit. In the case of a multi-word lexical unit, its meaning "m" cannot be derived from any normal composition of the meanings of the lexical unit's constituent words. For example, "The White House" is not simply any house which happens to be white, and "dry ice" is not simply ice that happens to be dry.

Logical verb: An action word that, typically, corresponds to either a surface verb or a deverbal noun.

Proper name: a capitalized lexical unit that refers to a particular individual. The kinds of particular individuals, referred-to by a proper name, can include the following: a person, an organization or a location.

Pseudo-code: The pseudo-code presented herein is loosely based on the C programming language. The C programming language is described in such texts as "A Book on C," by A. Kelley and I. Pohl, Benjamin Cummings Pub. Co., Third Edition, 1995, ISBN 0-8053-1677-9, herein incorporated by reference in its entirety.

Record: Any representation of data that is recognized, for the database of interest, as a discretely accessible unit.

Result-base: set of items or records upon which a result-value is based.

Result-base-F: Term for a result-base produced by frame-based search. In this case, the records of the result-base are the snippets upon which an RVF is based. If an instance, "I_1," represented by an RVF has no instance-mentions, then its RBF contains the one snippet associated with I_1. If, however, I_1 has instance-mentions, then its RBF contains the snippet associated with each instance-mention.

Result-pair: a data grouping of a result-value with its result-base.

Result-pair-F: a data grouping of a result-value-F with its result-base-F.

Result-value: any value that has been determined to be a sought-for value, as part of a search project.

Result-value-F: Term for a result-value produced by frame-based search, where such result-value also satisfies the following:

i. It is representative of an instance selected by a search query;

ii. If the instance contains no instance-mentions, a result-value is chosen or generated, from the output-role values of the instance, that appropriately summarizes such output-role values; and iii. If the instance contains multiple instance-mentions, a result-value is chosen or generated, from the output-role values of the instance-mentions, that appropriately summarizes such output-role values.

role: A component by which a frame's Frame Concept is modeled or into which a frame's Frame Concept is decomposed.

Role Attribute: An attribute that defines a frame's role.

role name: A Role Attribute that stores a label for a role that is unique (at least within a frame).

role type: among the full set of values that could otherwise be assigned to a role, serves to limit the set of permissible values.

role value: within a frame instance, each role value represents a specification of how a frame's Frame Concept is used at a particular location in a Source Corpus.

role value representation: The type of representation by which a role's value stored.

Rule Set: A set of frame extraction rules, for identifying whether a frame has been invoked. Ideally, a frame's Rule Set is able to detect whenever the frame's Frame Concept is invoked, and thereby produce a frame instance representing each particular use of the Frame Concept.

Snippet: a package of text that surrounds the location of a match of a query to computer-accessible content (in the case of an FBDB, it is the location where the organizing frame matches). The snippet can be chosen to be of a sufficient size such that, on a statistical basis, it provides sufficient factual context for a user to understand whether the match is relevant to his or her search topic.

Source Corpus: Unless the context indicates otherwise, refers to a corpus of natural language that is to be the subject of frame-based analysis.

Stop words: can include any word that appears too frequently, in a corpus of natural language, to be meaningful as part of a search. Example stop words include the following: "the" and any preposition.

"Surface," as applied to a part of speech (e.g., a "surface noun" or "surface verb") or a grammar constituent (such as "surface subject"): indicates a linguistic unit that has been analyzed a lesser amount than is needed to produce a Logical Form representation. The level of representation, produced by this lesser amount of analysis, is referred to (in the field of natural language processing) as the "syntactic level." In contrast, the level of representation, produced for the Logical Form, is also referred to (in the field of natural language processing) as the "deep logical" or "semantic" level.

UNL: Refers to a "unit of natural language" in a corpus of human language. The term "UNL" can be used to refer to any unit of a natural language. For example, a UNL can refer to a unit that is of arbitrary length or that is not associated with any general linguistic structure. However, the UNL focused-upon herein is the single sentence or clause.

Verb Group (or "VG"): Consists of (at least) a head verb plus, optionally, preceding auxiliary verbs (e.g., "to have," "to be") or modal verbs (e.g., "can," "might," "must"). Example VGs, related to the act of studying: "study," "is studying," "has been studying," "was studied" or "had been studied." A VG is a key linguistic unit, formed in a stage of parsing that is before semantic parsing. The formation of a VG involves the decoding of verb tense (e.g., present tense, past perfect tense) and voice (e.g., passive vs. active) information.

9 SUMMARY

While the invention has been described in conjunction with specific embodiments, it is evident that many alternatives, modifications, variations and equivalents will be apparent in light of the foregoing description. Accordingly, the invention is intended to embrace all such alternatives, modifications, variations and equivalents, as fall within the scope (both literally and by reason of the doctrine of equivalents) of the appended claims.

What is claimed is:

1. A method for frame-based search, performed by computing hardware and programmable memory, comprising the following steps:

receiving a first rule, for producing an instance in accordance with a first frame, wherein the first frame comprises a first input role and a first output role;

receiving a second rule, for producing an instance in accordance with a second frame, wherein the second frame comprises a second input role and a second output role;

receiving a first source corpus;

identifying first and second units of natural language from, respectively, first and second snippets of the first source corpus;

producing a first instance, from the first unit, by application of the first rule, wherein the first instance has a first input value assigned to its first input role and a first output value assigned to its first output role;

producing a second instance, from the second unit, by application of the second rule, wherein the second instance has a second input value assigned to its second input role and a second output value assigned to its second output role;

matching an input user query to the first input value of the first instance, and the second input value of the second instance;

determining the first and second instances represent a same third frame;

determining a same third value as representative of the first and second input values;

determining a same fourth value as representative of the first and second output values;

producing, as a result of computing hardware and programmable memory, a first result that contains a first result-value and a first result-base, wherein the first result-value is the fourth value and the first result-base contains the first and second snippets;

determining, as a result of computing hardware and programmable memory, a member-level demographic value for each member of the first result-base;

determining, as a result of computing hardware and programmable memory, a first demographic value, for the first result, by combining the member-level demographic values; and displaying, to a user as part of a search result, the first demographic value as a demographic determined for the first result-value.

2. The method of claim 1, wherein the step of determining a member-level demographic value for each member of the first result-base further comprises:

determining whether a first lexical unit, with a demographic association, is present.

3. The method of claim 2, wherein the first lexical unit is indicative of a geographical area.

4. The method of claim 2, wherein the lexical unit is produced by application of automated machine learning procedures to training corpora.

5. The method of claim 1, wherein the step of determining a member-level demographic value for each member of the first result-base further comprises:

application of a third linguistic rule, that triggers upon a logical form, and, if triggered, has an action that indicates a presence of a demographic characteristic.

6. The method of claim 5, wherein the third linguistic rule tests for self-referential demographic identification.

7. The method of claim 2, wherein the third linguistic rule requires a logical form with a verb, actor, and undergoer.

8. The method of claim 2, wherein the third linguistic rule requires a logical form with a verb of a form of to be, and a self-referential actor.

9. The method of claim 2, wherein the third linguistic rule, if triggered, indicates the presence of the demographic characteristic with a confidence distribution.

10. The method of claim 1, further comprising:

producing a first Logical Form semantic representation for the first unit of natural language of the first corpus;

determining whether a first conditional part of the first rule matches the first Logical Form;

producing, if the first conditional part matches, in accordance with a first action part of the first rule, an assignment of values of the first Logical Form to the first input role and first output role of the first instance;

producing a second Logical Form semantic representation for the second unit of natural language of the first corpus;

determining whether a second conditional part of the second rule matches the second Logical Form; and producing, if the second conditional part matches, in accordance with a second action part of the second rule, an assignment of values of the second Logical Form to the second input role and second output role of the second instance.

* * * * *